US012699033B2

(12) United States Patent  (10) Patent No.: US 12,699,033 B2
Rouzeau et al.  (45) Date of Patent: Aug. 4, 2026

(54) LIGHT SCATTERING DETECTORS AND METHODS FOR THE SAME

(71) Applicant: TOSOH BIOSCIENCE LLC, King of Prussia, PA (US)

(72) Inventors: Sébastien Rouzeau, Publier (FR); David Thomas Gillespie, Pearland, TX (US)

(73) Assignee: TOSOH BIOSCIENCE LLC, King Of Prussia, PA (US)

( * ) Notice: Subject to any disclaimer, the term of this patent is extended or adjusted under 35 U.S.C. 154(b) by 169 days.

(21) Appl. No.: 18/690,593

(22) PCT Filed: Sep. 9, 2021

(86) PCT No.: PCT/US2021/049552
§ 371 (c)(1),
(2) Date: Mar. 8, 2024

(87) PCT Pub. No.: WO2023/038621
PCT Pub. Date: Mar. 16, 2023

(65) Prior Publication Data
US 2025/0137899 A1     May 1, 2025

(51) Int. Cl.
*G01N 15/0205* (2024.01)
*G01N 15/14* (2006.01)
(Continued)

(52) U.S. Cl.
CPC ......... *G01N 15/0211* (2013.01); *G01N 15/14* (2013.01); *G01N 21/51* (2013.01);
(Continued)

(58) Field of Classification Search
CPC .... G01N 30/74; G01N 15/1429; G01N 30/86; G01N 2015/03; G01N 15/0205;
(Continued)

(56) References Cited

U.S. PATENT DOCUMENTS 5,269,937 A * 12/1993 Dollinger ............... G01N 30/74
436/171
11,199,486 B2 * 12/2021 Corbett ............. G01N 15/0211
(Continued)

FOREIGN PATENT DOCUMENTS

DE     102015217700 B3 * 12/2016   ........... G01N 5/0205
EP       1884762 A2 *  2/2008   ......... G01N 15/0205
(Continued)

OTHER PUBLICATIONS

International Search Report and Written Opinion; International Application No. PCT/US2021/049552; Dec. 7, 2021.
(Continued)

*Primary Examiner* — Michael P Stafira
(74) *Attorney, Agent, or Firm* — MH2 Technology Law Group, LLP

(57) ABSTRACT

Methods for determining an assumption-free radius of gyration of particles in solution using a light scattering detector are disclosed. The method may include determining a first weighting factor based on a first form factor. The method may also include determining a second weighting factor based on a second form factor. The method may further include determining a first form factor contribution for the first form factor based on the first weighting factor and the second weighting factor. The method may also include determining a second form factor contribution for the second form factor based on the first weighting factor and the second weighting factor. The method may also include determining the assumption-free radius of gyration from the first and second form factor contributions.

19 Claims, 7 Drawing Sheets

(51) Int. Cl.
*G01N 21/51* (2006.01)
*G01N 21/47* (2006.01)

(52) U.S. Cl.
CPC ................ *G01N 2015/1493* (2013.01); *G01N 2021/4704* (2013.01)

(58) Field of Classification Search
CPC ....... G01N 15/1434; G01N 2015/0038; G01N 2015/0294; G01N 21/51; G01N 2015/0288; G01N 30/16; G01N 30/30; G01N 30/6052; G01N 33/44; G01N 35/085; G01N 35/1097; G01N 15/0211; G01N 2021/4704; G01N 2021/513; G01N 21/05; G01N 21/53; G01N 30/02; G01N 30/88; G01N 30/461; G01N 2030/324; G01N 30/24; G01N 30/466; G01N 30/54; G01N 33/442; G01N 15/10; G01N 2015/1022; G01N 2015/1493; G01N 2030/885; G01N 2015/0222; G01N 15/01; G01N 2030/8827; G01N 23/201; G01N 30/0005; G01N 15/0227; G01N 30/78; G01N 2015/0053; G01N 2015/1006; G01N 2015/1497; G01N 30/60; G01N 35/028; G01N 15/1436; G01N 15/1459; G01N 15/14; G01N 15/1433; G01N 15/1468; G01N 2015/0238; G01N 2015/144; G01N 2015/1472; G01N 2030/8886; G01N 23/207; G01N 15/075; G01N 2015/035; G01N 2015/1029; G01N 33/68; G01N 2021/4711; G01N 2030/347; G01N 15/1484; G01N 2013/003; G01N 2035/1058; G01N 2223/612; G01N 2291/0235; G01N 2291/02854; G01N 2291/044; G01N 2291/2636; G01N 23/2055; G01N 2333/161; G01N 2333/922; G01N 29/069; G01N 29/11; G01N 29/4445; G01N 30/8693; G01N 30/90; G01N 33/57492; G01N 33/588; G01N 33/6803; G01N 1/36; G01N 1/38; G01N 15/149; G01N 2011/0026; G01N 2021/6439; G01N 2021/6441; G01N 2030/625; G01N 21/47; G01N 21/6428; G01N 21/6447; G01N 21/78; G01N 2223/1016; G01N 23/20; G01N 23/20008; G01N 23/202; G01N 23/204; G01N 2500/02; G01N 27/44791; G01N 30/8651; G01N 31/22; G01N 33/0044; G01N 33/1826; G01N 33/241; G01N 33/57419; G01N 9/24; G01N 2015/0046; G01N 2015/1486; G01N 2030/0045; G01N 21/4133; G01N 21/6402; G01N 2201/0873; G01N 2223/054; G01N 2223/1006; G01N 2223/106; G01N 2223/345; G01N 2223/623; G01N 2223/635; G01N 23/2073; G01N 33/15; G01N 33/532; G01N 33/542; G01N 33/54346; G01N 33/552; G01N 33/56966; G01N 9/36

See application file for complete search history.

(56) References Cited

U.S. PATENT DOCUMENTS

| | | | |
|---|---|---|---|
| 2005/0124805 A1 | 6/2005 | Al-Assaf et al. | |
| 2005/0240385 A1* | 10/2005 | Xie ................... | G01N 30/8693 703/11 |
| 2008/0204718 A1* | 8/2008 | Trainer ............. | G01N 15/1459 356/73 |
| 2011/0274812 A1 | 11/2011 | Nakauma et al. | |
| 2021/0223160 A1 | 7/2021 | Haney et al. | |

FOREIGN PATENT DOCUMENTS

| | | | | | |
|---|---|---|---|---|---|
| JP | 2008039539 A | | 2/2008 | | |
| JP | 2010286491 A | * | 12/2010 | ............. | G01N 21/51 |
| WO | WO-03036258 A2 | * | 5/2003 | ............. | G01N 30/00 |
| WO | WO-2017051149 A1 | * | 3/2017 | ......... | G01N 15/0211 |
| WO | WO-2020026704 A1 | * | 2/2020 | ......... | G01N 15/0227 |
| WO | 2020142096 A1 | | 7/2020 | | |
| WO | 2021009368 A1 | | 1/2021 | | |
| WO | WO-2021008708 A1 | * | 1/2021 | ............. | G01N 30/74 |

OTHER PUBLICATIONS

Examination Report No. 1 issued Sep. 2, 2024 in corresponding Australian Patent Application No. 2021463921, 3 pages.
Extended European Search Report issued Mar. 28, 2025 in corresponding European Patent Application No. 21956940.7, 10 pages.
Office Action with English translation issued Jun. 2, 2025 in corresponding Japanese Patent Application No. 2024-515348, 6 pages.
Examination Report No. 2 issued Aug. 19, 2025 in corresponding Australian Patent Application No. 2021463921, 5 pages.
Office Action issued Aug. 25, 2025 in corresponding Canadian Patent Application No. 3,230,483, 6 pages.

* cited by examiner

100

110

112

114

202

200

204

200

| PROCESSOR 304 | ROM 308 | RAM (E.G., VOLATILE MEMORY) 310 | STORAGE (E.G., NON-VOLATILE MEMORY) 312 |

BUS 302

| DISPLAY CONTROLLER 314 | I/O CONTROLLER 318 | MODULES (E.G., SUBSYSTEMS) 320 |

DISPLAY 204

I/O COMPONENTS 316

LIGHT SCATTERING DETECTORS AND METHODS FOR THE SAME

CROSS-REFERENCE TO RELATED APPLICATIONS

This application is a U.S. National Stage Application of International Application No. PCT/US2021/049552, filed on 9 Sep. 2021, the entire disclosure of which is hereby incorporated by reference in its entirety.

BACKGROUND

Conventional light scattering detectors are often utilized in conjunction with chromatographic techniques to determine one or more physical attributes or characteristics of various particles (e.g., molecules or solutes) suspended in solutions. For example, light scattering detectors are often utilized with gel permeation chromatography (GPC) or other liquid separation processes to determine a molecular weight (MW) and a radius of gyration (Rg) of various particles, such as polymers. In light scattering detectors, a sample or effluent containing particles (e.g., molecules, polymers, etc.) is flowed through a sample cell from an inlet to an outlet. As the effluent is flowed through the sample cell, the effluent is illuminated by a collimated beam of light (e.g., a laser). The interaction of the beam of light and the polymers of the effluent produces scattered light. The scattered light is then measured and analyzed for varying attributes, such as intensity and angle, to determine the solution and/or physical characteristics of the particles.

While conventional light scattering detectors have proven to be effective for providing better insight into the solution and/or physical attributes of a wide variety of particles, conventional methods for analyzing these particles are limited. For example, conventional methods for analyzing particles having a relatively high Rg possess potentially significant errors as molecular weights determined by multiangle light scattering (MALS) may be perturbed in the extrapolations of multiple angles to zero angle. Further, the determination of Rg by angular extrapolation is based on the slope of the angular extrapolation at zero angle. As such, if there is variability in the lowest angle(s), if the lowest angles are not "low enough," or if an unsuitable method of extrapolation is selected, the resulting Rg may have significant errors. In addition to the foregoing, methods of extrapolation often rely on algorithms or equations that assume a single structural model or rely on a polynomial "fit order" to estimate or approximate trends toward zero angle. If the particles do not fit, or do not sufficiently fit the single structural model, or are not represented well by a polynomial, however, the analysis may have significant errors.

What is needed, then, are improved light scattering detectors and methods for analyzing or determining aspects of particles in solution.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a method for determining an assumption-free radius of gyration (Rg) of particles in solution using a light scattering detector. The method may include determining a first weighting factor ($FW_1$) based on a first form factor ($FF_1$). The method may also include determining a second weighting factor ($FW_2$) based on a second form factor ($FF_2$). The method may further include determining a first form factor contribution ($FC_1$) for the first form factor ($FF_1$) based on the first weighting factor ($FW_1$) and the second weighting factor ($FW_2$). The method may also include determining a second form factor contribution ($FC_2$) for the second form factor ($FF_2$) based on the first weighting factor ($FW_1$) and the second weighting factor ($FW_2$). The method may also include determining the assumption-free radius of gyration (Rg) from the first and second form factor contributions ($FC_1$, $FC_2$).

In at least one implementation, the method may include obtaining a first scattering intensity ($I_{\theta 1}$), a second scattering intensity ($I_{\theta 2}$), and a third scattering intensity ($I_{\theta 3}$) of the particles in solution using a beam of light of the light scattering detector at a first angle, a second angle, and a third angle, respectively, relative to the beam of light.

In at least one implementation, the first scattering intensity ($I_{\theta 1}$), the second scattering intensity ($I_{\theta 2}$), and the third scattering intensity ($I_{\theta 3}$) may be excess scattering intensities. The respective excess scattering intensities of each of the first, second, and third angles may be normalized for quantum efficiency, gains, geometric volume, or a combination thereof.

In at least one implementation, the method may also include determining a ratio of observed light scattering of the particles at a first angle to observed light scattering of the particles at a third angle ($R'_{\theta 1/\theta 3}$), and determining a ratio of observed light scattering of the particles at a second angle to observed light scattering of the particles at the third angle ($R'_{\theta 2/\theta 3}$).

In at least one implementation, determining the first weighting factor ($FW_1$) may further include determining, based on the first form factor ($FF_1$), a ratio of calculated light scattering at the first angle to calculated light scattering at the third angle $$\left( R''_{\frac{\theta_1}{\theta_3} \; Calculated \; FF1} \right),$$

determining, based on the first form factor ($FF_1$) a ratio of calculated light scattering at the second angle to the calculated light scattering at the third angle $$\left( R''_{\frac{\theta_2}{\theta_3} \; Calculated \; FF1} \right),$$

and determining a best fit of the ratio ($R'_{\theta 1/\theta 2}$) to the ratio $$\left( R''_{\frac{\theta_1}{\theta_3} \; Calculated \; FF1} \right)$$

and the ratio $(R'_{\theta2/\theta3})$ to the ratio $$\left(R''_{\frac{\theta_2}{\theta_3}} \, _{Calculated \, FF1}\right).$$

In at least one implementation, determining the second weighting factor $(FW_2)$ may include determining, based on the second form factor $(FF_2)$, a ratio of calculated light scattering at the first angle to calculated light scattering at the third angle $$\left(R''_{\frac{\theta_1}{\theta_3}} \, _{Calculated \, FF2}\right);$$

determining, based on the second form factor $(FF_2)$ a ratio of calculated light scattering of the second angle to calculated light scattering at the third angle $$\left(R''_{\frac{\theta_2}{\theta_3}} \, _{Calculated \, FF2}\right);$$

and determining a best fit of the ratio $(R'_{\theta1/\theta3})$ to the ratio $$\left(R''_{\frac{\theta_1}{\theta_3}Calculated \, FF2}\right)$$

and the ratio $(R'_{\theta2/\theta3})$ to the ratio $$\left(R''_{\frac{\theta_2}{\theta_3}Calculated \, FF2}\right).$$

In at least one implementation, determining the best fit as disclosed above may include an iterative process.

In at least one implementation, determining the first weighting factor $(FW_1)$ may include determining a radius of gyration $(Rg_1)$, based on the first form factor $(FF_1)$, associated with the best fit of the ratio $(R'_{\theta1/\theta3})$ to the ratio $$\left(R''_{\frac{\theta_1}{\theta_3}Calculated \, FF1}\right)$$

and the ratio $(R'_{\theta2/\theta3})$ to the ratio $$\left(R''_{\frac{\theta_2}{\theta_3}Calculated \, FF1}\right).$$

In at least one implementation, the determining the radius of gyration $(Rg_1)$ associated with the best fit may include determining the radius of gyration $(Rg_1)$, based on the first form factor $(FF_1)$, associated with a minimum sum of squares residual $(SSR_1)$ of a difference between the ratio $(R'_{\theta1/\theta3})$ and the ratio $$\left(R''_{\frac{\theta_1}{\theta_3}Calculated \, FF1}\right)$$

and a difference between the ratio $(R'_{\theta2/\theta3})$ and the ratio $$\left(R''_{\frac{\theta_2}{\theta_3}Calculated \, FF1}\right).$$

In at least one implementation, the first weighting factor $(FW_1)$ may be based on the minimum sum of squares residual $(SSR_1)$ In at least one implementation, determining the second weighting factor $(FW_2)$ may include determining a radius of gyration $(Rg_2)$, based on the second form factor $(FF_2)$, associated with the best fit of the ratio $(R'_{\theta1/\theta3})$ to the ratio $$\left(R''_{\frac{\theta_1}{\theta_3}Calculated \, FF2}\right)$$

and the ratio $(R'_{\theta2/\theta3})$ to the ratio $$\left(R''_{\frac{\theta_2}{\theta_3}Calculated \, FF2}\right).$$

In at least one implementation, the determining the radius of gyration $(Rg_2)$ associated with the best fit may include determining the radius of gyration $(Rg_2)$, based on the second form factor $(FF_2)$, associated with a minimum sum of squares residual $(SSR_2)$ of a difference between the ratio $(R'_{\theta1/\theta3})$ and the ratio $$\left(R''_{\frac{\theta_1}{\theta_3}Calculated \, FF2}\right)$$

and a difference between the ratio $(R'_{\theta2/\theta3})$ and the ratio $$\left(R''_{\frac{\theta_2}{\theta_3}Calculated \, FF2}\right).$$

In at least one implementation, the second weighting factor $(FW_2)$ may be based on the sum of squares residual $(SSR_2)$.

In at least one implementation, at least one of the first form factor $(FF_1)$ or the second form factor $(FF_2)$ may be a form factor for a homogenous rigid particle.

In at least one implementation, the form factor for the homogenous rigid particle may be one of: a homogenous sphere, a spherical shell, a spherical concentric shell, particles of spherical subunits, an ellipsoid of revolution, a tri-axial ellipsoid, a cube and rectangular parallelepipedon, a truncated octahedra, a faceted sphere, a lens, a cube with terraces, a cylinder, a cylinder with an elliptical cross section, a cylinder with hemi-spherical endcaps, a cylinder with half lens end caps, a toroid, an infinitely thin rod, an infinitely thin circular disk, or a fractal aggregate.

In at least one implementation, at least one of the first form factor $(FF_1)$ or the second form factor $(FF_2)$ may be a form factor for a polymer model.

In at least one implementation, the form factor for the polymer model may be one of: a spherical particle form factor, a rodlike particle form factor, a random coil particle form factor, or a combination thereof.

In at least one implementation, the light scattering detector may include a multi-angle light scattering detector.

In at least one implementation, the particles in solution may include monodispersed particles.

In at least one implementation, the particles in solution may include polydispersed particles.

In at least one implementation, the assumption-free radius of gyration (Rg) of the particles may be from about 5 nm to about 500 nm, from about 30 to about 250 nm, or from about 50 to about 150 nm.

In at least one implementation, the first angle may be about 90° relative to the beam of light of the detector.

In at least one implementation, the second angle may be about 170° relative to the beam of light of the detector.

In at least one implementation, the third angle may be about 10° relative to the beam of light of the detector.

In at least one implementation, the method may further include determining a third weighting factor ($FW_3$) based on a third form factor ($FF_3$), determining a third form factor contribution ($FC_3$) for the third form factor ($FF_3$) based on the all the weighting factors ($FW_i$), and determining the assumption-free radius of gyration (Rg) from the first, second, and third form factor contributions ($FC_1$, $FC_2$, $FC_3$).

In at least one implementation, the method may further include obtaining a fourth scattering intensity ($I_{\theta 4}$) of the particles in solution with the beam of light of the light scattering detector at a fourth angle relative to the beam of light.

In at least one implementation, the light scattering detector may include a goniometer configured to observe light scattering at two or more angles.

In at least one implementation, the method may not include determining a molecular weight of the particles in solution prior to determining the assumption-free radius of gyration (Rg).

In at least one implementation, the method may not include fitting a Zimm, Berry, Debye, or Guinier plot to a polynomial function.

In at least one implementation, the method may include implementing a rejection criteria to determine a corrected assumption-free radius of gyration.

In at least one implementation, the rejection criteria may be based on one of: a respective minimum sum of squares residual, respective a minimum sum of squares squared, or respective a minimum sum of squares absolute for each of the form factors.

In at least one implementation, the rejection criteria may be implemented to determine a corrected minimum sum of squares residual, a corrected minimum sum of squares squared, or a minimum sum of squares absolute for the respective form factor.

In at least one implementation, the rejection criteria may be based on the number of angles utilized by the light scattering detector.

In at least one implementation, the rejection criteria may be based on the number of form factors utilized.

In at least one implementation, the rejection criteria may be based on at least one of the first form factor contribution ($FC_1$) or the second form factor contribution ($FC_2$).

In at least one implementation, the rejection criteria may be based on a respective signal to noise at each of the angles.

The foregoing and/or other aspects and utilities embodied in the present disclosure may be achieved by providing a method for evaluating composite particles in solution. The method may include determining a first weighting factor ($FW_1$) based on a first form factor ($FF_1$), determining a second weighting factor ($FW_2$) based on a second form factor ($FF_2$), determining a first form factor contribution ($FC_1$) for the first form factor ($FF_1$) based on the first weighting factor ($FW_1$) and the second weighting factor ($FW_2$), determining a second form factor contribution ($FC_2$) for the second form factor ($FF_2$) based on the first weighting factor ($FW_1$) and the second weighting factor ($FW_2$); and determining one or more properties of the composite particles with the first form factor contribution ($FC_1$) and the second form factor contribution ($FC_2$).

In at least one implementation, the one or more properties of the composite particles may include structural features, substructures, or combinations thereof.

In at least one implementation, the composite particles in solution may include branched particles.

Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

BRIEF DESCRIPTION OF THE DRAWINGS

The accompanying drawings, which are incorporated in and constitute a part of this specification, illustrate varying implementations of the present disclosure. These and/or other aspects and advantages in the implementations of the disclosure will become apparent and more readily appreciated from the following description of the various implementations, taken in conjunction with the accompanying drawings. It should be noted that some details of the drawings have been simplified and are drawn to facilitate understanding of the present disclosure rather than to maintain strict structural accuracy, detail, and scale. These drawings/figures are intended to be explanatory and not restrictive.

DETAILED DESCRIPTION

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, +5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

All references cited herein are hereby incorporated by reference in their entireties. In the event of a conflict in a definition in the present disclosure and that of a cited reference, the present disclosure controls.

As used herein, the term or expression "sensitivity of a detector" may refer to the ratio of signal to noise. It should be appreciated by one having ordinary skill in the art that increasing the laser power of a light scattering detector does not necessarily improve its sensitivity.

Figure 1A:
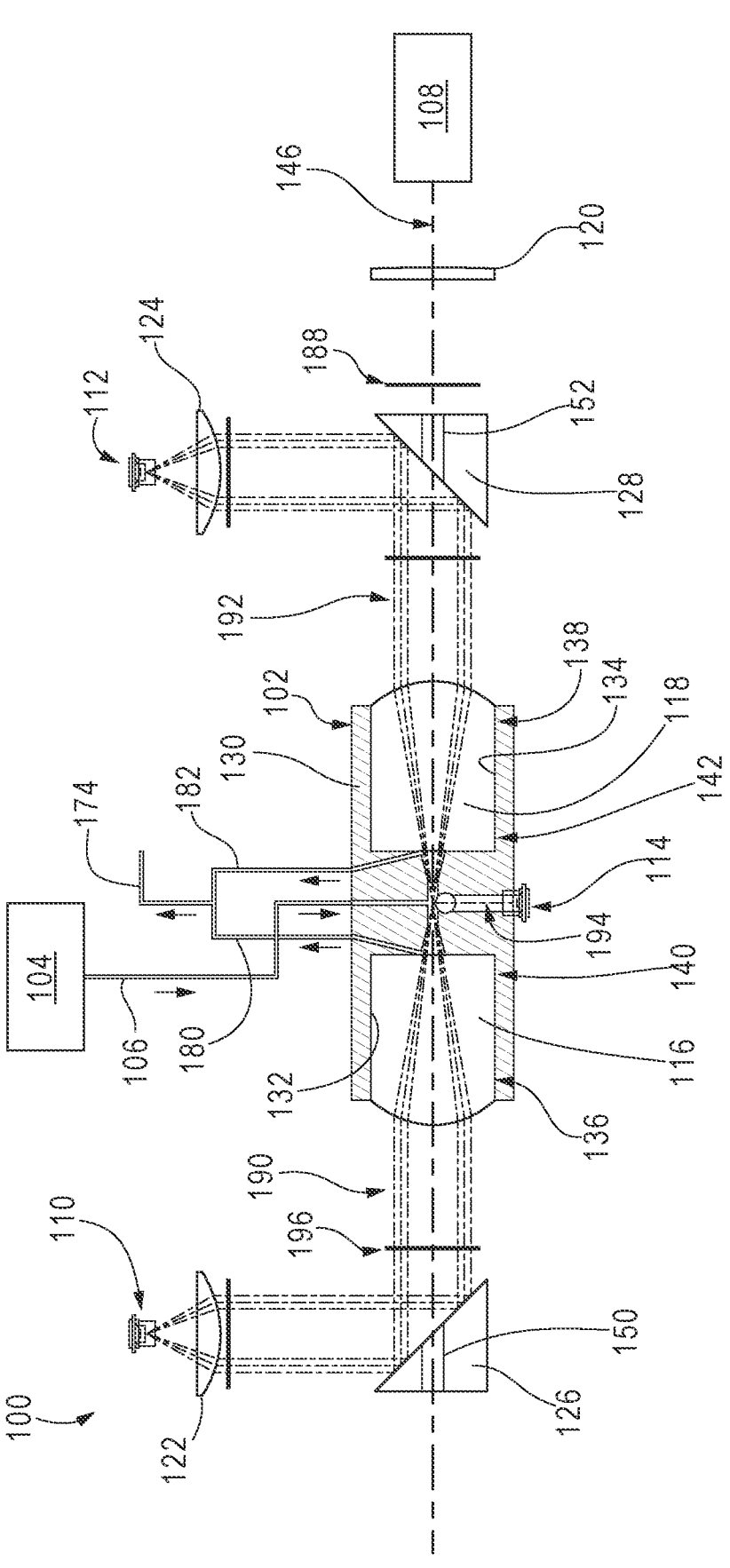
FIG. 1A illustrates a schematic view of an exemplary light scattering detector including an exemplary sample cell, according to one or more implementations disclosed.

FIG. 1A illustrates a schematic view of an exemplary light scattering detector (LSD) 100 including a sample cell 102, according to one or more implementations. The LSD 100 may be operably coupled with a sample source or device 104, and capable of or configured to receive a sample or effluent therefrom. For example, as illustrated in FIG. 1A, the LSD 100 may be fluidly coupled with the sample source or device 104 via line 106 and configured to receive the effluent therefrom. Illustrative sample sources or devices 104 may include, but are not limited to, a chromatography instrument capable of or configured to separate one or more analytes of a sample or eluent from one another. For example, the sample source or device 104 may be a liquid chromatography instrument capable of or configured to separate the analytes of the eluent from one another based on their respective charges (e.g., ion exchange chromatography), sizes (e.g., size-exclusion or gel permeation chromatography), field flow fractionation (FFF), flow injection polymer analysis (FIPA), or the like. In an exemplary implementation, the LSD 100 is operably coupled with a liquid chromatography instrument configured to separate the analytes from one another based on their respective sizes. For example, the LSD 100 is operably coupled with a liquid chromatography instrument including gel permeation chromatography columns.

The LSD 100 may include the sample cell 102, a collimated beam of light source, such as a laser 108, and one or more detectors 110, 112, 114 (three are shown) operably coupled with one another. The detectors 110, 112, 114 may be any suitable detector capable of or configured to receive analyte scattered light. For example, any one or more of the detectors 110, 112, 114 may be a photo-detector, such as a silicon photo-detector. The LSD 100 may include one or more lenses 116, 118, 120, 122, 124 (five are shown) capable of or configured to refract, focus, attenuate, and/or collect light transmitted through the LSD 100, and one or more mirrors 126, 128 (two are shown) capable of or configured to reflect or redirect the light transmitted through the LSD 100.

Figure 1B:
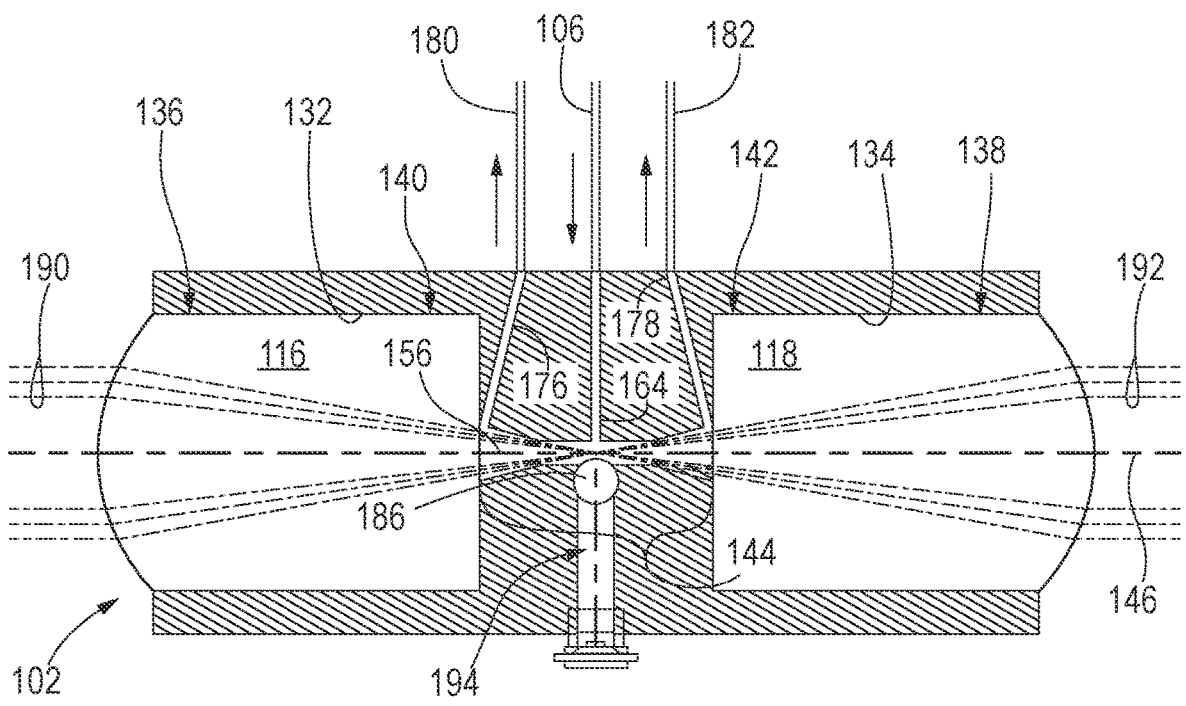
FIG. 1B illustrates a schematic view of the exemplary sample cell of FIG. 1A, according to one or more implementations disclosed.

In at least one implementation, a first lens 116 and a second lens 118 may be disposed on opposing sides or axial ends of the sample cell 102 and configured to refract, focus, attenuate, and/or collect light transmitted therethrough. In another implementation, a body 130 of the sample cell 102 may define recesses 132, 134 configured to receive the first and second lenses 116, 118. For example, as illustrated in FIG. 1A and further illustrated in detail in FIG. 1B, the body 130 of the sample cell 102 may define a first recess 132 and a second recess 134 extending longitudinally or axially therethrough, and configured to receive the first lens 116 and the second lens 118, respectively. As illustrated in FIGS. 1A and 1B, each of the first and second lenses 116, 118 may define a convex surface along respective first or outer end portions 136, 138 thereof. While the first end portions 136, 138 of the first and second lenses 116, 118 are illustrated as defining convex surfaces, it should be appreciated that any one of the respective first end portions 136, 138 of the first and second lenses 116, 118 may alternatively define a flat surface. As further illustrated in FIG. 1A, each of the first and second lenses 116, 118 may define a flat surface along respective second or inner end portions 140, 142 thereof. As further described herein, the respective second end portions 140, 142 of the first and second lenses 116, 118 may seal and/or at least partially define a channel or flowpath 144 extending through the sample cell 102.

The laser 108 may be any suitable laser capable of or configured to provide a beam of light 146 having sufficient wavelength and/or power. For example, the laser 108 may be a diode laser, a solid state laser, or the like. The laser 108 may be configured to emit the beam of light 146 through the sample cell 102. For example, as illustrated in FIG. 1A, the laser 108 may be arranged or disposed about the LSD 100 such that the beam of light 146 emitted therefrom is transmitted through the sample cell 102. As further illustrated in FIG. 1A, a third lens 120 may be interposed between the sample cell 102 and the laser 108 and configured to focus the beam of light 146 directed to and through the sample cell 102.

In at least one implementation, at least one of the mirrors 126, 128 may be associated with a respective detector 110, 112, and configured to reflect or redirect the light (e.g., scattered light or analyte scattered light) towards the respective detector 110, 112. For example, as illustrated in FIG. 1A, a first mirror 126 may be disposed proximal the first lens 116 and configured to reflect at least a portion of the light from the first lens 116 towards a first detector 110. In another example, a second mirror 128 may be disposed proximal the second lens 118 and/or interposed between the second and third lenses 118, 120, and configured to reflect at least a portion of the light from the second lens 118 towards a second detector 112. In at least one implementation, one or more lenses 122, 124 may be interposed between the first and second mirrors 126, 128 and the first and second detectors 110, 112 to focus, refract, or otherwise direct the light from the mirrors 126, 128 to the detectors 110, 112. For example, as illustrated in FIG. 1A, a fourth lens 122 may be interposed between the first detector 110 and the first mirror 126, and a fifth lens 124 may be interposed between the second detector 112 and the second mirror 128.

In at least one implementation, at least one of the detectors 110, 112, 114 may be configured to receive the light (e.g., scattered light or analyte scattered light) from the sample cell 102 without the aid or reflection of one of the mirrors 126, 128. For example, as illustrated in FIGS. 1A and 1B, a third detector 114 may be disposed adjacent to or coupled with the sample cell 102 and configured to receive the light (e.g., scattered light) from the sample cell 102 at an angle of about 90° with respect to the beam of light 146. As further discussed herein, an optically transparent material or a sixth lens 186 may be configured to refract or direct the scattered light toward the third detector 114.

As illustrated in FIG. 1A, at least one of the sample cell 102, the first, second, and third lenses 116, 118, 120, and the first and second mirrors 126, 128 may be disposed parallel, coaxial, or otherwise aligned with one another along a direction of the beam of light 146 emitted by the laser 108. As further illustrated in FIG. 1A, each of the first and second detectors 110, 112 may be disposed or positioned to receive light (e.g., scattered light or analyte scattered light) from the respective mirrors 126, 128 in a direction generally perpendicular to the beam of light 146 emitted by the laser 108. Each of the first and second mirrors 126, 128 may define a respective bore or pathway 150, 152 extending therethrough. For example, the first mirror 126 may define a bore 150 extending therethrough in a direction parallel, coaxial, or otherwise aligned with the beam of light 146. Similarly, the second mirror 128 may define a bore 152 extending therethrough in the direction parallel, coaxial, or otherwise aligned with the beam of light 146. It should be appreciated that the bores 150, 152 extending through the respective mirrors 126, 128 may allow the beam of light 146 emitted from the laser 108 to be transmitted through the first and second mirrors 126, 128 to thereby prevent the beam of light 146 from being reflected towards the first and second detectors 110, 112.

Figure 1C:
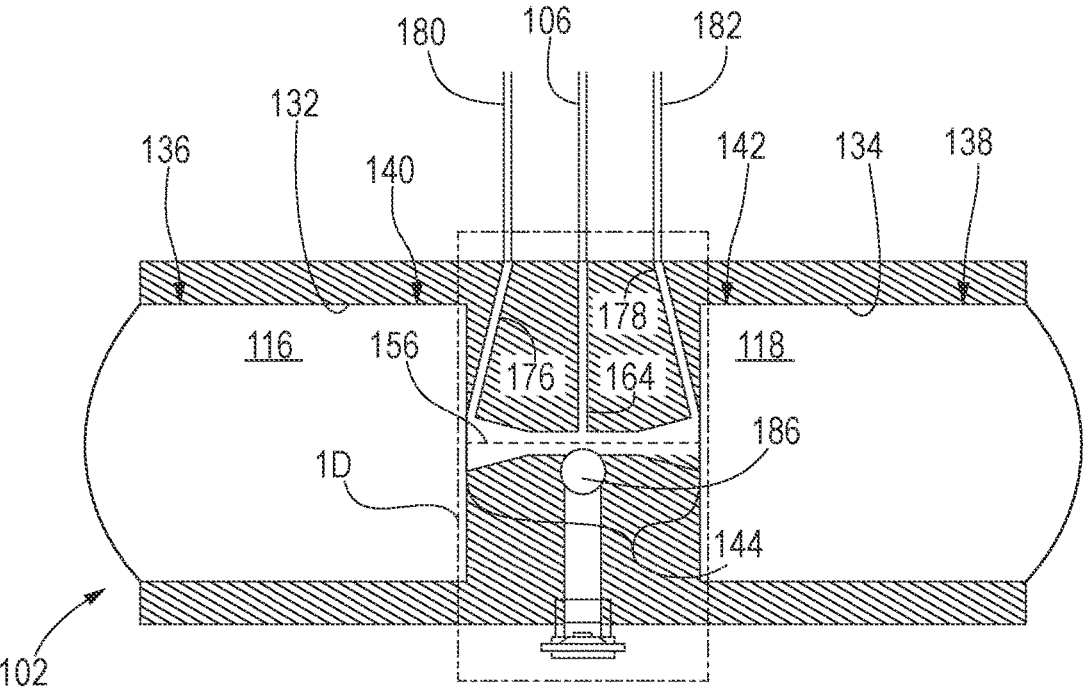
FIG. 1C illustrates the schematic view of the exemplary sample cell of FIG. 1A without the analyte scattered light, according to one or more implementations disclosed.
Figure 1D:
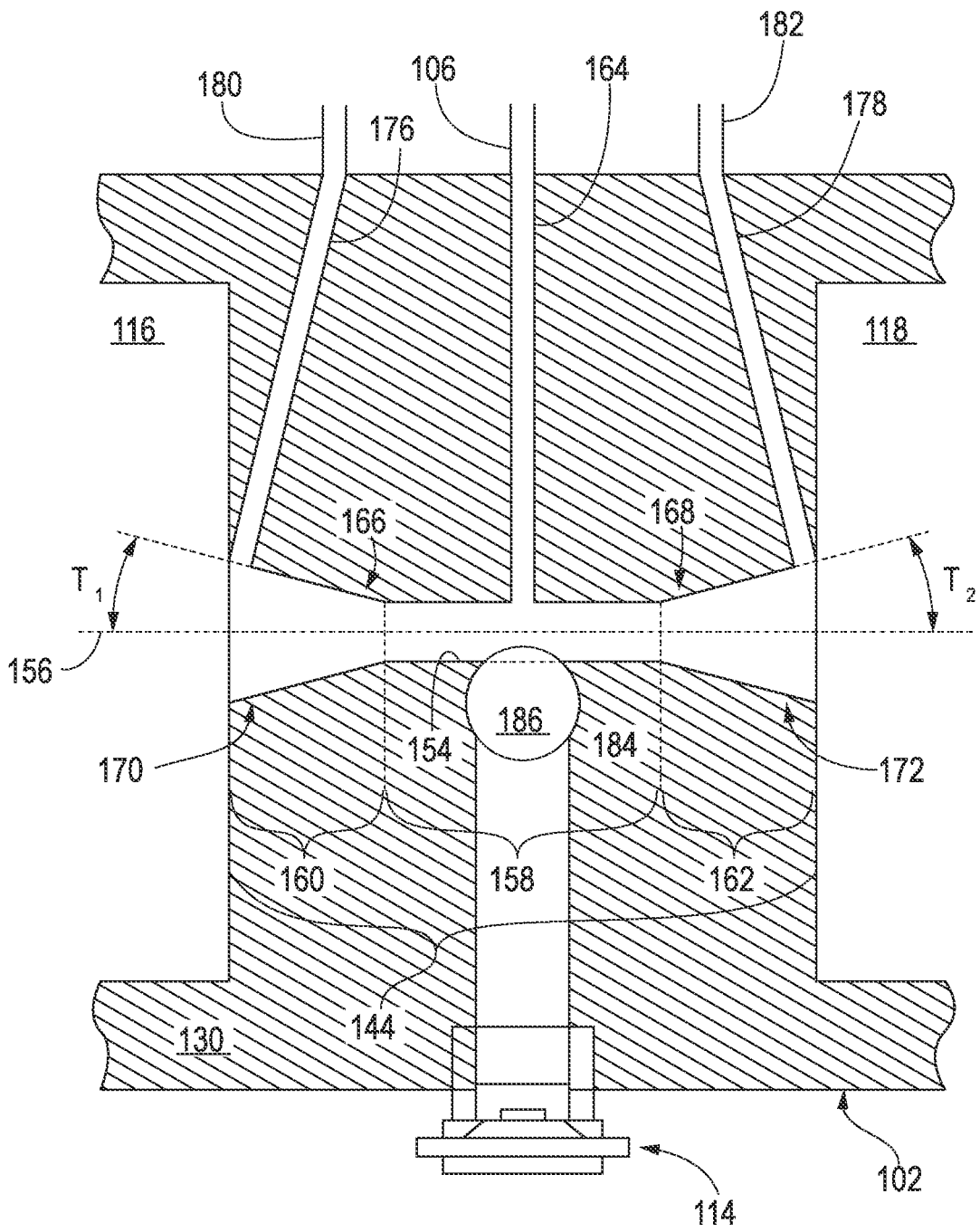
FIG. 1D illustrates an enlarged view of the portion of the sample cell indicated by the box labeled 1D in FIG. 1C, according to one or more implementations disclosed.

FIG. 1D illustrates an enlarged view of the portion of the exemplary LSD 100 indicated by the box labeled 1D of FIG. 1C, according to one or more implementations. As previously discussed, the body 130 of the sample cell 102 may at least partially define the channel or flowpath 144 extending therethrough. For example, as illustrated in FIG. 1D, an inner surface 154 of the body 130 may at least partially define the flowpath 144 extending therethrough. The flowpath 144 may define a volume of the sample cell 102. The flowpath 144 may include a central axis or centerline 156 extending therethrough and configured to define a general orientation of the flowpath 144. As illustrated in FIG. 1B, the flowpath 144 and the central axis 156 thereof may be aligned or coaxial to the beam of light 146 emitted from the laser 108. The flowpath 144 of the sample cell 102 may be interposed between the first and second lenses 116, 118. In at least one implementation, the first and second lenses 116, 118 may sealingly engage the body 130 of the sample cell 102 on opposing sides thereof to thereby prevent a flow of the sample or effluent from the flowpath 144 via the interface between the body 130 and the respective first and second lenses 116, 118. In another implementation, a seal (e.g., gasket, O-ring, etc.) (not shown) may be disposed between the body 130 and the first and second lenses 116, 118 to provide a fluid tight seal therebetween.

The flowpath 144 may include an inner section 158 and two outer sections 160, 162 disposed along the centerline 156 thereof. As illustrated in FIG. 1D, the inner section 158 may be interposed between the two outer sections 160, 162. The inner section 158 may be fluidly coupled with and configured to receive a sample or effluent from the sample source 104. For example, as illustrated in FIG. 1D with continued referenced to FIG. 1A, the body 130 of the sample cell 102 may define an inlet 164 extending therethrough and configured to fluidly couple the sample source 104 with the inner section 158 via line 106. In a preferred implementation, the inlet 164 is configured such that the sample from the sample source 104 is directed to the middle or center of the flowpath 144 or the inner section 158 thereof.

In at least one implementation, the inner section 158 may be cylindrical or define a cylindrical volume, and may have a circular cross-sectional profile. It should be appreciated, however, that the cross-sectional profile may be represented by any suitable shape and/or size. For example, the cross-sectional profile may be elliptical, rectangular, such as a rounded rectangle, or the like. The inner section 158 may have any suitable dimension. In at least one implementation, the inner section 158 may have a length extending between the two outer sections 160, 162 of from about 4 mm to about 12 mm or greater. For example, the inner section 158 may have a length of from about 4 mm, about 5 mm, about 6 mm, about 7 mm, or about 7.5 mm to about 8.5 mm, about 9 mm, about 10 mm, about 11 mm, about 12 mm, or greater. In another example, the inner section 158 may have a length of from about 4 mm to about 12 mm, about 5 mm to about 11 mm, about 6 mm to about 10 mm, about 7 mm to about 9 mm, or about 7.5 mm to about 8.5 mm. In a preferred implementation, the inner section 158 may have a length of from about 7 mm to about 9 mm, preferably about 7.5 mm to about 8.5 mm, more preferably about 8 mm. In at least one implementation, the inner section 158 may have a diameter of from about 1.2 mm to about 2.0 mm or greater. For example, the inner section 158 may have a diameter of from about 1.2 mm, about 1.3 mm, about 1.4 mm, about 1.5 mm, or about 1.55 mm to about 1.65 mm, about 1.7 mm, about 1.8 mm, about 1.9 mm, about 2.0 mm, or greater. In another example, the inner section 158 may have a diameter of from about 1.2 mm to about 2.0 mm, about 1.3 mm to about 1.9 mm, about 1.4 mm to about 1.8 mm, about 1.5 mm to about 1.7 mm, or about 1.55 mm to about 1.65 mm. In a preferred implementation, the inner section 158 may have a diameter of from about 1.5 mm to about 1.7 mm, preferably about 1.55 mm to about 1.65 mm, more preferably about 1.6 mm.

The outer sections 160, 162 of the flowpath 144 may be fluidly coupled with the inner section 158 and configured to receive the sample or effluent therefrom. In at least one implementation, at least one of the first and second outer sections 160, 162 may be cylindrical or define a cylindrical volume, and may have a circular cross-sectional profile. For example, at least one of the first and second outer sections 160, 162 may be sized and shaped similar to the inner section 158 of FIG. 1D. In another implementation, at least one of the first and second outer sections 160, 162 may be conical or frustoconical such that a cross-sectional area at a respective first end portion or inlet 166, 168 thereof may be relatively less than a cross-sectional area at a respective second end portion or outlet 170, 172 thereof. In a preferred implementation, the first and second outer sections 160, 162 may both be frustoconical or define a frustum, where the respective first end portions or inlets 166, 168 are configured to receive the sample from the inner section 158, and the respective second end portions or outlets 170, 172 are configured to deliver the sample to a waste line 174 (see FIG. 1A).

The inner surface 154 of the body 130 may at least partially define respective taper angles ($T_1$, $T_2$) of the first outer section 160 and the second outer section 162. For example, as illustrated in FIG. 1D, the portion of the inner surface 154 defining or forming the first outer section 160 of the flowpath 144 and the centerline 156 of the flowpath 144 may define the respective taper angle ($T_1$) of the first outer section 160. In another example, the portion of the inner surface 154 defining or forming the second outer section 162 of the flowpath 144 and the centerline 156 of the flowpath 144 may define the respective taper angle ($T_2$) of the second outer section 162. The first and second outer sections 160, 162 may have any taper angles ($T_1$, $T_2$) capable of or configured to allow the LSD 100 and the detectors 110, 112, 114 thereof to receive scattered light at any desired angle. While FIG. 1D illustrates the taper angles ($T_1$, $T_2$) of the first and second outer sections 160, 162 to be relatively equal to one another, it should be appreciated that one of the taper angles ($T_1$, $T_2$) may be relatively greater than the other. It should further be appreciated that than any one or more attributes (e.g., length, taper angle, diameter, shape, size, etc.) of the first and second outer sections 160, 162 may be different. In a preferred implementation, the attributes (e.g., length, taper angle, diameter, shape, size, etc.) of the first outer section 160 and the second outer section 162 are the same or substantially the same.

Each of the outer sections 160, 162 may be fluidly coupled with the waste line 174 (see FIG. 1A). For example, as illustrated in FIGS. 1A and 1D, the body 130 may define a first outlet 176 and a second outlet 178 extending therethrough and configured to fluidly couple the first outer section 160 and the second outer section 162 with the waste line 174 via a first outlet line 180 and a second outlet line 182, respectively. As further illustrated in FIG. 1D, the first and second outlets 176, 178 may be fluidly coupled with the respective second end portions 170, 172 of the outer sections 160, 162. It should be appreciated that the orientation (e.g., circumferential orientation) or location of the inlet 164 and the first and second outlets 176, 178 may vary. For example, the inlet 164 may be circumferentially aligned with at least one of the first and second outlets 176, 178. In another example, the inlet 164 may be circumferentially offset from at least one of the first and second outlets 176, 178. In yet another example, the first and second outlets 176, 178 may be circumferentially aligned with one another or circumferentially offset from one another.

As illustrated in FIG. 1D, the body 130 of the sample cell 102 may define an aperture 184 extending through at least a portion thereof, and configured to allow light (e.g., scattered light) from the inner section 158 to be directed or transmitted to the third detector 114. The aperture 184 may be sealed with an optically transparent material 186, such as a quartz crystal, to thereby allow the light from the inner section 158 to be directed to the third detector 114. In an exemplary implementation, illustrated in FIGS. 1B and 1D, the optically transparent material 186 may be shaped to refract a portion of the light towards the third detector 114. For example, the optically transparent material 186 may be the sixth lens (e.g., a ball lens) configured to seal the aperture 184 and at least partially refract the light towards the third detector 114.

The body 130 may include or be fabricated from any suitable material. The body 130 may be configured such that the inner surface 154 thereof attenuates the reflection of light. For example, the body 130 may be fabricated from a non-reflective material. In another example, the body 130 may be at least partially fabricated from a reflective material and at least partially coated with a non-reflective material. In at least one implementation, the sample cell 102 may be fabricated from quartz, such as black quartz. In an exemplary implementation, the body 130 may include or be fabricated from a polymer. Illustrative polymers may be or include, but are not limited to, polyolefin-based polymers, acryl-based polymers, polyurethane-based polymers, ether-based polymers, polyester-based polymers, polyamide-based polymers, formaldehyde-based polymers, silicon-based polymers, any copolymers thereof, or any combination thereof. For example, the polymers may include, but are not limited to, poly(ether ether ketone) (PEEK), TORLON®, polyamide-imides, polyethylene (PE), polyvinyl fluoride (PVF), polyvinyl chloride (PVC), polyvinylidene fluoride (PVDF), polyvinylidene chloride (PVDC), polychlorotrifluoroethylene (PCTFE), polytetrafluoroethylene (PTFE), polypropylene (PP), poly(1-butene), poly(4-methylpentene), polystyrene, polyvinyl pyridine, polybutadiene, polyisoprene, polychloroprene, styrene-acrylonitrile copolymer, acrylonitrile-butadiene-styrene terpolymer, ethylene-methacrylic acid copolymer, styrene-butadiene rubber, tetrafluoroethylene copolymer, polyacrylate, polymethacrylate, polyacrylamide, polyvinyl acetate, polyvinyl alcohol, polyvinyl butyral, polyvinyl ether, polyvinylpyrrolidone, polyvinylcarbazole, polyurethane, polyacetal, polyethylene glycol, polypropylene glycol, epoxy resins, polyphenylene oxide, polyethylene terephthalate, polybutylene terephthalate, polydihydroxymethylcyclohexyl terephthalate, cellulose esters, polycarbonate, polyamide, polyimide, any copolymers thereof, or any combination thereof. The polymers may be or include, but are not limited to, elastomers or elastomeric materials, synthetic rubber, or the like. Illustrative elastomeric materials and synthetic rubbers may include, but are not limited to, VITON®, nitrile, polybutadiene, acrylonitrile, polyisoprene, neoprene, butyl rubber, chloroprene, polysiloxane, styrene-butadiene rubber, hydrin rubber, silicone rubber, ethylene-propylene-diene terpolymers, any copolymers thereof, or any combination thereof.

In an exemplary operation of the LSD 100, with continued reference to FIGS. 1A-1D, the sample source 104 (e.g., a liquid chromatograph including a gel permeation chromatography column) may inject or direct the sample or effluent (e.g., dilute particle and/or polymer solution) to and through the flowpath 144 of the sample cell 102 via line 106 and the inlet 164. As illustrated in FIG. 1D, the sample from the sample source 104 may be directed toward a center or middle of the flowpath 144 and/or the inner section 158 of the sample cell 102. As the sample flows to the center of the inner section 158, the flow of the sample may split such that a first portion of the sample flows towards the first outer section 160, and a second portion of the sample flows towards the second outer section 162. The portions of the sample in the first and second outer sections 160, 162 may then be directed out of the sample cell 102 and to the waste line 174 via the first and second outlets 176, 178 and the first and second outlet lines 180, 182, respectively.

The rate of flow of the sample through the first outer section 160 and the second outer section 162 may be modified or adjusted (i.e., increased or decreased) by adjusting the respective lengths of the first outlet line 180 and the second outlet line 182. In at least one implementation, a rate of flow of the first and second portions of the sample through the first and second outer sections 160, 162 may be the same or substantially the same. For example, the rate of flow of the first portion of the sample through the first outer section 160 is the same or substantially the same as the rate of flow of the second portion of the sample through the second outer section 162. In another implementation, the rate of flow of the first and second portions of the sample through the first and second outer sections 160, 162 may be different. It should be appreciated, however, that a time correction may be applied if the rate of flow is different through the first and second outer sections 160, 162.

As the sample flows through the flowpath 144 of the sample cell 102, the laser 108 may emit the beam of light 146 along and through the centerline 156 of the flowpath 144 via the bore 152 of the second mirror 128. In at least one implementation, illustrated in FIG. 1A, the beam of light 146 may be transmitted through the third lens 120, which may at least partially focus the beam of light 146 along the centerline 156 of the flowpath 144. In another implementation, the third lens 120 may be omitted. In at least one implementation, an optional screen or diaphragm 188 may be disposed between the laser 108 and the sample cell 102, and configured to "cleanup," segregate, or otherwise filter stray light (e.g., a halo of light) from the beam of light 146. For example, the diaphragm 188 may define a hole or aperture (e.g., an adjustable aperture/iris) capable of or configured to filter out stray light from the beam of light 146.

At least a portion of the beam of light 146 may travel or be transmitted from the laser 108 to and through the sample cell 102, the first lens 116, the bore 152 of the second mirror 128, and/or a diaphragm 196. For example, at least a portion of the beam of light 146 may be transmitted unhindered or without interacting with any of the analytes in the sample from the laser 108 to and through the sample cell 102, the first lens 116, the bore 152 of the second mirror 128, and/or the optional diaphragm 188. The remaining portion of the beam of light 146 transmitted through the flowpath 144 may interact or otherwise contact analytes suspended, dispersed, or otherwise disposed in the sample and/or flowing through the sample cell 102.

The contact between the beam of light 146 and the analytes in the sample may generate or induce scattered light or analyte scattered beams 190, 192, 194 (see FIGS. 1A and 1B). For example, contact between the beam of light 146 and the analytes contained in the sample or flowing through the flowpath 144 of the sample cell 102 may generate forward and back analyte scattered beams 190, 192. The forward analyte scattered beams 190 may be referred to as low angle light scattering (LALS). The back analyte scattered beams 192 may be referred to as high angle light scattering (HALS). In another example, contact between the beam of light 146 and the analytes contained in the sample or flowing through the flowpath 144 of the sample cell 102 may generate right angle (e.g., about 90° relative to the centerline 156) scattered beams 194 in a direction generally perpendicular to the beam of light 146. The right angle scattered beams 194 may be referred to as right angle light scattering (RALS).

It should be appreciated that the flow of the sample to the center of the flowpath 144 via the inlet 164 allows the sample to interact immediately with the beam of light 146, thereby minimizing peak broadening. For example, flowing the sample directly to the center of the flowpath 144 allows the sample to interact with the beam of light 146 without flowing through at least half the length or volume of the sample cell 102 (e.g., in a lateral or axial direction) and the flowpath 144 thereof. Flowing the sample directly to the center of the flowpath 144 also minimizes the amount of time necessary for the sample to interact with the beam of light 146 and generate the analyte scattered beams 190, 192, 194. It should further be appreciated that one or more components of the LSD 100 are configured such that only light scattered from the center of the flowpath 144 are collected by the detectors 110, 112, 114. For example, at least one of the first lens 116, the first mirror, and the fourth lens 122 may be configured to segregate forward light scattering 190 that originates from the center of the flowpath 144 from forward light scattering 190 that originates from other regions of the flowpath 144, such that the first detector 110 only receives forward light scattering 190 that originates from the center of the flowpath 144. Similarly, at least one of the second lens 116, the second mirror 128, and the fifth lens 124 may be configured to segregate back light scattering 192 that originates from the center of the flowpath 144 from back light scattering 192 that originates from other regions of the flowpath 144, such that the second detector 112 only receives back light scattering 192 that originates from the center of the flowpath 144.

It should be appreciated that while in at least one implementation, the sample may flow through the flowpath 144 of the sample cell 102 in a "flow mode." as described above, in another implementation, the sample may be evaluated or analyzed via a "batch mode." In at least one exemplary operation of the LSD 100 operating in a "batch mode," the sample may be disposed in a sample cell, such as a cuvette, without an inlet and/or outlet flow. In another exemplary operation of the LSD 100 operating in a "batch mode," the sample may be disposed (e.g., via pipette or other manual device) into the sample cell 102 without inlet and outlet flow. In yet another exemplary operation, the sample may be disposed into the inlet 164 of the sample cell 102 such that the sample is not separated. For example, the sample may be disposed directly into the inlet 164 without separation via a column, or with a non-separating column (e.g., via flow injection polymer analysis). In each of the aforementioned operations, the laser 108 may emit the beam of light 146 along and through the centerline 156 of the sample cell (e.g., a cuvette). In at least one implementation, the beam of light 146 may be transmitted through the third lens 120, which may at least partially focus the beam of light 146. In another implementation, the third lens 120 may be omitted. In at least one implementation, an optional screen or diaphragm 188 may be disposed between the laser 108 and the sample cell (e.g., a cuvette), and configured to "cleanup," segregate, or otherwise filter stray light (e.g., a halo of light) from the beam of light 146. For example, the diaphragm 188 may define a hole or aperture (e.g., an adjustable aperture/iris) capable of or configured to filter out stray light from the beam of light 146.

As illustrated in FIG. 1A, the forward analyte scattered beams or forward scattered light 190 may be directed towards the first detector 110 via the first lens 116, the first mirror 126, and the fourth lens 122. At least a portion of the forward scattered light 190 may be at least partially refracted by the convex surface defined along the first end portion 136 of the first lens 116. As illustrated in FIG. 1A, the forward scattered light 190 may be refracted by the convex surface toward the first mirror 126, and the first mirror 126 may reflect the forward scattered light 190 toward the first detector 110 via the fourth lens 122. The fourth lens 122 may collect the forward scattered light 190, and direct and/or focus the forward scattered light 190 toward the first detector 110.

The forward scattered light 190 (LALS) may be scattered at varying angles of from greater than 0° to less than 90°, relative to the beam of light 146 emitted from the laser 108 and/or the centerline 156 of the flowpath 144. For example, the forward scattered light 190 may be scattered at any angle of from greater than 0°, about 5°, about 10°, about 15°, about 20°, about 25°, about 30°, about 35°, about 40°, or about 45° to about 50°, about 55°, about 60°, about 65°, about 70°, about 75°, about 80°, about 85°, or less than 90°. In another example, the forward scattered light 190 may be scattered at any angle of from about 5°, about 6°, about 7°, about 8°, about 9°, or about 9.5° to about 10.5°, about 11°, about 12°, about 13°, about 14°, or about 15°, relative to the beam of light 146 emitted from the laser 108 and/or the centerline 156 of the flowpath 144. In yet another example, the forward scattered light 190 may be scattered at an angle of from about 5° to about 15°, about 6° to about 14°, about 7° to about 13°, about 8° to about 12°, about 9° to about 11°, or about 9.5° to about 10.5°. It should be appreciated that the LSD 100 and any component thereof may be configured to receive the forward scattered light 190 scattered at any angle greater than 0° and less than 90°. For example, any one or more attributes (e.g., shape, location, orientation, etc.) of the first detector 110, the first lens 116, the first mirror 126, the fourth lens 122, and/or any additional optional diaphragms may be adjusted, modified, or otherwise configured such that the first detector 110 may receive any of the forward scattered light 190. In a preferred implementation, the LSD 100 and the first detector 110 thereof is configured to receive or collect the forward scattered light 190 at an angle of from about 9° to about 11°, preferably about 9.5° to about 10.5°, and more preferably at an angle of about 10°, relative to the beam of light 146 and/or the centerline 156 of the flowpath 144. It should be appreciated that the forward scattered light 190 may be scattered at 360° minus (−) any of the aforementioned angles.

As illustrated in FIG. 1A, the back analyte scattered beams or back scattered light 192 may be directed towards the second detector 112 via the second lens 118, the second mirror 128, and the fifth lens 124. At least a portion of the back scattered light 192 may be at least partially refracted by the convex surface of the second lens 118. As illustrated in FIG. 1A, the back scattered light 192 may be refracted by the convex surface toward the second mirror 128, and the second mirror 128 may reflect the back scattered light 192 toward the second detector 112 via the fifth lens 124. The fifth lens 124 may collect the back scattered light 192, and direct and/or focus the back scattered light 192 toward the second detector 112.

The back scattered light 192 (HALS) may be scattered at varying angles of from greater than 90° to less than 180°, relative to the beam of light 146 emitted from the laser 108 and/or the centerline 156 of the flowpath 144. For example, the back scattered light 192 may be scattered at any angle of from greater than 90°, about 95°, about 100°, about 105°, about 110°, about 115°, about 120°, about 125°, about 130°, or about 135° to about 140°, about 145°, about 150°, about 155°, about 160°, about 165°, about 170°, about 175°, or less than 180°. In another example, the back scattered light 192 may be scattered at any angle of from about 165°, about 166°, about 167°, about 168°, about 169°, or about 169.5° to about 170.5°, about 171°, about 172°, about 173°, about 174°, or about 175°, relative to the beam of light 146 emitted from the laser 108 and/or the centerline 156 of the flowpath 144. In yet another example, the back scattered light 192 may be scattered at an angle of from about 165° to about 175°, about 166° to about 174°, about 167° to about 173°, about 168° to about 172°, about 169° to about 171°, or about 169.5° to about 170.5°. It should be appreciated that the LSD 100 and any component thereof may be configured to receive the back scattered light 192 scattered at any angle greater than 90° and less than 180°. For example, any one or more attributes (e.g., shape, location, orientation, etc.) of the second detector 112, the second lens 118, the second mirror 128, the fifth lens 124, and/or any additional optional diaphragms may be adjusted, modified, or otherwise configured such that the second detector 112 may receive any of the back scattered light 192. In a preferred implementation, the LSD 100 and the second detector 112 thereof is configured to receive or collect the back scattered light 192 at an angle of from about 169° to about 171°, preferably about 169.5° to about 170.5°, and more preferably at an angle of about 170°, relative to the beam of light 146 and/or the centerline 156 of the flowpath 144. It should be appreciated that the back scattered light 192 may be scattered at 360° minus (−) any of the aforementioned angles.

As illustrated in FIG. 1D, the right angle analyte scattered beams or right angle scattered light 194 may be directed towards the third detector 114 via the aperture 184 extending between the third detector 114 and the inner section 158 of the flowpath 144. In at least one implementation, the third detector 114 may be disposed in the aperture 184 adjacent the inner section 158. In another implementation, illustrated in FIG. 1D, the optically transparent material 186 may be disposed in the aperture 184 to seal the inner section 158 of the flowpath 144. The optically transparent material 186 may be any suitable material capable of allowing the right angle scattered light 194 to be transmitted to the third detector 114. The optically transparent material 186 may be shaped to refract at least a portion of the right angle scattered light 194 toward the third detector 114. For example, as previously discussed, the optically transparent material 186 may be a ball lens shaped to refract the right angle scattered light 194 toward the third detector 114.

The right angle scattered light 194 (RALS) may be scattered in a direction generally perpendicular to the beam of light 146 and/or the centerline 156 of the flowpath 144. For example, the right angle scattered light 194 may be scattered at an angle of from about 87°, about 88°, about 89°, about 89.5°, or about 90° to about 90.5°, about 91°, about 92°, or about 93°. In another example, the right angle scattered light 194 may be scattered at an angle of from about 87° to about 93°, about 88° to about 92°, about 89° to about 91°, or about 89.5° to about 90.5°. It should be appreciated that the LSD 100 and any component thereof may be configured to receive the right angle scattered light 194 scattered in a direction generally perpendicular to the beam of light 146 and/or the centerline 156 of the flowpath 144. For example, the shape, location, orientation, or any other attributes of the optically transparent material 186 (e.g., the sixth lens) and/or the third detector 114 may be adjusted, modified, or otherwise configured such that the third detector 114 may receive any of the right angle scattered light 194. In a preferred implementation, the LSD 100 and the third detector 114 thereof is configured to receive or collect the right angle scattered light 194 at an angle of from about 89° to about 91°, preferably about 89.5° to about 90.5°, and more preferably at an angle of about 90°, relative to the beam of light 146 and/or the centerline 156 of the flowpath 144. It should be appreciated that the right angle scattered light 194 may be scattered at any of the aforementioned angles plus (+) 180°.

In at least one implementation, the LSD 100 may be capable of or configured to receive, analyze, collect, and/or otherwise measure light scattering at one or more of the following angles: 12°, 20°, 22.5°, 28°, 32°, 36°, 38°, 44°, 50°, 52°, 57°, 60°, 64°, 68°, 72°, 76°, 81°, 84°, 90°, 99°, 100°, 108°, 116°, 117°, 124°, 126°, 132°, 134°, 140°, 141°, 147°, 148°, 156°, 164°, or any combination thereof. It should be appreciated that any one or more of the angles disclosed herein, such as the aforementioned angles, may be adjusted and/or modified. It should further be appreciated that the adjusting and/or modification of the one or more angles may be at least partially dependent on a refractive index of the cell, a refractive index of a solvent, or combinations thereof. In at least one implementation, no adjustment or modification of the angles is needed.

Methods for Determining a Radius of Gyration or Assumption-Free Radius of Gyration The present disclosure may provide methods for determining one or more properties of a particle and/or particles in a solution using a light scattering detector. For example, the present disclosure may provide a method for determining a radius of gyration (Rg) of a particle and/or particles (e.g., nanoparticle, microparticle, etc.) in solution using a light scattering detector, such as the LSD 100 disclosed herein. For example, the present disclosure may provide methods for determining an assumption-free radius of gyration ($Rg_{AF}$) of particles in a solution by analyzing data (e.g., via an electronic processor or computer system) from the light scattering detector (e.g., the LSD 100).

While reference may be made to the LSD 100 and the components thereof described herein, it should be appreciated that the methods for determining the assumption-free radius of gyration (Rg) may be conducted or performed with any suitable light scattering detector. For example, it should be appreciated that any multi-angle light scattering detector or any light scattering detector capable of or configured to observe light scattering for at least two or more angles (e.g., at least two, three, or more angles) may utilize the methods disclosed herein. For example, a light scattering detector capable of or configured to observe light scattering for or with at least three angles, such as the LSD 100 described above, may be utilized for the methods disclosed herein. In another example, a light scattering detector including a goniometer capable of or configured to observe light scattering for at least two or more angles may utilize the methods disclosed herein. The methods disclosed herein are also not limited to measuring each of the two or more angles at the same or substantially the same time. For example, a light scattering detector capable of or configured to measure a first angle and subsequently measure a second or subsequent angle (e.g., via a goniometer) may utilize the methods disclosed herein. In addition to the foregoing, while the methods disclosed herein may be discussed with reference to three angles ($\theta_1$, $\theta_2$, $\theta_3$), it should be appreciated that utilizing additional angles is contemplated and within the scope of the disclosure. Further, one having ordinary skill in the art would understand that increasing the number of angles utilized may improve accuracy of the results. However, it should be appreciated that increasing the number of angles may only provide minimal improvement with respect to accuracy. For example, the accuracy of the results may be at least partially dependent on a respective quality of each of the angles. The quality of each of the angles may be at least partially dependent on one or more variables, including, but not limited to, signal to noise, the position of any respective angle, or combinations thereof.

As used herein, the term or expression "assumption-free radius of gyration (Rg)," or the like, may refer to the radius of gyration (Rg) derived or determined from light scattering (e.g., multi-angle light scattering) and two or more form factors. For example, the term or expression "assumption-free radius of gyration (Rg)" may refer to the radius of gyration (Rg) from or derived from a slope at zero angle of multi-angle light scattering measurements, such as a constrained extrapolation of normalized excess scattering, as a composite result of two or more form factors that are blended (e.g., mathematically blended) to determine a composite average molecular shape and/or size that may be represented by one or more of the respective form factors. In another example, "assumption-free radius of gyration (Rg)" may refer to the radius of gyration (Rg) derived from multi-angle light scattering and two or more form factors employing a weighting factor to produce a simultaneous composite extrapolation for molecular weight (MW), radius of gyration (Rg) at zero angle, or combinations thereof. The assumption-free radius of gyration (Rg)" may refer to the radius of gyration (Rg) and/or molecular weight (MW) derived from multi-angle light scattering and two or more form factors while not fitting a Zimm, Berry, Debye, or Guinier plot to a polynomial function. For example, the assumption-free radius of gyration (Rg) may be determined without fitting a Zimm plot, a Berry plot, a Debye plot, a Guinier plot, or combinations thereof, to a polynomial function.

The method for determining the Rg of the particle in solution using a light scattering detector may include disposing the particles in solution in a sample cell, such as the sample cell 102 of the LSD 100. For example, the method may include passing or flowing the particles in solution through a flowpath 144 in the sample cell 102 of the LSD 100, wherein the centerline 156 of the flowpath 144 is aligned with the beam of light 146 of the LSD 100. In another example, the particles in solution may be disposed in a sample cell (e.g., cuvette), and not flowed through a flowpath in the sample cell.

The particle or particles in solution may be or include, but are not limited to, nanoparticles, microparticles, macroparticles, macromolecules, crosslinked molecules, natural particles, synthetic particles, polymeric particles, particles having multi-component structures, proteins, antibodies, virus-like particles (VLPs), particles or molecules containing structures or features that may be at least partially represented by or that are rod-like, spherical, hollow, toroidal, disk-like, cylindrical, worm-like, coiled, stiff chains, regular, and/or randomly dispersed throughout the respective particles or molecules, or the like, or combinations thereof, and/or aggregates thereof. The particle or particles may be or include rigid particles, semi-rigid particles, or combinations thereof. Illustrative multi-component structures may be or include, but are not limited to, copolymers with random or regular incorporation, comb-branched macromolecules, or long-chain branched macromolecules or polymer blends with mixtures of structures, such as rings, coils, and rods, individual molecules that contain a mixture of these structural elements, or combinations thereof.

The particle or particles may have respective radius or radii of gyration (Rg) of from about 1 nm to about 1 μm. For example, the particle or particles may have respective radii of gyration (Rg) of from about 1 nm, about 5 nm, about 20 nm, about 30 nm, about 50 nm, or about 100 nm to about 150 nm, about 200 nm, about 250 nm, about 300 nm, about 400 nm, about 500 nm, about 600 nm, about 800 nm, or about 1 μm. In an exemplary implementation, the particle or particles may have respective radii of gyration (Rg) of from about 5 nm to about 500 nm, about 30 to about 250 nm, or about 50 to about 150 nm.

The particle or particles in solution may be dissolved in the solution, suspended in the solution, or otherwise disposed in the solution. In at least one implementation, the particles in solution may be disposed in a mobile phase. The particles in solution may be monodispersed particles. For example, the particles in the solution may have substantially the same molecular weight. The particles in solution may also be polydispersed particles. For example, the particles in the solution may have substantially different molecular weights. In at least one implementation, the particles in solution may be homogenous. For example, the particles in solution may be substantially the same with respect to one or more properties. In another implementation, the particles in solution may be heterogenous. For example, the particles in solution may be substantially different with respect to one or more properties. Illustrative properties of the particles may be or include, but are not limited to, molecular weight, structure, chemical composition, shape, molecular conformation, size, viscosity, diffusion rate, or the like, including statistically-averaged properties thereof, or combinations thereof.

In at least one implementation, the particle or particles in solution may be provided by one or more liquid separation processes or devices capable of or configured to receive a bulk liquid phase and separate one or more particles or analytes of the bulk phase from one another. For example, the particle or particles in solution may be provided by the sample source or device 104 capable of or configured to perform the liquid separation process, as illustrated in FIG. 1A. Illustrative liquid separation processes may be or include, but are not limited to, size-exclusion chromatography (SEC), gel permeation chromatography (GPC), field-flow fractionation (FFF), temperature-gradient interaction chromatography (TGIC), temperature-rising elution fractionation (TREF), crystallization elution fractionation (CEF), two-dimensional liquid chromatography (2D-LC), hydrodynamic chromatography (HDC), capillary electrokinetic chromatography (CEC), supercritical fluid chromatography (SFC), crystallization fractionation (CRYSTAF), liquid chromatography at the critical condition (LCCC), gradient polymer elution chromatography (GPEC), phase fluctuation chromatography (PFC), or the like, or combinations thereof.

The method may include obtaining a respective scattering intensity ($I_\theta$) of the particles in solution with the beam of light of the light scattering detector at each of the two or more angles ($\theta$). For example, the method may include obtaining a first scattering intensity ($I_{\theta 1}$), a second scattering intensity ($I_{\theta 2}$), and a third scattering intensity ($I_{\theta 3}$) of the particles in solution with the beam of light of the light scattering detector at a first angle ($\theta_1$), a second angle ($\theta_2$), and a third angle ($\theta_3$), respectively, where each of the angles ($\theta_1$, $\theta_2$, $\theta_3$) are relative to the beam of light 146. It should be appreciated that the first scattering intensity ($I_{\theta 1}$), the second scattering intensity ($I_{\theta 2}$), and the third scattering intensity ($I_{\theta 3}$) may be excess scattering intensities. It should further be appreciated that the respective excess scattering intensities at each of the first, second, and third angles may be normalized for quantum efficiency, gains, geometric volume, or combinations thereof. For example, the method may include normalizing one or more angles of the light scattering detector or determining an angular normalization factor for the one or more angles of the light scattering detector. Determining the angular normalization factor for one or more angles of the LSD 100 may be performed to account for scattering volume differences of the LSD 100 or varying sensitivities of any one or more of the detectors of the LSD, such as detectors 110, 112, 114 of the LSD 100.

In at least one implementation, obtaining the respective scattering intensity ($I_\theta$) of the particles in solution with the beam of light of the light scattering detector at each of the two or more angles ($\theta$) may include obtaining the respective scattering intensity ($I_\theta$) at two or more of the following angles: 22.5°, 28.0°, 32.0°, 38.0°, 44.0°, 50.0°, 57.0°, 64.0°, 72.0°, 81.0°, 90.0°, 99.0°, 108.0°, 117.0°, 126.0°, 134.0°, 141.0°, 147.0°, or any combination thereof. It should be appreciated that any one or more of the angles disclosed herein, such as the aforementioned angles, may be adjusted and/or modified. It should further be appreciated that the adjusting and/or modification of the one or more angles may be at least partially dependent on a refractive index of the cell, a refractive index of a solvent, or combinations thereof. In at least one implementation, no adjustment or modification of the angles is needed.

The method for determining the Rg or assumption-free Rg of the particles in solution may include utilizing at least two form factors (FF) to determine at least two respective weighting factors (FW) thereof. For example, the method may include determining a first weighting factor ($FW_1$) based on a first form factor ($FF_1$), and determining a second weighting factor ($FW_2$) based on a second form factor ($FF_2$). It should be appreciated that the method may include utilizing any number of form factors (FF) and determining the respective weighting factor (FW) of each of the form factors. For example, the method may include determining a first weight factor ($FW_1$), a second weighting factor ($FW_2$), and a third weighting factor ($FW_3$) based on a first form factor ($FF_1$), a second form factor ($FF_2$), and a third form factor ($FF_3$), respectively. It should further be appreciated that increasing the number of form factors utilized in the method may at least partially improve the Rg or the assumption-free Rg determined. For example, increasing the number of form factors utilized in the method may at least partially improve one or more of the accuracy, precision, significance, certainty, convergence, robustness, specificity and/or selectivity between structural characteristics (e.g., shapes, branches) of the particles, or the like, or combinations thereof. The method may also include determining a respective form factor contribution (FC) for each of the form factors (FF) based on the respective weighting factors (FW). For example, the method may include determining a first form factor contribution (FC 1) and a second form factor contribution ($FC_2$) for the first form factor ($FF_1$) and the second form factor ($FF_2$) based on the first weighting factor ($FW_1$) and the second weighting factor ($FW_2$), respectively. The method may also include determining the assumption-free radius of gyration (Rg) with each of the form factor contributions (FC). For example, the method may include determining the assumption-free radius of gyration (Rg) with the first and second form factor contributions ($FC_1$, $FC_2$).

In an exemplary implementation, the method for determining the Rg or assumption-free Rg of the particles in solution may include determining a first weighting factor ($FW_1$) based on a first form factor ($FF_1$), determining a second weighting factor ($FW_2$) based on a second form factor ($FF_2$), determining a first form factor contribution ($FC_1$) and a second form factor contribution ($FC_2$) for the first form factor ($FF_1$) and the second form factor ($FF_2$) based on the first weighting factor ($FW_1$) and the second weighting factor ($FW_2$), respectively, and determining the assumption-free radius of gyration (Rg) with the first and second form factor contributions ($FC_1$, $FC_2$).

As used herein, the term or expression "form factor" may refer to the scattering that results from one or more properties or structural characteristics of a particle or particles. For example, the term or expression "form factor" may refer to the expected (e.g., from Models proposed in literature or via mathematical derivation) excess normalized scattering pattern as a function of observed angle that results from one or more properties of a particle or particles. The one or more properties may be or include, but are not limited to, shape, structure, conformation, size, molecular weight, or any combination thereof. The form factor may be represented by an expression or equation. The expression or equation that represents the form factor may be a function of any one or more properties of the particle or particles. It should be appreciated that any form factor known to one of ordinary skill in the art may be utilized for the methods disclosed herein. It should further be appreciated that any form factors that may be developed or determined in the future are contemplated for use in the methods disclosed herein. Particularly, it should be appreciated that the methods disclosed herein may utilize and are not limited by any specific form factor.

Illustrative form factors may be or include, but are not limited to, respective form factors of a rigid particle, a semi-rigid particle, a polymer, an anisotropic particle with local planar geometry, an anisotropic particle with local cylindrical geometry, a solid sphere, a rod or rod-like, a wormlike geometry, a stiff chain structure, a helical structure, a brush-like structure, a bottle-brush, an ellipsoid, a core-shell particle, a prolate ellipsoid with shell of constant thickness, a cylinder, a hollow cylinder, a glucagon fibril, a particle with arbitrary shape, a polymer chain in solution, a capped cylinder, a block-copolymer micelle, a disk, a lens-shaped disc, a star polymer, a multiarm star polymer, a ribbon, such as a ribbon in solution, a hollow cylinder, an amino acid, a helical nanostructure, a random coil, a functional representation of scattered light from compactness or elongation due to charge, flow, or steric effects, or the like, or combinations thereof. Any one or more of the form factors may be for homogenous particles, heterogenous particles, monodispersed particles, and/or polydispersed particles.

The form factors for the polymers may be or include, but are not limited to, respective form factors of spheres, rods or rodlike particles, Gaussian particles, random coils, flexible polymers with gaussian statistics, polydispersed flexible polymers with Gaussian statistics, a flexible ring polymer with Gaussian statistics, a flexible self-avoiding polymer, a polydispersed flexible self-avoiding polymer, a semi-flexible polymer without self-avoidance, a semi-flexible polymer with self-avoidance, a polyelectrolyte semi-flexible polymer with self-avoidance, a star polymer with Gaussian statistics, a polydispersed star polymer with Gaussian statistics, a regular star-burst polymer (dendrimer) with Gaussian statistics, a polycondensate polymerization structure including those combining different monomers, a structural modification of a preformed polymer such as, a polysaccharide, protein, or peptide, a regular comb polymer with Gaussian statistics, an arbitrarily branched polymer with Gaussian statistics, an arbitrarily branched semi-flexible polymer, an arbitrarily branched self-avoiding polymer, a sphere with Gaussian chains attached, an ellipsoid with Gaussian chains attached, a cylinder with Gaussian chains attached, a polydisperse thin cylinder with polydisperse Gaussian chains attached to the ends, a sphere with corona of semi-flexible interacting self-avoiding chains of a corona chain, a functional representation of scattered light from compactness due to long chain or short chain branching, aggregation, cross-linking, or elongation due to charge, flow, or steric effects, or the like, or combinations thereof.

The form factor for the homogenous rigid particles may be or include, but are not limited to, respective form factors of a homogenous sphere, a spherical shell, a spherical concentric shell, particles including spherical subunits, an ellipsoid of revolution, a tri-axial ellipsoid, a cube and rectangular parallelepipedon, a truncated octahedra, a faceted sphere, a lens, a cube with terraces, a cylinder, a cylinder with an elliptical cross section, a cylinder with hemi-spherical endcaps, a cylinder with "half lens" end caps, a toroid, an infinitely thin rod, an infinitely thin circular disk, a fractal aggregate, or the like, or combinations thereof.

The form factor for the anisotropic particles with local planar geometry may be or include, but are not limited to, respective form factors of a homogenous cross-section, such as two infinitely thin planes, a layered centro symmetric cross-section, and/or a Gaussian chain attached to the surface, an infinitely thin spherical shell, an elliptical shell, a cylindrical shell, an infinitely thin disk, or the like, or combinations thereof.

The form factors for the anisotropic particle with local cylindrical geometry may be or include, but are not limited to, respective form factors of a homogenous circular cross-section, a concentric circular shell, an elliptical homogenous cross-section, an elliptical concentric shell, a Gaussian chain attached to the surface, an infinitely thin rod, a semi-flexible polymer chain with or without excluded volume, or the like.

In an exemplary implementation, determining the Rg or assumption-free Rg of the particles in solution may include utilizing at least one of the following form factors: a form factor for a random coil ($FF_{Random\ Coil}$), a form factor for a rod-like particle ($FF_{Rod}$), a form factor for a sphere ($FF_{Sphere}$), or any combination thereof. The form factor for the random coil ($FF_{Random\ Coil}$), the form factor for the rod-like particle ($FF_{Rod}$), and the form factor for the sphere ($FF_{Sphere}$), may be represented by equations (1), (2), (3), respectively:

$$P_{\theta,random\ coil} = \frac{2}{\mu^2}[e^{-\mu} + \mu - 1], \tag{1}$$

where:

$$\mu = \left(\frac{4R_g \pi n_0 \sin\frac{\theta}{2}}{\lambda_0}\right)^2;$$

$n_0$ is a refractive index of the solvent in which the particle is contained;

$\theta$ is the respective angle (e.g., about 90° or about 170°); and $\lambda_0$ is a wavelength of the beam of light;

$$P_{\theta,rod} = \frac{2}{x}\left[\int_0^x \frac{\sin u}{u}du\right] - \left(\frac{\sin(x/2)}{x/2}\right)^2, \tag{2}$$

where:

$$x = \left(\frac{4R_g\sqrt{12}\,\pi n_0 \sin\frac{\theta}{2}}{\lambda_0}\right);$$

$n_0$ is a refractive index of the solvent in which the particle is contained;

θ is the respective angle (e.g., about 90° or about 170°);
$\lambda_0$ is a wavelength of the beam of light;

$$P_{\theta,sphere} = \left(\frac{3}{x^3}[\sin x - x\cos x]\right)^2,$$ (3)

where:

$$x = \left(\frac{4R_g\sqrt{5/3}\,\pi n_0 \sin\frac{\theta}{2}}{\lambda_0}\right);$$

$n_0$ is a refractive index of the solution in which the particle is contained;

θ is the respective angle (e.g., about 90° or about 170°);
$\lambda_0$ is a wavelength of the beam of light; and
R is the radius of the Sphere=$\sqrt{5/3}$ Rg.

As used herein, the term or expression $P_{theta}$ ($P_\theta$) may refer to the ratio between the actual light scattering and the scattering that would occur off the particle. For example, the term or expression $P_{theta}$ ($P_\theta$) may refer to the ratio between the actual light scattering and the scattering that would occur off the particle at zero angle or at angle theta.

Determining Respective Weighting Factors (FW) Based on Each of the Form Factors (FF)

As discussed above, the method for determining the Rg or assumption-free Rg of the particles in solution may include utilizing at least two form factors (FF) to determine at least two respective weighting factors (FW) thereof. For example, the method may include determining a first weighting factor ($FW_1$) based on a first form factor ($FF_1$) and determining a second weighting factor ($FW_2$) based on a second form factor ($FF_2$).

As used herein, the term or expression "weighting factor" or "FW" may refer to a value or quantity related to an overall "goodness of fit" and/or inversely related to residual errors or a function of the residual errors. It should be appreciated that the weighting factor (FW) having a relatively stronger correlation may demonstrate or represent higher selectivity or normalized multiplier compared to a relatively weaker correlation.

In at least one implementation, determining the first weighting factor ($FW_1$) may include determining, based on the first form factor ($FF_1$), a ratio of a theoretical or calculated light scattering of the first angle relative to a calculated light scattering of the third angle $$(R''_{\frac{\theta 1}{\theta 3}\,Calculated\,FF1}),$$

calculated light scattering of the third angle $$(R''_{\frac{\theta 2}{\theta 3}\,Calculated\,FF1}).$$

Determining the ratio of the calculated light scattering of the first angle relative to the calculated light scattering of the third angle $$(R''_{\frac{\theta 1}{\theta 3}\,Calculated\,FF1}),$$

or the ratio of the calculated light scattering of the third angle to the calculated light scattering of the third angle $$(R''_{\frac{\theta 2}{\theta 3}\,Calculated\,FF1})$$

may include determining a calculated particle scattering factor for the first angle ($P_{\theta 1\,Calculated\,FF1}$), a calculated particle scattering factor for the second angle ($P_{\theta 2\,Calculated\,FF1}$), and a calculated particle scattering factor for the third angle ($P_{\theta 3\,Calculated\,FF1}$), each of which are determined based on the first form factor ($FF_1$).

In at least one implementation, determining the first weighting factor ($FW_1$) may also include determining a ratio of observed light scattering of the particles at a first angle relative to observed light scattering of the particles at a third angle ($R'_{\theta 1/\theta 3}$), and determining a ratio of observed light scattering of the particles at a second angle relative to observed light scattering of the particles at the third angle ($R'_{\theta 2/\theta 3}$). The ratios of the observed light scattering of the particles at the first angle relative to the observed light scattering of the particles at the third angle ($R'_{\theta 1/\theta 3}$) and the ratio of the observed light scattering of the particles at the second angle relative to the observed light scattering of the particles at the third angle ($R'_{\theta 2/\theta 3}$) may be determined with the first scattering intensity ($I_{\theta 1}$), the second scattering intensity ($I_{\theta 2}$), and the third scattering intensity ($I_{\theta 3}$) of the particles in solution as measured with the LSD at the first angle ($\theta_1$), the second angle ($\theta_2$), and the third angle ($\theta_3$), respectively.

In at least one implementation, determining the first weighting factor ($FW_1$) may also include determining a best fit of or between the ratio of the observed light scattering of the first angle relative to the observed light scattering of the third angle ($R'_{\theta 1/\theta 3}$) to the ratio of the calculated light scattering of the first angle relative to the calculated light scattering of the third angle $$(R''_{\frac{\theta 1}{\theta 3}\,Calculated\,FF1}),$$

and the ratio of the observed light scattering of the second angle relative to the observed light scattering of the third angle ($R'_{\theta 2/\theta 3}$) to the ratio of the calculated light scattering of the second angle relative to the calculated light scattering of the third angle $$(R''_{\frac{\theta 2}{\theta 3}\,Calculated\,FF1}).$$

In at least one implementation, determining the best fit of the ratio ($R'_{\theta 1/\theta 3}$) to the ratio $$(R''_{\frac{\theta 1}{\theta 3}\,Calculated\,FF1}),$$

and/or the ratio ($R'_{\theta 2/\theta 3}$) to the ratio $$(R''_{\frac{\theta 2}{\theta 3}\,Calculated\,FF1})$$

may include utilizing an optimization function capable of or configured to optimize the fit between the ratio ($R'_{\theta 1/\theta 3}$) and the ratio $$\left( R''_{\frac{\theta 1}{\theta 3} Calculated\ FF1} \right),$$

and/or the ratio $(R'_{\theta 2/\theta 3})$ and the ratio $$\left( R''_{\frac{\theta 2}{\theta 3} Calculated\ FF1} \right).$$

For example, the optimization function may be any function capable of or configured to measure a difference or discrepancy between the ratio $(R'_{\theta 1/\theta 3})$ and the ratio $$\left( R''_{\frac{\theta 1}{\theta 3} Calculated\ FF1} \right),$$

and/or between the ratio $(R'_{\theta 2/\theta 3})$ and the ratio $$\left( R''_{\frac{\theta 2}{\theta 3} Calculated\ FF1} \right),$$

and subsequently determine a minimal difference or discrepancy therebetween. In another example, the optimization function is a function (e.g., subtraction function) capable of or configured to determine a difference between the ratio $(R'_{\theta 1/\theta 3})$ and the ratio $$\left( R''_{\frac{\theta 1}{\theta 3} Calculated\ FF1} \right),$$

and between the ratio $(R'_{\theta 2/\theta 3})$ and the ratio $$\left( R''_{\frac{\theta 2}{\theta 3} Calculated\ FF1} \right),$$

and subsequently determine a minimum difference therebetween. Any optimization function suitable for, capable of, or configured to determine the best fit may be utilized. Illustrative optimization functions may be or include, but are not limited to, a minimum sum of squares residuals, a minimum of absolute sum of the residuals, convergences obtained from custom optimizers, commercially available optimizers, such as Microsoft Excel® Solver, grid search, Newton or gradient methods, or the like, or combinations thereof. It should be appreciated that the residuals may be normalized by a function related to the sampled values.

In at least one implementation, determining the best fit of the ratio $(R'_{\theta 1/\theta 3})$ and the ratio $$\left( R''_{\frac{\theta 1}{\theta 3} Calculated\ FF1} \right),$$

and/or the ratio $(R'_{\theta 2/\theta 3})$ and the ratio $$\left( R''_{\frac{\theta 2}{\theta 3} Calculated\ FF1} \right)$$

may include an iterative process. For example, utilizing the optimization function to determine the best fit between the ratio $(R'_{\theta 1/\theta 3})$ and the ratio $$\left( R''_{\frac{\theta 1}{\theta 3} Calculated\ FF1} \right),$$

and/or ratio $(R'_{\theta 2/\theta 3})$ and the ratio $$\left( R''_{\frac{\theta 2}{\theta 3}\ Calculated\ FF1} \right)$$

may include an iterative process. For example, determining the best fit of the ratio $(R'_{\theta 1/\theta 3})$ and the ratio $$\left( R''_{\frac{\theta 1}{\theta 3}\ Calculated\ FF1} \right),$$

and/or the ratio $(R'_{\theta 2/\theta 3})$ and the ratio $$\left( R''_{\frac{\theta 2}{\theta 3}\ Calculated\ FF1} \right)$$

may include iterating the first form factor $(FF_1)$ with a series of theoretical Rg values. The series of theoretical Rg values may be or include incrementally increasing values, incrementally decreasing values, random values, or combinations thereof. In at least one implementation, determining the best fit of the ratio $(R'_{\theta 1/\theta 3})$ and the ratio $$\left( R''_{\frac{\theta 1}{\theta 3}\ Calculated\ FF1} \right),$$

and/or the ratio $(R'_{\theta 2/\theta 3})$ and the ratio $$\left( R''_{\frac{\theta 2}{\theta 3}\ Calculated\ FF1} \right)$$

may include iterating values of the first form factor $(FF_1)$ starting at a predetermined or random theoretical Rg value, such as about 1 nm, and incrementally increasing or decreasing the theoretical Rg value. The theoretical Rg value may be increased or decreased at any increment, such as about 0.1 nm or about 0.01 nm. The theoretical Rg value may be increased or decreased (e.g., at increments of about 0.01 nm) until a difference between the ratio $(R'_{\theta 1/\theta 3})$ and the ratio $$\left( R''_{\frac{\theta 1}{\theta 3}\ Calculated\ FF1} \right),$$

and/or the ratio $(R'_{\theta 2/\theta 3})$ and the ratio $$\left( R''_{\frac{\theta 2}{\theta 3}\ Calculated\ FF1} \right)$$

is minimal or minimized, thereby indicating the best fit therebetween.

In at least one implementation, determining the first weighting factor $(FW_1)$ may further include determining a radius of gyration $(Rg_1)$, based on the first form factor $(FF_1)$, associated with the best fit of the ratio $(R'_{\theta 1/\theta 3})$ and the ratio $$\left(R''_{\frac{\theta 1}{\theta 3}\ Calculated\ FF1}\right),$$

and/or the ratio $(R'_{\theta 2/\theta 3})$ and the ratio $$\left(R''_{\frac{\theta 2}{\theta 3}\ Calculated\ FF1}\right).$$

Determining the radius of gyration $(Rg_1)$, based on the first form factor $(FF_1)$, associated with the best fit of the ratio $(R'_{\theta 1/\theta 3})$ and the ratio $$\left(R''_{\frac{\theta 1}{\theta 3}\ Calculated\ FF1}\right),$$

and/or the ratio $(R'_{\theta 2/\theta 3})$ and the ratio $$\left(R''_{\frac{\theta 2}{\theta 3}\ Calculated\ FF1}\right)$$

may include determining the $Rg_1$, based on the first form factor $(FF_1)$, associated with the optimization function. For example, in at least one exemplary implementation, determining the radius of gyration $(Rg_1)$ associated with the best fit may include determining the $Rg_1$, based on the first form factor $(FF_1)$, associated with a minimal sum of squares residual $(SSR_1)$ of a difference between the ratio of the observed light scattering of the first angle relative to the observed light scattering of the third angle $(R'_{\theta 1/\theta 3})$ and the ratio of the calculated light scattering of the first angle relative to the calculated light scattering of the third angle $$\left(R''_{\frac{\theta 1}{\theta 3}\ Calculated\ FF1}\right)$$

and a difference between the ratio of the observed light scattering of the second angle relative to the observed light scattering of the third angle $(R'_{\theta 2/\theta 3})$ and the ratio of the calculated light scattering of the second angle relative to the calculated light scattering of the third angle $$\left(R''_{\frac{\theta 2}{\theta 3}\ Calculated\ FF1}\right).$$

In at least one implementation, determining the first weighting factor $(FW_1)$ may include utilizing a variable or value associated with the best fit of the ratio $(R'_{\theta 1/\theta 3})$ and the ratio $$\left(R''_{\frac{\theta 1}{\theta 3}\ Calculated\ FF1}\right),$$

and/or the ratio $(R'_{\theta 2/\theta 3})$ and the ratio $$\left(R''_{\frac{\theta 2}{\theta 3}\ Calculated\ FF1}\right).$$

For example, the first weighting factor $(FW_1)$ may be determined with any suitable calculation, equation, or expression incorporating the variable or value associated with the best fit. In at least one implementation, as discussed above, the best fit may be associated with the minimal sum of squares residual $(SSR_1)$ of a difference between the ratio of the observed light scattering of the first angle relative to the observed light scattering of the third angle $(R'_{\theta 1/\theta 3})$ and the ratio of the calculated light scattering of the first angle relative to the calculated light scattering of the third angle $$\left(R''_{\frac{\theta 1}{\theta 3}Calculated\ FF1}\right)$$

and a difference between the ratio of the observed light scattering of the second angle relative to the observed light scattering of the third angle $(R'_{\theta 2/\theta 3})$ and the ratio of the calculated light scattering of the second angle relative to the calculated light scattering of the third angle $$\left(R''_{\frac{\theta 2}{\theta 3}Calculated\ FF1}\right).$$

As such, the first weighting factor $(FW_1)$ may be determined via any suitable calculation, equation, or expression utilizing the residuals, such as minimum sum of squares residual. In an exemplary implementation, the first weighting factor $(FW_1)$ may be determined according to equation (4a) as the reciprocal of sum of squares of residuals $(SSR_1)$, or equation (4b) as the reciprocal of the sum of the absolute value of the residuals $(SAR_1)$, or equation (4c), as the reciprocal of the sum of squares of residuals squared $(SSR_1)$ 2:

$$FW_1 = 1/SSR_1, \tag{4a}$$

$$FW_1 = 1/SAR_1, \tag{4b}$$

$$FW_1 = 1/SSR_1^2, \tag{4c}$$

where the $SSR_1$ may be the minimum sum of squares residual associated with the best fit according to the first form factor $(FF_1)$, and where $SSR_1$ may be normalized by a function with respect to the observed or calculated scattering ratio. For example, the $SSR_1$ may be normalized by a function with respect to the observed or calculated excess scattering ratio.

In at least one implementation, determining the second weighting factor $(FW_2)$ may include determining, based on the second form factor $(FF_2)$, a ratio of a theoretical or calculated light scattering of the first angle relative to a calculated light scattering of the third angle $$\left(R''_{\frac{\theta 1}{\theta 3}Calculated\ FF2}\right),$$

and the ratio or a calculated light scattering of the second angle relative to a calculated light scattering of the third angle $$\left(R''_{\frac{\theta 2}{\theta 3}Calculated\ FF2}\right).$$

Determining the ratio of the calculated light scattering of the first angle relative to the calculated light scattering of the third angle $$\left(R''_{\frac{\theta1}{\theta3}}{Calculated\ FF2}\right),$$

or the ratio of the calculated light scattering of the second angle relative to the calculated light scattering of the third angle $$\left(R''_{\frac{\theta2}{\theta3}}{Calculated\ FF2}\right)$$

may include determining a calculated particle scattering factor for the first angle ($P_{\theta1\ Calculated\ FF2}$), a calculated particle scattering factor for the second angle ($P_{\theta2\ Calculated\ FF2}$), and a calculated particle scattering factor for the third angle ($P_{\theta3\ Calculated\ FF2}$), each of which are determined based on the second form factor ($FF_2$).

In at least one implementation, determining the second weighting factor ($FW_2$) may also include determining a best fit of or between the ratio of the observed light scattering of the first angle relative to the observed light scattering of the third angle ($R'_{\theta1/\theta3}$) to the ratio of the calculated light scattering of the first angle relative to the calculated light scattering of the third angle $$\left(R''_{\frac{\theta1}{\theta3}}{Calculated\ FF2}\right),$$

and the ratio of the observed light scattering of the second angle relative to the observed light scattering of the third angle ($R'_{\theta2/\theta3}$) to the ratio of the calculated light scattering of the second angle relative to the calculated light scattering of the third angle $$\left(R''_{\frac{\theta2}{\theta3}}{Calculated\ FF2}\right).$$

In at least one implementation, determining the best fit of the ratio ($R'_{\theta1/\theta3}$) to the ratio $$\left(R''_{\frac{\theta1}{\theta3}}{Calculated\ FF2}\right),$$

and/or the ratio ($R'_{\theta2/\theta3}$) to the ratio $$\left(R''_{\frac{\theta2}{\theta3}}{Calculated\ FF2}\right)$$

may include utilizing an optimization function capable of or configured to optimize the fit between the ratio ($R'_{\theta1/\theta3}$) and the ratio $$\left(R''_{\frac{\theta1}{\theta3}}{Calculated\ FF2}\right),$$

and/or the ratio ($R'_{\theta2/\theta3}$) and the ratio $$\left(R''_{\frac{\theta2}{\theta3}}{Calculated\ FF2}\right).$$

For example, the optimization function may be any function capable of or configured to measure a difference or discrepancy between the ratio ($R'_{\theta1/\theta3}$) and the ratio $$\left(R''_{\frac{\theta1}{\theta3}}{Calculated\ FF2}\right),$$

and/or between the ratio ($R'_{\theta2/\theta3}$) and the ratio $$\left(R''_{\frac{\theta2}{\theta3}}{Calculated\ FF2}\right),$$

and subsequently determine a minimal difference or discrepancy. As discussed above, with respect to the first weighting factor ($FW_1$), any optimization function suitable for, capable of, or configured to determine the best fit may be utilized.

In at least one implementation, determining the best fit of the ratio ($R'_{\theta1/\theta3}$) and the ratio $$\left(R''_{\frac{\theta1}{\theta3}}{Calculated\ FF2}\right),$$

and/or the ratio ($R'_{\theta2/\theta3}$) and the ratio $$\left(R''_{\frac{\theta2}{\theta3}}{Calculated\ FF2}\right)$$

may include an iterative process. For example, utilizing the optimization function to determine the best fit between ratio ($R'_{\theta1/\theta3}$) and the ratio $$\left(R''_{\frac{\theta1}{\theta3}}{Calculated\ FF2}\right),$$

and/or the ratio ($R'_{\theta2/\theta3}$) and the ratio $$\left(R''_{\frac{\theta2}{\theta3}}{Calculated\ FF2}\right)$$

may include an iterative process. For example, determining the best fit of the ratio ($R'_{\theta1/\theta3}$) and the ratio $$\left(R''_{\frac{\theta1}{\theta3}}{Calculated\ FF2}\right),$$

and/or the ratio ($R'_{\theta2/\theta3}$) and the ratio $$\left(R''_{\frac{\theta2}{\theta3}}{Calculated\ FF2}\right)$$

may include iterating the second form factor ($FF_2$) with a series of theoretical Rg values. The series of theoretical Rg values may be or include incrementally increasing values, incrementally decreasing values, random values, or combinations thereof. In at least one implementation, determining the best fit of the ratio ($R'_{\theta1/\theta3}$) and the ratio $$\left(R''_{\frac{\theta1}{\theta3}Calculated\ FF2}\right),$$

and/or the ratio ($R'_{\theta2/\theta3}$) and the ratio $$\left(R''_{\frac{\theta2}{\theta3}Calculated\ FF2}\right)$$

may include iterating the second form factor ($FF_2$) starting at a predetermined or random theoretical Rg value, such as about 1 nm, and incrementally increasing or decreasing the theoretical Rg value. The theoretical Rg value may be increased or decreased at any increment, such as about 0.1 nm or about 0.01 nm. The theoretical Rg value may be increased or decreased until a difference between the ratio ($R'_{\theta1/\theta3}$) and the ratio $$\left(R''_{\frac{\theta1}{\theta3}Calculated\ FF2}\right),$$

and/or the ratio ($R'_{\theta2/\theta3}$) and the ratio $$\left(R''_{\frac{\theta2}{\theta3}Calculated\ FF2}\right)$$

is minimal or minimized, thereby indicating the best fit therebetween.

In at least one implementation, determining the second weighting factor ($FW_2$) may further include determining a radius of gyration ($Rg_2$), based on the second form factor ($FF_2$), associated with the best fit of the ratio ($R'_{\theta1/\theta3}$) and the ratio $$\left(R''_{\frac{\theta1}{\theta3}Calculated\ FF2}\right),$$

and/or of the ratio ($R'_{\theta2/\theta3}$) and the ratio $$\left(R''_{\frac{\theta2}{\theta3}Calculated\ FF2}\right).$$

Determining the radius of gyration ($Rg_2$), based on the second form factor ($FF_2$), associated with the best fit of the ratio ($R'_{\theta1/\theta3}$) and the ratio $$\left(R''_{\frac{\theta1}{\theta3}Calculated\ FF2}\right),$$

and/or of the ratio ($R'_{\theta2/\theta3}$) and the ratio $$\left(R''_{\frac{\theta2}{\theta3}Calculated\ FF2}\right)$$

may include determining the $Rg_2$, based on the second form factor ($FF_2$), associated with the optimization function. For example, in at least one exemplary implementation, determining the radius of gyration ($Rg_2$) associated with the best fit may include determining the $Rg_2$, based on the second form factor ($FF_2$), associated with a minimum sum of squares residual ($SSR_2$) of a difference between the ratio of the observed light scattering of the first angle relative to the observed light scattering of the third angle ($R'_{\theta1/\theta3}$) and the ratio of the calculated light scattering of the first angle relative to the calculated light scattering of the third angle $$\left(R''_{\frac{\theta1}{\theta3}Calculated\ FF2}\right)$$

and a difference between the ratio of the observed light scattering of the second angle relative to the observed light scattering of the third angle ($R'_{\theta2/\theta3}$) and the ratio of the calculated light scattering of the second angle relative to the calculated light scattering of the third angle $$\left(R''_{\frac{\theta2}{\theta3}Calculated\ FF2}\right).$$

In at least one implementation, determining the second weighting factor ($FW_2$) may include utilizing a variable or value associated with the best fit of the ratio ($R'_{\theta1/\theta3}$) and the ratio $$\left(R''_{\frac{\theta1}{\theta3}Calculated\ FF2}\right),$$

and/or of the ratio ($R'_{\theta2/\theta3}$) and the ratio $$\left(R''_{\frac{\theta2}{\theta3}Calculated\ FF2}\right).$$

For example, the second weighting factor ($FW_2$) may be determined with any suitable calculation, equation, or expression incorporating the variable or value associated with the best fit. In at least one implementation, as discussed above, the best fit may be associated with the minimum sum of squares residual ($SSR_2$) of a difference between the ratio of the observed light scattering of the first angle relative to the observed light scattering of the third angle ($R'_{\theta1/\theta3}$) and the ratio of the calculated light scattering of the first angle relative to the calculated light scattering of the third angle $$\left(R''_{\frac{\theta1}{\theta3}Calculated\ FF2}\right)$$

and a difference between the ratio of the observed light scattering of the second angle relative to the observed light scattering of the third angle ($R'_{\theta2/\theta3}$) and the ratio of the calculated light scattering of the second angle relative to the calculated light scattering of the third angle $$\left(R''_{\frac{\theta2}{\theta3}Calculated\ FF2}\right).$$

As such, the second weighting factor ($FW_2$) may be determined via any suitable calculation, equation, or expression, e.g., utilizing the minimum sum of squares residual (SSR$_2$). In an exemplary implementation, the second weighting factor (FW$_2$) may be determined according to equation (5a), (5b), or (5c):

$$FW_2 = 1/SSR_2, \quad (5a)$$

$$FW_2 = 1/SAR_2, \quad (5b)$$

$$FW_2 = 1/SSR_2^2, \quad (5c)$$

where the SSR$_2$ may be the minimum sum of squares residual associated with the best fit according to the second form factor (FF$_2$).

Determining the Respective Form Factor Contribution

As discussed above, the method for determining the Rg or assumption-free Rg of the particles in solution may include determining a respective form factor contribution (FC) for each of the form factors (FF) based on one or more of the respective weighting factors (FW). For example, the method for determining the Rg or assumption-free Rg of the particles in solution may include determining a first form factor contribution (FC$_1$) for the first form factor (FF$_1$) based on all of the weighting factors (FW), and determining a second form factor contribution (FC$_2$) for the second form factor (FF$_2$) based on all of the weighting factors (FW) (e.g., sum of each of the weighting factors). In another example, the method for determining the Rg or assumption-free Rg of the particles in solution may include determining a first form factor contribution (FC$_1$) for the first form factor (FF$_1$) based on the first weighting factor (FW$_1$) and the second weighting factor (FW$_2$), and determining a second form factor contribution (FC$_2$) for the second form factor (FF$_2$) based on the first weighting factor (FW$_1$) and the second weighting factor (FW$_2$). Said in another way, the method for determining the Rg or assumption-free Rg of the particles in solution may include determining a first form factor contribution (FC$_1$) and a second form factor contribution (FC$_2$) for the first form factor (FF$_1$) and the second form factor (FF$_2$) based on the first weighting factor (FW$_1$) and the second weighting factor (FW$_2$), respectively. As used herein, the term or expression "form factor contribution" or "FC" may refer to a quantity or value representing an assigned or determined fraction (FW) of the observed scattering (e.g., observed excess normalized scattering) represented by its individual component or respective form factor as compared to a sum of all of the observed form factors. The form factor contribution (FC) may represent a physical weight percentage or a best fit percentage (e.g., specificity) from the given convergence criteria for the weighting factors. The quantity or value of the form factor contribution (FC) may be a normalized value from 0 to 1, inclusive, which may represent a range of 0% composition to 100% composition of a given form factor structure in the composite scattering observation.

It should be appreciated that at relatively low Rg values (e.g., less than about 25 nm) the assumption-free Rg may remain accurate, but the selectivity of the respective form factor contribution or fractions of a specific or individual form factor or form factors may exhibit reduced significance, as most form factors may converge to a similar straight-line slope at the relatively low Rg values when plotted against a function of angle. For example, a 0.50:0.50 or 0.33:0.33:0.34 fractional blend may represent the inability to distinguish a preferred structure, but at the same time, may still provide or create a fit that may be constrained better than an arbitrary polynomial that might provide indeterminate Rg values from an inappropriate extrapolated slope at zero angle.

Determining the first form factor contribution (FC$_1$) and second form factor contribution (FC$_2$) for the first form factor (FF$_1$) and the second form factor (FF$_2$) based on the first weighting factor (FW$_1$) and the second weighting factor (FW$_2$), respectively, may include determining respective weighting values, fractions, amounts, or percentages in which the first and second form factors (FF$_1$, FF$_2$) contribute to the Rg or the assumption-free Rg. The respective form factor contributions (FC$_1$, FC$_2$) may be determined with any suitable calculation, equation, or expression utilizing or incorporating the first weighting factor (FW$_1$) and/or the second weighting factor (FW$_2$). In an exemplary implementation, the first form factor contribution (FC$_1$) and second form factor contribution (FC$_2$) for the first form factor (FF$_1$) and the second form factor (FF$_2$) may be determined based on the first weighting factor (FW$_1$) and the second weighting factor (FW$_2$). For example, the first and second form factor contributions (FC$_1$, FC$_2$) may be determined based on a respective value associated with the first weighting factor (FW$_1$) and the second weighting factor (FW$_2$). For example, the first and second form factor contributions (FC$_1$, FC$_2$) may be determined based on the respective minimum sum of squares residuals (SSR$_1$, SSR$_2$) associated with the first and second weighting factor (FW$_1$, FW$_2$), as discussed above with respect to Equations 4a-c and 5a-c. In an exemplary implementation, the first form factor contribution (FC$_1$) and second form factor contribution (FC$_2$) for the first form factor (FF$_1$) and the second form factor (FF$_2$) may be determined according to equations (6) and (7), respectively:

$$FC_1 = \frac{FW_1}{\sum FW_x}, \quad (6)$$

$$FC_2 = \frac{FW_2}{\sum FW_x}, \quad (7)$$

where $\sum FW_x$ is the sum of each of the weighting factors. For example, when utilizing two form factors, the first form factor contribution (FC$_1$) and second form factor contribution (FC$_2$) may be represented by equations (8) and (9), respectively:

$$FC_1 = \frac{FW_1}{FW_1 + FW_x}, \quad (8)$$

$$FC_2 = \frac{FW_2}{FW_1 + FW_x}. \quad (9)$$

In at least one implementation, the respective form factor contributions (FC) of each of the form factors may be evaluated or utilized to determine one or more features, structures, subdivisions of structural features, sub-structures, or combinations thereof of the particles in solution. For example, many particles may not be well or fully represented by a single or pure form factor. Instead, many particles may be at least partially represented by at least two or more form factors. For example, highly branched particles, such as dextrans, include a combination of structural features or substructures and may often include varying molecular weights and/or sizes. As such, determining an Rg based on a single form factor may introduce inaccuracies and/or provide incomplete information regarding the branched particles. In at least one implementation, the respective form factor contributions (FC) of each of the form factors may be utilized to at least partially determine or more accurately determine the structural features of the particles. For example, a relatively greater form factor contribution with respect to a first form factor as compared to a second form factor may indicate that the structure of the particles may be more closely represented by the first form factor. Similarly, a relatively lower form factor contribution with respect to a first form factor as compared to a second form factor may indicate that the structure of the particles may be less closely represented by the first form factor. In yet another example, particles having relatively similar or substantially equal form factor contributions with respect to a first and second form factor may indicate that the structure of the particles may be represented substantially by both the first and second form factors. It should be appreciated that more than two form factors and form factor contributions may be evaluated.

In at least one implementation, the form factor contributions (FC) may be utilized as or provide a comparative "weight" for selecting and/or deselecting one or more form factors according to a predetermined criteria. For example, a first form factor contribution ($FC_1$) may be compared with a second form factor contribution ($FC_2$), or any additional form factor contributions, to determine whether the respective form factor thereof has a relatively greater or weaker correlation. In at least one implementation, one or more of the form factors may be deselected when a weaker correlation is determined. A weak correlation may be represented by a form factor contribution (FC) of about 33% or less, about 30% or less, about 25% or less, about 20% or less, about 15% or less, about 10% or less, about 5% or less, or about 3% or less. Similarly, one or more form factors may be selected when a stronger correlation is determined. A strong correlation may be represented by a form factor contribution (FC) of about 50% or greater, about 60% or greater, about 70% or greater, about 80% or greater, about 90% or greater, or about 95% or greater.

Determining the Assumption-Free Radius of Gyration (Rg)

As discussed above, the method for determining the Rg or assumption-free Rg of the particles in solution may include determining the assumption-free radius of gyration (Rg) with each of the form factor contributions (FC). For example, the method may include determining the assumption-free radius of gyration ($Rg_{Assumption-Free}$) with the first and second form factor contributions ($FC_1$, $FC_2$). The method may also include utilizing the respective radius of gyration ($Rg_x$) associated with the best fit of the respective form factor (FF). For example, the method may include utilizing the radius of gyration ($Rg_1$), as determined with the first form factor ($FF_1$), associated with the respective optimization function (e.g., the minimum sum of squares residual, $SSR_1$). In another example, the method may include utilizing the radius of gyration ($Rg_2$), as determined with the second form factor ($FF_2$), associated with the respective optimization function (e.g., the minimum sum of squares residual, $SSR_2$). In an exemplary implementation, the method may include utilizing each of the form factor contributions (FC) and the respective radius of gyration ($Rg_x$) associated with each of the form factor ($FF_x$). For example, the method may include determining the assumption-free radius of gyration (Rg) with the first and second form factor contributions ($FC_1$. $FC_2$), and the respective radius of gyration ($Rg_1$, $Rg_2$) determined with each of the form factors ($FF_1$, $FF_2$).

It should be appreciated that the assumption-free Rg may be determined with any suitable calculation, equation, or expression incorporating the form factor contributions ($FC_i$) and/or and the respective radius of gyration ($Rg_i$) associated with each of the form factor ($FF_i$). In an exemplary implementation, the assumption-free Rg may be determined according to equation (10):

$$Rg_{Assumption-Free} = \sum (FC_i \times Rg_i), \qquad (10)$$

where $\Sigma(FC_i \times Rg_i)$ is the sum of each of the form factor contributions ($FC_i$) multiplied by the respective radius of gyration ($Rg_i$) associated with the best fit of the respective form factor ($FF_i$). For example, when utilizing two form factors, the assumption-free Rg may be determined according to equation (11):

$$Rg_{Assumption-Free} = (FC_1 \times Rg_1) + (FC_2 \times Rg_2). \qquad (11)$$

The method for determining the assumption-free radius of gyration (Rg) of the particle or particles in solution may also include outputting or displaying the radius of gyration (Rg). For example, the method may include outputting the radius of gyration (Rg) on a display (e.g., computer display), a readout, a report, or a disk storage of a computing system, such as the computing system described herein.

In at least one implementation, the method may include normalizing the detector at one or more angles. The normalization of the detector at the one or more angles may be performed according to the manufacturer of the instrument or the detector thereof, or by any one or more methods known in the art. In a preferred implementation, the method for normalizing the detector at one or more angles may include using either a spherical or random coil standard, such as a spherical or random coil standard having a known Rg less than about 10 nm. The method may also include utilizing the appropriate form factor. For example, for a spherical or a random coil, utilizing a spherical or a random coil form factor, respectively. The respective or appropriate form factor may then be utilized to directly calculate the angular dependence, which is independent of both refractive index increment (dn/dc) and molecular weight. The $P_{theta}$ ($P_\theta$) ratio may be calibrated from the scattering (e.g., excess scattering) at each of the observed angles by a single constant to that of the scattering (e.g., excess scattering) observed at the reference angle (also of known $P_\theta$).

Methods for Determining Molecular Weight

In at least one implementation, the methods disclosed herein may be utilized to determine or evaluate the molecular weight or estimated molecular weight of the particles. For example, the methods disclosed herein may include utilizing two or more form factors to determine the molecular weight of the particles. In another example, the methods disclosed herein may include utilizing one or more form factor contributions (FC) of the respective form factors (FF) to determine the molecular weight of the particles. It should be appreciated by one having ordinary skill in the art that the molecular weight values are calculated from the calibration and the observed peak areas or excess scattering heights, such as chromatographic elution excess scattering heights or batch mode (e.g., cuvette sample cell) excess scattering heights, and further corrected by the appropriate $P_\theta$ at each angle to produce a molecular weight at zero (0) angle.

Conventional methods for determining the molecular weight may include utilizing polynomial extrapolations or a single form factor to determine the $P_\theta$. However, the methods disclosed herein include determining the $P_\theta$ from two or more form factors.

The method for determining the molecular weight of the particles in a chromatographic mode may include, determining a calibration constant (K) with a known standard. The calibration constant may be determined according to Equation 12a or Equation 12b. In at least one implementation, the determination of the calibration constant may at least depend on the mode of operation (e.g., flow mode or batch mode). For example, the calibration constant (K) when operating in a flow mode may be determined according to Equation 12a or 12b. In another example, the calibration constant (K) when operating in a batch mode may be determined according to Equation 12b.

$$\text{Calibration Constant } (K) = \frac{(\text{Molecular Weight}_{Known} \times P_\theta)}{LS \text{ Area/Concentration Detector Area}}, \quad (12a)$$

$$\text{Calibration Constant } (K) = \frac{(\text{Molecular Weight}_{Known} \times P_\theta)}{LS \text{ Height/Concentration}}. \quad (12b)$$

In Equations 12a and 12b, the $P_\theta$ may be determined from a respective form factor, such as a random coil form factor, for the known standard. For example, the $P_\theta$ may be the $P_\theta$ expected as determined from a random coil form factor ($FF_{Random\ Coil}$) with the known standard. The LS Area may be or may refer to the area of a light scattering chromatogram of excess light scattering. The RI or concentration detector area may be or may refer to an area under the peak of the refractive index chromatogram of the same injection, and may be at least partially dependent on a total mass of polymer injected into a detector. For example, the RI area may be proportional to a mass injected into the LSD 100. The molecular weight (MW) may be the molecular weight of the known standard or known sample. It should be appreciated by one having ordinary skill in the art that the calibration constant (K) may be factored or adjusted for any one or more of dn/dc, absolute mass, and geometric volumes, other chromatographic and detector factors, or the like, or combinations thereof.

The method for determining the molecular weight of the particles may also include determining the molecular weight of the particles at one or more of the respective angles (i.e., $\theta_1$, $\theta_2$, $\theta_3$), with the Calibration Constant (K), according to Equation 13:

$$\text{Molecular Weight}_{Unknown} = (K/P_\theta) \times (LS \text{ Area}/RI \text{ Area}), \quad (13)$$

where $\theta$ may be any angle disclosed herein, and K may be the Calibration Constant. For example, the $\theta$ may be any angle between 0° and 180°. In at least one exemplary implementation, the $P_\theta$ may be any one of or represented by $P_{\theta 1}$, $P_{\theta 2}$, and $P_{\theta 3}$. In at least one implementation, $P_{\theta 1}$, $P_{\theta 2}$, and $P_{\theta 3}$ may be or may be represented by $P_{RALS}$, $P_{HALS}$, and $P_{LALS}$, respectively. For example, $P_{\theta 1}$, $P_{\theta 2}$, and $P_{\theta 3}$ may be or may be represented by $P_{90}$, $P_{170}$, and $P_{10}$, respectively. The $P_\theta$ may be determined from the respective $P_\theta$ values from each of the form factors (FF), and may be a weighted average with respect to the form factor contributions (FC) of each of the form factors.

$P_{\theta 3}$ may be represented by Equation (14):

$$P_{\theta 3} = (P_{(\theta 3)\ FF1\ Calculated} \times FC_1) + \\ (P_{(\theta 3)\ FF2\ Calculated} \times FC_2) + (P_{(\theta 3)\ FF3\ Calculated} \times FC_3), \quad (14)$$

where:

$P_{(\theta 3)\ FF1\ Calculated}$ may be the $P_\theta$ value calculated from the first form factor ($FF_1$) and associated with the best fit at the third angle;

$P_{(\theta 3)\ FF2\ Calculated}$ may be the $P_\theta$ value calculated from the second form factor ($FF_2$) and associated with the best fit at the third angle; and $P_{(\theta 3)\ FF3\ Calculated}$ may be the $P_\theta$ value calculated from the third form factor ($FF_3$) and associated with the best fit at the third angle.

$P_{\theta 1}$ may be represented by Equation (15):

$$P_{\theta 1} = (P_{(\theta 1)\ FF1\ Calculated} \times FC_1) + \\ (P_{(\theta 1)\ FF2\ Calculated} \times FC_2) + (P_{(\theta 1)\ FF3\ Calculated} \times FC_3), \quad (15)$$

where:

$P_{(\theta 1)\ FF1\ Calculated}$ may be the $P_\theta$ value calculated from the first form factor ($FF_1$) and associated with the best fit at the first angle;

$P_{(\theta 1)\ FF2\ Calculated}$ may be the $P_\theta$ value calculated from the second form factor ($FF_2$) and associated with the best fit at the first angle; and $P_{(\theta 1)\ FF3\ Calculated}$ may be the $P_\theta$ value calculated from the third form factor ($FF_3$) and associated with the best fit at the first angle.

$P_{\theta 2}$ may be represented by Equation (16):

$$P_{\theta 2} = (P_{(\theta 2)\ FF1\ Calculated} \times FC_1) + \\ (P_{(\theta 2)\ FF2\ Calculated} \times FC_2) + (P_{(\theta 2)\ FF3\ Calculated} \times FC_3), \quad (16)$$

where:

$P_{(\theta 2)\ FF1\ Calculated}$ may be the $P_\theta$ value calculated from the first form factor ($FF_1$) and associated with the best fit at the second angle;

$P_{(\theta 2)\ FF2\ Calculated}$ may be the $P_\theta$ value calculated from the second form factor ($FF_2$) and associated with the best fit at the second angle; and $P_{(\theta 2)\ FF3\ Calculated}$ may be the $P_\theta$ value calculated from the third form factor ($FF_3$) and associated with the best fit at the second angle.

In each of Equations (14), (15), and (16), $FC_1$, $FC_2$, and $FC_3$, refer to the form factor contribution associated with the first form factor ($FF_1$), the second for Factor ($FF_2$), and the third form factor ($FF_3$), respectively.

The molecular weight (MW) may be determined with one or more of the $P_{\theta 1}$, $P_{\theta 2}$, $P_{\theta 3}$, or combinations thereof, via Equation 13. For example, the molecular weight (MW) may be determined with one or more of the $P_{LALS}$, $P_{RALS}$, $P_{HALS}$, or combinations thereof, via Equation 13. The molecular weight (MW) may be determined with only the $P_{\theta 1}$, only the $P_{\theta 2}$, or only the $P_{\theta 3}$. Similarly, the molecular weight (MW) may be determined with two or more of the $P_{\theta 1}$, $P_{\theta 2}$, and $P_{\theta 3}$. In at least one implementation, the molecular weight (MW) is determined with two or more of the $P_{\theta 1}$, $P_{\theta 2}$, and $P_{\theta 3}$. For example, the molecular weight (MW) is determined with two or more of the $P_{LALS}$, $P_{RALS}$, and $P_{HALS}$. For example, a respective molecular weight (MW) is determined for each of the $P_{\theta 3}$ or $P_{LALS}$, $P_{\theta 1}$ or $P_{RALS}$, and $P_{\theta 2}$ or $P_{HALS}$, via Equation 13. It should be appreciated that the molecular weight (MW) may be determined with more than three $P_{\theta}$ values (e.g., more than three angles). In at least one implementation, the respective molecular weights, as determined with each of the $P_{\theta 3}$ or $P_{LALS}$, $P_{\theta 1}$ or $P_{RALS}$, and $P_{\theta 2}$ or $P_{HALS}$, via Equation 13, may be averaged, and a standard deviation may be determined. The standard deviation may be utilized to determine an accuracy of the molecular weight (MW). The standard deviation may also be utilized to determine the appropriateness or facilitate the selection of the form factors utilized. For example, the standard deviation may be utilized in a rejection criteria for selecting or deselecting one or more form factors.

It should be appreciated by one having ordinary skill in the art, that the molecular weight (MW) (which is determined from an extrapolation to zero angle, as is known in the art) may be at least partially improved through the respective $P_{\theta}$ function expressed by each of the form factors (FF) and corresponding form factor contributions (FC). In view of the foregoing, improving the Rg (e.g., accuracy, precision, etc.) towards zero angle through the assumption-free Rg methods disclosed herein thereby simultaneously provides improved molecular weight determination.

Rejection Criteria for Improving Assumption-Free Rg

In at least one implementation, the method may include implementing a rejection criteria to improve the assumption-free radius of gyration (Rg) determined. For example, the rejection criteria may improve the accuracy, consistency, and/or precision of the assumption-free Rg determined herein. The rejection criteria may include utilizing the respective minimum sum of squares residual, the minimum sum of squares squared, or the minimum sum of squares absolute for each of the form factors, the number of angles utilized by the detector, the number of angular ratios, the number of form factors, or combinations thereof. The rejection criteria may include utilizing the respective minimum sum of squares residual, the minimum sum of squares squared, or the minimum sum of squares absolute for each of the form factors, the number of angles utilized by the detector, the number of angular ratios, the number of form factors, or combinations thereof, to thereby provide a corrected minimum sum of squares residual ($SSR_{Corrected}$), a corrected minimum sum of squares squared ($SSR^2_{Corrected}$), or a corrected minimum sum of squares absolute ($SAR_{Corrected}$) for any one or more of the form factors. The corrected minimum sum of squares residual ($SSR_{Corrected}$), the corrected minimum sum of squares squared ($SSR^2_{Corrected}$), or the corrected minimum sum of squares absolute ($SAR_{Corrected}$) for any one or more of the form factors may then be utilized to improve the assumption-free radius of gyration or provide a corrected assumption-free radius of gyration.

In at least one implementation, the rejection criteria includes utilizing the respective minimum sum of squares residual or the respective minimum sum of squares absolute and the number of angular ratios. For example, the rejection criteria may include dividing the respective minimum sum of squares residual or the respective minimum sum of squares absolute by the number of angular ratios, according to Equations (17a, 17b). It should be appreciated that the $SSR_2$ may be similarly corrected by dividing by the number of angular ratios.

$$SSR_{Corrected} = \frac{SSR}{\text{\# of Angular Ratios}} \tag{17a}$$

$$SAR_{Corrected} = \frac{SAR}{\text{\# of Angular Ratios}} \tag{17b}$$

In at least one implementation, the rejection criteria may utilize the respective minimum sum of squares residual, the minimum sum of squares squared, or the minimum sum of squares absolute for each of the form factors, the number of angles utilized by the detector, the number of angular ratios, the number of form factors, the respective form factor contribution (FC) for each of the form factors, or combinations thereof. The rejection criteria may provide a corrected minimum sum of squares residual ($SSR_{Corrected}$), a corrected minimum sum of squares squared ($SSR^2_{Corrected}$), or a corrected minimum sum of squares absolute ($SAR_{Corrected}$) for any one or more of the form factors.

In at least one implementation, the rejection criteria may include utilizing the respective minimum sum of squares residual, the minimum sum of squares squared, or the minimum sum of squares absolute for each of the form factors and a combination of the number of angular ratios, the number of form factors, and the respective form factor contribution (FC) for each of the form factors, as indicated by Equations (18a, 18b):

$$SSR_{Corrected} = \frac{\sum (FC_n \times SSR_n)}{\text{Angular Ratios} + \text{Form Factors} - 1} \tag{18a}$$

$$SAR_{Corrected} = \frac{\sum (FC_n \times SAR_n)}{\text{Angular Ratios} + \text{Form Factors} - 1} \tag{18b}$$

In at least one implementation, the rejection criteria may include utilizing the respective minimum sum of squares residual, the minimum sum of squares squared, or the minimum sum of squares absolute for each of the form factors and a combination of the number of angular ratios and the respective form factor contribution (FC) for each of the form factors, as indicated by Equations (19a, 19b):

$$SSR_{Corrected} = \frac{\sum (FC_n \times SSR_n)}{\text{Angular Ratios}} \tag{19a}$$

$$SAR_{Corrected} = \frac{\sum (FC_n \times SAR_n)}{\text{Angular Ratios}} \tag{19b}$$

In at least one implementation, the rejection criteria may include utilizing the respective minimum sum of squares residual, the minimum sum of squares squared, or the minimum sum of squares absolute for each of the form factors and a combination of the number of form factors and the respective form factor contribution (FC) for each of the form factors, as indicated by Equations (20a, 20b):

$$SSR_{Corrected} = \frac{\sum (FC_n \times SSR_n)}{\text{Form Factors} - 1} \tag{20a}$$

$$SAR_{Corrected} = \frac{\sum (FC_n \times SAR_n)}{\text{Form Factors} - 1} \tag{20b}$$

As discussed above, the form factor contributions (FC) may be utilized as or provide a comparative "weight" for selecting and/or deselecting one or more form factors according to predetermined criteria, such as a rejection criteria. For example, a first form factor contribution ($FC_1$) may be compared with a second form factor contribution ($FC_2$), or any additional form factor contributions, to determine whether the respective form factor thereof has a relatively greater or weaker correlation. As such, in at least one implementation, the rejection criteria may include utilizing one or more of the form factor contributions (FC) to deselect one or more of the respective form factors. The rejection criteria may be determined by a weak correlation, such as a form factor contribution (FC) of about 33% or less, about 30% or less, about 25% or less, about 20% or less, about 15% or less, about 10% or less, about 5% or less, or about 3% or less. Similarly, one or more form factors may be selected when a stronger correlation is determined. A strong correlation may be represented by a form factor contribution (FC) of about 50% or greater, about 60% or greater, about 70% or greater, about 80% or greater, about 90% or greater, or about 95% or greater.

In at least one implementation, the rejection criteria may include utilizing a respective ratio of the signal to noise at one or more angles and/or signal biasing (e.g., poor normalization, baseline setting, etc.). For example, the rejection criteria may include utilizing a respective signal to noise at one or more angles to remove one or more of the angles utilized to determine the assumption-free Rg. For example, the rejection criteria may include determining a ratio of the signal to noise at a first angle, determining a ratio of the signal to noise at a second angle, and removing, elimination, or otherwise omitting the first angle or the second angle having or associated with a relatively lower signal to noise ratio.

Assumption-Free Rg for Particles Having Composite Shapes

In at least one implementation, the methods disclosed herein may be utilized to describe or evaluate a particle or particles having a composite molecular shape or composite particles, such as branched molecules. For example, the methods disclosed herein may be utilized to determine one or more properties or characteristics of the composite particles. Illustrative properties or characteristics may be or include, but are not limited to, branching, structural units, structural features, sub-structures, subdivisions of structural features, branching frequency, long chain branching frequency, or the like, or combinations thereof.

It should be appreciated that branched particles often exhibit more compact structures, subdivisions of structural features, or sub-structures, as compared to particles that may be represented by a single structure, such as a random coil. For example, as the molecular weight of the branched particles increase, there is a corresponding increase in branch points that fill into the volume of the hydrodynamic sphere. In highly branched particles or samples, the branch points may form on existing branches as well. Dextran particles, for example, can have relatively high amounts of long chain branching. As such, composite particles, such as branched particles, are not sufficiently described or represented by a single form factor. The methods disclosed herein may utilize a combination of form factors that more accurately represents these composite particles as compared to conventional methods.

The method of evaluating composite particles may include determining the respective form factor contribution (FC) of each of the form factors. The method may also include determining a respective percentage (%) of each of the form factor contributions (FC) with respect to all of the form factor contributions. The method may further include determining the composite structure based on the respective form factor contribution (FC) and/or the respective percentage (%) of each of the form factor contributions (FC).

In at least one implementation, the respective form factor contributions (FC) may be utilized to determine a relative level or degree of branching (e.g., long chain branching frequency [LCBf]). For example, branched particles may be represented by a combination of form factors, such as a random coil form factor and a spherical form factor. In at least one implementation, increased branching of the branched particles may be represented by a corresponding increase in the form factor contribution (FC) for the spherical form factor. In another implementation, decreased branching of the branched particles may be represented by a corresponding decrease in the form factor contribution (FC) for the spherical form factor and/or an increase in the form factor contribution (FC) for the random coil form factor. It should be appreciated that these methods of evaluating branched particles may be applied to homopolymers, heterogenous copolymers (e.g., random or regular heterogenous copolymers), or combinations thereof.

In at least one implementation, the respective form factor contributions (FC) may be utilized to represent, observe, or evaluate coil expansion or contraction. Coil expansion or contraction may be due to steric hinderance, such as in a helical backbone, a polyelectrolyte effect, a solubility parameter, or combinations thereof.

Data Acquisition Setup

Figure 2:
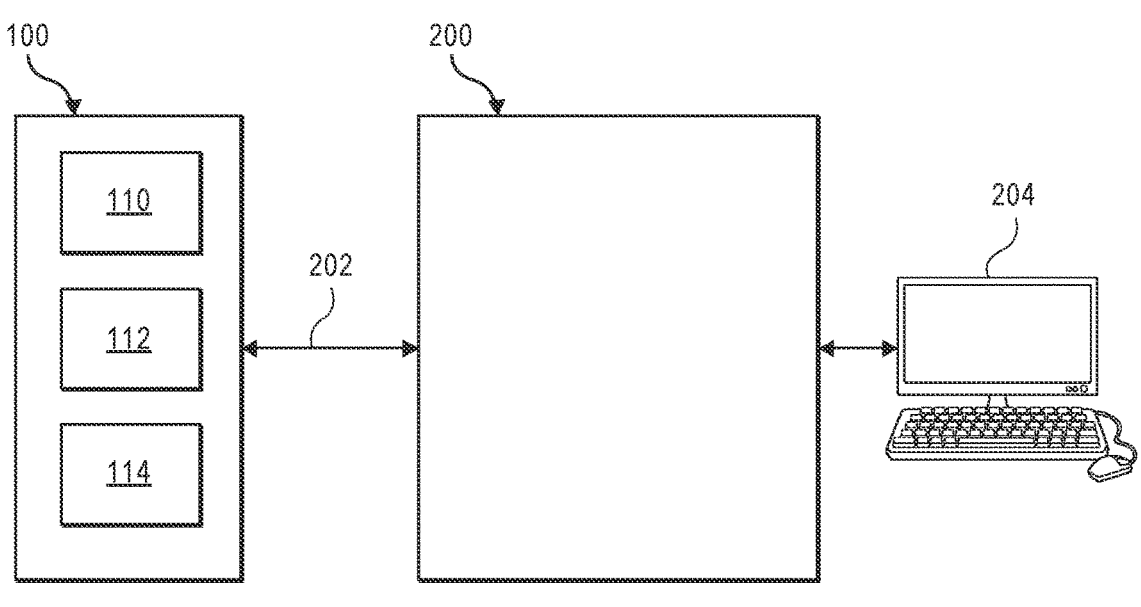
FIG. 2 illustrates a computer system or electronic processor for receiving and/or analyzing data from a light scattering detector, according to one or more implementations disclosed.

FIG. 2 illustrates a computer system or electronic processor 200 for receiving and/or analyzing data from the LSD 100 or any LSD, according to one or more implementations. The computer system or electronic processor 200 may be a general purpose computer, and may allow a user or chromatographer to process data, analyze data, interpret data, store data, retrieve data, display data, display results, interpret results, store results, or any combination thereof. The results may be graphical in form and/or tabular in form. It should be appreciated that, while the electronic processor 200 is shown operably and/or communicably coupled with the LSD 100 of FIG. 1A, the electronic processor 200 may be operably and/or communicably coupled with any suitable light scattering detector known in the art.

The computer system or electronic processor 200 may be capable of or configured to operate, communicate with (e.g., send/receive data), modify, modulate, or otherwise run any one or more components of the light scattering detector, such as the LSD 100. For example, the electronic processor 200 may be operably and/or communicably coupled with and capable of or configured to operate, communicate with, modify, modulate, or otherwise run a pump (not shown), the laser 108, the sample source 104, any one or more of the detectors 110, 112, 114, or any other component of the LSD 100.

In at least one implementation, illustrated in FIG. 2, the electronic processor 200 may be operably and/or communicably coupled with the detectors 110, 112, 114 and capable of or configured to send and/or received signals and/or data 202 therefrom. The data 202 from the one or more detectors 110, 112, 114 may be or include analog data, such as fluctuating analog voltage. In at least one implementation, the electronic processor 200 may be capable of or configured to convert the analog data to digital data. For example, the electronic processor 200 may include an analog to digital converter (not shown). In another implementation, an analog to digital converter may be interposed between the LSD 100 or the detectors 110, 112, 114 thereof and the electronic processor 200.

The electronic processor 200 may be capable of or configured to receive, collect, record, and/or store data 202 from any one or more components of the LSD 100. For example, as illustrated in FIG. 2, the electronic processor 200 may receive data 202 from the one or more detectors 110, 112, 114 of the LSD 100, optionally convert the data 202, and record and/or store the data 202 in a computer memory, such as a local drive or network drive (e.g., cloud drive).

The electronic processor 200 may be capable of or configured to analyze, process, display, and/or output data 202. For example, the electronic processor 200 may include software capable of or configured to analyze, process, display, and/or output data 202. The software may also be capable of or configured to process the data 202 and output or display the data 202 on a workstation or display 204. The software may include any one or more of the algorithms, equations, methods, steps, processes, or formulas disclosed herein. The electronic processor 200 may process and/or extract information from the data 202 to prepare results, and present the data 202 and/or the results, such as in a report or on the display 204. The electronic processor 200 may include a graphical user interface (GUI) that allows a user or the chromatographer to interact with all systems, subsystems, and/or components of the electronic processor 200 and/or the LSD 100.

Figure 3:
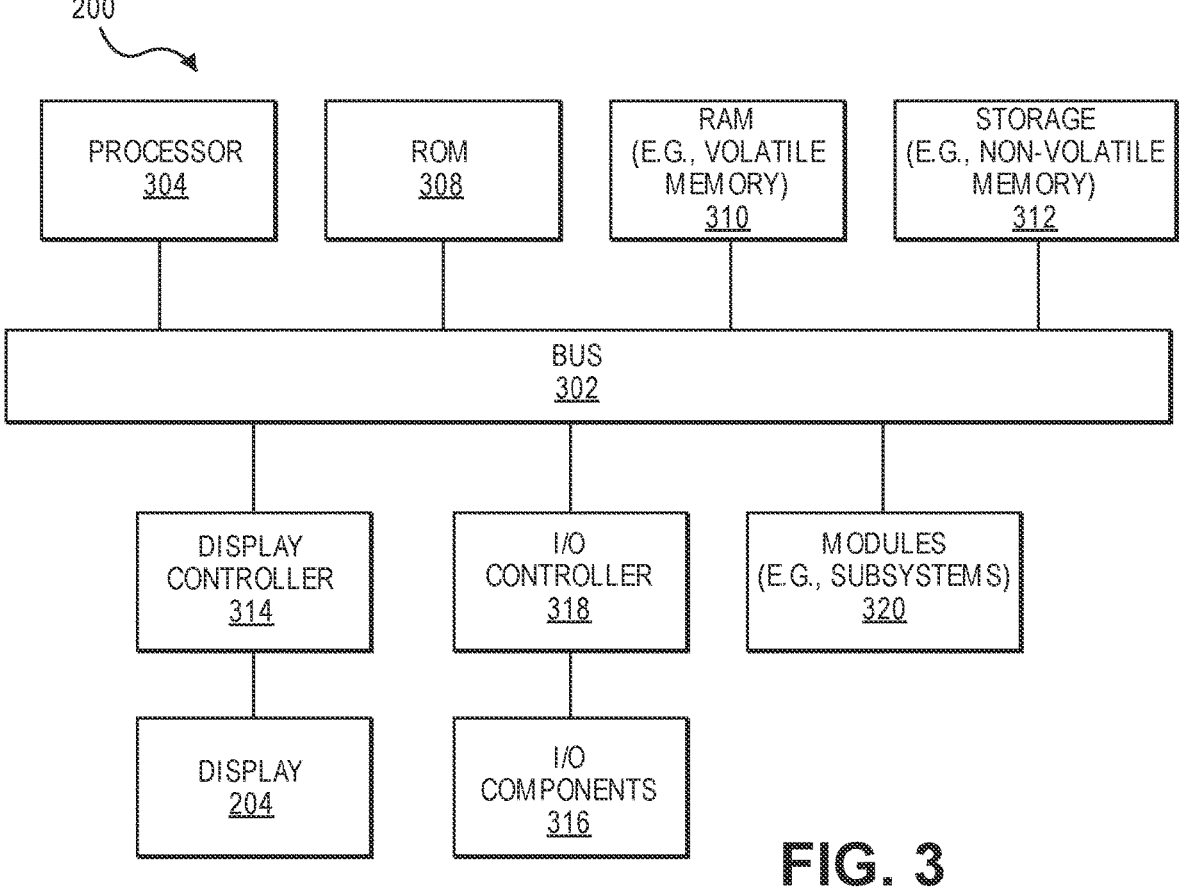
FIG. 3 illustrates a block diagram of the computer system or electronic processor of FIG. 2, according to one or more implementations disclosed.

FIG. 3 illustrates a block diagram of the computer system or electronic processor 200 of FIG. 2 that may be used in conjunction with one or more light scattering detectors, including the LSD 100, and/or one or more methods disclosed herein. For example, the computing system 200 (or system, or server, or computing device, or device) may represent any of the devices or systems described herein that perform any of the processes, operations, or methods of the disclosure. Note that while the computing system 200 illustrates various components, it is not intended to be limited to any particular architecture or manner of interconnecting the components as such details are not germane to the present disclosure. It will also be appreciated that other types of systems that have fewer or more components than shown may also be used with the present disclosure.

As shown, the computing system 200 may include a bus 302 which may be coupled to a processor 304, ROM (Read Only Memory) 308, RAM (or volatile memory) 310, and storage (or non-volatile memory) 312. The processor 304 may store data 202 (see FIG. 2) in one or more of the memories 308, 310, 312. The processor 304 may also retrieve stored data from one or more of the memories 308, 310, and 312. The one or more memories 308, 310, 312 may store the software disclosed therein, which may include instructions to perform any one or more of the processes, operations, or methods described herein. The processor 304 may also retrieve stored software or the instructions thereof from one or more of the memories 308, 310, and 312 and execute the instructions to perform any one or more of the processes, operations, or methods described herein. These memories represent examples of a non-transitory computer-readable medium (or machine-readable medium) or storage containing instructions which when executed by a processor 304 (or system, or computing system), cause the processor 304 to perform any one or more of the processes, operations, or methods described herein. The RAM 310 may be implemented as, for example, dynamic RAM (DRAM), or other types of memory that require power continually in order to refresh or maintain the data in the memory. Storage 312 may include, for example, magnetic, semiconductor, tape, optical, removable, non-removable, and/or other types of storage that maintain data even after power is removed from the computer system 200. It should be appreciated that storage 312 may be remote from the system 200 (e.g., accessible via a network).

A display controller 314 may be coupled to the bus 302 in order to receive data to be displayed on a display 204, which may display any one of the user interface features or implementations described herein and may be a local or a remote display device 204. The computing system 200 may also include one or more input/output (I/O) components 316 including mice, keyboards, touch screen, network interfaces, printers, speakers, and other devices. Typically, the input/output components 316 are coupled to the system 200 through an input/output controller 318.

Modules 320 (or program code, instructions, components, subsystems, units, functions, or logic) may represent any of the instructions, subsystems, steps, methods, equations, calculations, plots, or engines described above. Modules 320 may reside, completely or at least partially, within the memories described above (e.g., non-transitory computer-readable media), or within a processor 304 during execution thereof by the computing system 200. In addition, Modules 320 may be implemented as software, firmware, or functional circuitry within the computing system 200, or as combinations thereof.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

The assumption-free Rg of a narrow polystyrene sample having a nominal molecular weight of about 5,500,000 Da in a tetrahydrofuran solution was determined with a system including an automated liquid chromatograph coupled with a light scattering detector (LSD).

To determine the assumption-free Rg, the system was normalized and calibrated with a known polystyrene standard. The angles of the light scattering detector were normalized with respect to the LALS. Specifically, the light scattering detector was calibrated at a low angle light scattering angle (LALS) of 10-degrees ($\theta_3$), and normalized for relative excess scattering at a right angle light scattering angle (RALS) of 90-degrees ($\theta_1$) and a high angle light scattering angle (HALS) of 170-degrees angle ($\theta_2$). Theoretical form factor ratios between the angles were determined based on the random coil model. The normalization ratios and the MW Constant are summarized in Table 1.

A first scattering intensity ($I_{\theta1}$), a second scattering intensity ($I_{\theta2}$), and a third scattering intensity ($I_{\theta3}$) of the polystyrene sample (about 5,500,000 Da) was obtained with the system at each of the aforementioned angles ($\theta_1$, $\theta_2$, $\theta_3$). The raw chromatograms were integrated to determine respective areas. The measured areas of the excess scattering for the LALS ($\theta_3$), the RALS ($\theta_1$), and the HALS ($\theta_2$) are summarized in Table 1.

TABLE 1

| | Sum Counts (mV) | Area (mV × mL) | Normalization Ratio | Area Corrected |
|---|---|---|---|---|
| LALS (θ3) | 3849625 | 1283.21 | 1.00000 | 1283.21 |
| RALS (θ1) | 923950 | 307.98 | 1.25600 | 245.21 |
| HALS (θ2) | 399852 | 133.28 | 1.02229 | 130.38 |
| RI Response | 12443 | 4.147 | | |
| MW Constant (K) | 18,183 Da/(LALS/RI) | | | |

A corrected area was determined by dividing the measured area by the normalization ratio. The LALS signal or observed light scattering at the third angle ($\theta_3$) was utilized as a reference to determine the normalized observed ratios (R') of the observed light scattering of the particles at the first angle relative to the third angle ($R'_{\theta1/\theta3}$) and the second angle relative to the third angle ($R'_{\theta2/\theta3}$). The ratios were determined according to equations (21a), (21b), and (21c). The calculated observed R' ratios are summarized in Table 2.

$$R'_{LALS} \text{ or } \left(R'_{\theta3/\theta3}\right) = R_{\theta3}/R_{\theta3} \tag{21a}$$

$$R'_{RALS} \text{ or } \left(R'_{\theta1/\theta3}\right) = R_{\theta1}/R_{\theta3} \tag{21b}$$

$$R'_{HALS} \text{ or } \left(R'_{\theta2/\theta3}\right) = R_{\theta2}/R_{\theta3} \tag{21c}$$

TABLE 2

| | Observed R' Ratio |
|---|---|
| ($R'_{\theta3/\theta3}$) | 1.00000 |
| ($R'_{\theta1/\theta3}$) | 0.19109 |
| ($R'_{\theta2/\theta3}$) | 0.10160 |

It should be appreciated that the aforementioned ratios may instead be determined using any representative value of the scattering. For example, the aforementioned ratios may instead be determined with respective chromatographic data slice heights and/or partial areas as opposed to the integrated areas; and may be represented as quantities proportional to the calibrated or observed scattering intensity.

Determining, Based on a First Form Factor, a Theoretical or Calculated Ratio of Light Scattering of the First Angle Relative to the Third Angle and the Second Angle Relative to the Third Angle Based on a first form factor ($FF_1$), a ratio of the calculated light scattering of the first angle relative to the calculated light scattering of the third angle $$\left(R''_{\frac{\theta1}{\theta3}} \text{ Calculated FF1}\right)$$

and a ratio of the calculated light scattering of the second angle relative to the calculated light scattering of the third angle $$\left(R''_{\frac{\theta2}{\theta3}} \text{ Calculated FF1}\right)$$

was determined for varying Rg values. Particularly, a random coil form factor was selected as the first form factor ($FF_1$) and increasing Rg values were utilized to determine the ratios of the calculated light scattering of the first angle relative to the calculated light scattering of the third angle $$\left(R''_{\frac{\theta1}{\theta3}} \text{ Calculated FF1}\right)$$

and the calculated light scattering of the second angle relative to the calculated light scattering of the third angle $$\left(R''_{\frac{\theta2}{\theta3}} \text{ Calculated FF1}\right).$$

More particularly, the random coil form factor ($FF_1$) was utilized to determine the theoretical or calculated light scattering (e.g., $P_\theta$ particle scattering factor value) of the LALS ($P_{\theta3}$), RALS ($P_{\theta1}$), and HALS ($P_{\theta2}$) at each of the increasing Rg values, and the theoretical or calculated light scattering of the LALS ($P_{\theta3}$), RALS ($P_{\theta1}$), and HALS ($P_{\theta2}$) was utilized to determine the ratios of calculated light scattering of the first angle relative to the calculated light scattering of the third angle $$\left(R''_{\frac{\theta1}{\theta3}} \text{ Calculated FF1}\right)$$

and the calculated light scattering of the second angle relative to the calculated light scattering of the third angle $$\left(R''_{\frac{\theta2}{\theta3}} \text{ Calculated FF1}\right).$$

The calculated scattering of the LALS ($P_{\theta3}$), RALS ($P_{\theta1}$), and HALS ($P_{\theta2}$) at each of the increasing Rg values, and the ratios of the calculated light scattering of the first angle relative to the calculated light scattering of the third angle $$\left(R''_{\frac{\theta1}{\theta3}} \text{ Calculated FF1}\right)$$

and the calculated light scattering of the second angle relative to the calculated light scattering of the third angle $$\left(R''_{\frac{\theta2}{\theta3}} \text{ Calculated FF1}\right),$$

based on the first form factor ($FF_1$) at each of the increasing Rg values is represented in an abbreviated form in Table 3.

TABLE 3

| | $P_\theta$ | | | Calculated $P_\theta$ Ratio | |
|---|---|---|---|---|---|
| Rg (nm) | LALS ($P_{\theta3}$) | RALS ($P_{\theta1}$) | HALS ($P_{\theta2}$) | $R''_{\left(\frac{\theta1}{\theta3} \text{ Calculated FF1}\right)}$ | $R''_{\left(\frac{\theta2}{\theta3} \text{ Calculated FF1}\right)}$ |
| 123.0 | 0.95478 | 0.19291 | 0.10304 | 0.202048 | 0.107921 |
| 124.0 | 0.95406 | 0.19018 | 0.10148 | 0.199338 | 0.106365 |
| 125.0 | 0.95334 | 0.18751 | 0.09995 | 0.196682 | 0.104844 |
| 126.0 | 0.95262 | 0.18488 | 0.09846 | 0.194077 | 0.103355 |
| 126.7 | 0.95211 | 0.18308 | 0.09743 | 0.192284 | 0.102333 |
| 126.8 | 0.95204 | 0.18282 | 0.09729 | 0.192030 | 0.102188 |
| 126.9 | 0.95197 | 0.18256 | 0.09714 | 0.191776 | 0.102043 |

TABLE 3-continued

| Rg (nm) | $P_\theta$ | | | Calculated $P_\theta$ Ratio | |
| | LALS ($P_{\theta3}$) | RALS ($P_{\theta1}$) | HALS ($P_{\theta2}$) | $R''\left(\frac{\theta_1}{\theta_3}\,Calculated\,FF1\right)$ | $R''\left(\frac{\theta_2}{\theta_3}\,Calculated\,FF1\right)$ |
|---|---|---|---|---|---|
| 127.0 | 0.95190 | 0.18231 | 0.09700 | 0.191523 | 0.101899 |
| 127.1 | 0.95182 | 0.18206 | 0.09685 | 0.191270 | 0.101755 |
| 127.2 | 0.95175 | 0.18180 | 0.09671 | 0.191018 | 0.101612 |
| 127.3 | 0.95168 | 0.18155 | 0.09657 | 0.190766 | 0.101469 |
| 127.4 | 0.95160 | 0.18129 | 0.09642 | 0.190515 | 0.101326 |
| 127.5 | 0.95153 | 0.18104 | 0.09628 | 0.190265 | 0.101183 |
| 127.6 | 0.95146 | 0.18079 | 0.09614 | 0.190014 | 0.101041 |
| 127.7 | 0.95138 | 0.18054 | 0.09599 | 0.189765 | 0.100899 |
| 128.0 | 0.95116 | 0.17979 | 0.09557 | 0.189019 | 0.100475 |
| 129.0 | 0.95043 | 0.17731 | 0.09417 | 0.186563 | 0.099081 |
| 130.0 | 0.94968 | 0.17489 | 0.09280 | 0.184154 | 0.097716 |
| 131.0 | 0.94894 | 0.17251 | 0.09146 | 0.181792 | 0.096381 |

Determining a Best Fit of the Observed Ratios to the Calculated or Theoretical Ratios A best fit of the ratio of the observed light scattering of the first angle relative to the observed light scattering of the third angle ($R'_{\theta1/\theta3}$) to the ratio of the calculated light scattering of the first angle relative to the calculated light scattering of the third angle $$\left(R''_{\frac{\theta2}{\theta3}\,Calculated\,FF1}\right)$$

and the ratio of the observed light scattering of the second angle relative to the observe light scattering of the third angle ($R'_{\theta2/\theta3}$) to the ratio of the calculated light scattering of the second angle relative to the calculated light scattering of the third angle $$\left(R''_{\frac{\theta2}{\theta3}\,Calculated\,FF1}\right)$$

was determined. The best fit utilized an iterative process. The best fit was determined by the convergence of the ratio of the observed light scattering of the first angle relative to the observed light scattering of the third angle ($R'_{\theta1/\theta3}$) to the ratio of the calculated light scattering of the first angle relative to the calculated light scattering of the third angle $$\left(R''_{\frac{\theta1}{\theta3}\,Calculated\,FF1}\right)$$

and the ratio of the observed light scattering of the second angle relative to the observe light scattering of the third angle ($R'_{\theta2/\theta3}$) to the ratio of the calculated light scattering of the second angle relative to the calculated light scattering of the third angle $$\left(R''_{\frac{\theta2}{\theta3}\,Calculated\,FF1}\right).$$

The convergence was determined with the minimum sum of squares residual ($SSR_1$) as well as with the minimum sum of the absolute residuals ($SAR_1$). As summarized in Table 2, the observed ratios of ($R'_{\theta1/\theta3}$) and ($R'_{\theta2/\theta3}$) were 0.19109 and 0.10160, respectively. The minimum sum of squares residual ($SSR_1$) and the minimum sum of the absolute residuals ($SAR_1$) between the ratio of the observed light scattering of the first angle relative to the observed light scattering of the third angle ($R'_{\theta1/\theta3}$) to the ratio of the calculated light scattering of the first angle relative to the calculated light scattering of the third angle $$\left(R''_{\frac{\theta1}{\theta3}\,Calculated\,FF1}\right)$$

and the ratio of the observed light scattering of the second angle relative to the observed light scattering of the third angle ($R'_{\theta2/\theta3}$) to the ratio of the calculated light scattering of the second angle relative to the calculated light scattering of the third angle $$\left(R''_{\frac{\theta2}{\theta3}\,Calculated\,FF1}\right)$$

for each or the increasing Rg values is represented in an abbreviated form in Table 4.

TABLE 4

| Rg (nm) | Calculated $P_\theta$ Ratio | | Observed $P_\theta$ Ratio | | Best Fit | |
| | $R''\left(\frac{\theta_1}{\theta_3}\,Calculated\,FF1\right)$ | $R''\left(\frac{\theta_2}{\theta_3}\,Calculated\,FF1\right)$ | $R'\left(\frac{\theta_1}{\theta_3}\right)$ | $R'\left(\frac{\theta_2}{\theta_3}\right)$ | $SSR_1$ | $SAR_1$ |
|---|---|---|---|---|---|---|
| 123.0 | 0.202048 | 0.107921 | 0.19109 | 0.1016 | $1.600 \times 10^{-4}$ | $1.728 \times 10^{-2}$ |
| 124.0 | 0.199338 | 0.106365 | 0.19109 | 0.1016 | $9.074 \times 10^{-5}$ | $1.301 \times 10^{-2}$ |
| 125.0 | 0.196682 | 0.104844 | 0.19109 | 0.1016 | $4.179 \times 10^{-5}$ | $8.835 \times 10^{-3}$ |
| 126.0 | 0.194077 | 0.103355 | 0.19109 | 0.1016 | $1.200 \times 10^{-5}$ | $4.742 \times 10^{-3}$ |
| 126.7 | 0.192284 | 0.102333 | 0.19109 | 0.1016 | $1.962 \times 10^{-6}$ | $1.927 \times 10^{-3}$ |
| 126.8 | 0.192030 | 0.102188 | 0.19109 | 0.1016 | $1.229 \times 10^{-6}$ | $1.528 \times 10^{-3}$ |
| 126.9 | 0.191776 | 0.102043 | 0.19109 | 0.1016 | $6.673 \times 10^{-7}$ | $1.129 \times 10^{-3}$ |
| 127.0 | 0.191523 | 0.101899 | 0.19109 | 0.1016 | $2.770 \times 10^{-7}$ | $7.321 \times 10^{-4}$ |
| 127.1 | 0.191270 | 0.101755 | 0.19109 | 0.1016 | $5.664 \times 10^{-8}$ | $3.356 \times 10^{-4}$ |
| 127.2 | 0.191018 | 0.101612 | 0.19109 | 0.1016 | $5.303 \times 10^{-9}$ | $8.366 \times 10^{-5}$ |
| 127.3 | 0.190766 | 0.101469 | 0.19109 | 0.1016 | $1.219 \times 10^{-7}$ | $4.549 \times 10^{-4}$ |
| 127.4 | 0.190515 | 0.101326 | 0.19109 | 0.1016 | $4.055 \times 10^{-7}$ | $8.490 \times 10^{-4}$ |
| 127.5 | 0.190265 | 0.101183 | 0.19109 | 0.1016 | $8.551 \times 10^{-7}$ | $1.242 \times 10^{-3}$ |
| 127.6 | 0.190014 | 0.101041 | 0.19109 | 0.1016 | $1.470 \times 10^{-6}$ | $1.635 \times 10^{-3}$ |
| 127.7 | 0.189765 | 0.100899 | 0.19109 | 0.1016 | $2.248 \times 10^{-6}$ | $2.026 \times 10^{-3}$ |
| 128.0 | 0.189019 | 0.100475 | 0.19109 | 0.1016 | $5.557 \times 10^{-6}$ | $3.197 \times 10^{-3}$ |
| 129.0 | 0.186563 | 0.099081 | 0.19109 | 0.1016 | $2.684 \times 10^{-5}$ | $7.047 \times 10^{-3}$ |

TABLE 4-continued

| Rg (nm) | Calculated $P_\theta$ Ratio | | Observed $P_\theta$ Ratio | | Best Fit | |
|---|---|---|---|---|---|---|
| | $R''\left(\frac{\theta_1}{\theta_3} Calculated\ FF1\right)$ | $R''\left(\frac{\theta_2}{\theta_3} Calculated\ FF1\right)$ | $R'\left(\frac{\theta_1}{\theta_3}\right)$ | $R'\left(\frac{\theta_2}{\theta_3}\right)$ | $SSR_1$ | $SAR_1$ |
| 130.0 | 0.184154 | 0.097716 | 0.19109 | 0.1016 | $6.319 \times 10^{-5}$ | $1.082 \times 10^{-2}$ |
| 131.0 | 0.181792 | 0.096381 | 0.19109 | 0.1016 | $1.137 \times 10^{-4}$ | $1.452 \times 10^{-2}$ |

As illustrated in Table 4, the $Rg_1$, based on the first form factor ($FF_1$), associated with the best fit was 127.2 nm. Particularly, the $Rg_1$ at 127.2 nm was associated with a minimum deviation or difference between the observed ratios and the calculated ratios. More specifically, the $Rg_1$ at 127.2 nm was associated with the minimum sum of squares residual ($SSR_1$) of a difference between the ratio of the observe light scattering of the first angle relative to the observed light scattering of the third angle ($R'_{\theta1/\theta3}$) and the ratio of the calculated light scattering of the first angle relative to the calculated light scattering of the third angle $$\left(R''_{\frac{\theta_1}{\theta_3} Calculated\ FF1}\right)$$

and a difference between the ratio of the observed light scattering of the second angle relative to the observed light scattering of the third angle ($R'_{\theta2/\theta3}$) and the ratio of the calculated light scattering of the second angle relative to the calculated light scattering of the third angle $$\left(R''_{\frac{\theta_2}{\theta_3} Calculated\ FF1}\right).$$

The minimum sum of squares residual ($SSR_1$) was then utilized to determine a first weighting factor ($FW_1$) based on the first or random coil form factor ($FF_1$). Specifically, the first weighting factor ($FW_1$) was determined with equation (22):

$$FW_1 = 1/SSR_1 \qquad (22)$$

where the $SSR_1$ was the minimum sum of squares residual associated with the best fit according to the first form factor ($FF_1$). Utilizing equation (22), the first weighting factor ($FW_1$) was determined to be $1.8859 \times 10^8$.

Determining, Based on a Second Form Factor, a Theoretical or Calculated Ratio of Light Scattering of the First Angle Relative to the Third Angle and the Second Angle Relative to the Third Angle Based on a second form factor ($FF_2$), a ratio of the calculated light scattering of the first angle relative to the calculated light scattering of the third angle $$\left(R''_{\frac{\theta_1}{\theta_3} Calculated\ FF2}\right)$$

and a ratio of the calculated light scattering of the second angle relative to the calculated light scattering of the third angle $$\left(R''_{\frac{\theta_2}{\theta_3} Calculated\ FF2}\right)$$

was determined for varying Rg values. Particularly, a rodlike form factor was selected as the second form factor ($FF_2$) and increasing Rg values were utilized to determine the ratios of the calculated light scattering of the first angle relative to the calculated light scattering of the third angle $$\left(R''_{\frac{\theta_1}{\theta_3} Calculated\ FF2}\right)$$

and the calculated light scattering of the second angle relative to the calculated light scattering of the third angle $$\left(R''_{\frac{\theta_2}{\theta_3} Calculated\ FF2}\right).$$

More particularly, the rodlike form factor ($FF_2$) was utilized to determine the theoretical or calculated scattering of the LALS ($P_{\theta3}$), RALS ($P_{\theta1}$), and HALS ($P_{\theta2}$) at each of the increasing Rg values, and the theoretical or calculated scattering of the LALS ($P_{\theta3}$), RALS ($P_{\theta1}$), and HALS ($P_{\theta2}$) was utilized to determine the ratios of the calculated light scattering of the first angle relative to the calculated light scattering of the third angle $$\left(R''_{\frac{\theta_1}{\theta_3} Calculated\ FF2}\right)$$

and the calculated light scattering of the second angle relative to the calculated light scattering of the third angle $$\left(R''_{\frac{\theta_2}{\theta_3} Calculated\ FF2}\right).$$

The theoretical scattering of the LALS ($P_{\theta3}$), RALS ($P_{\theta1}$), and HALS ($P_{\theta2}$) at each of the increasing Rg values, and the ratios of the calculated light scattering of the first angle relative to the calculated light scattering of the third angle $$\left(R''_{\frac{\theta_1}{\theta_3} Calculated\ FF2}\right)$$

and the calculated light scattering of the second angle relative to the calculated light scattering of the third angle $$\left(R''_{\frac{\theta 2}{\theta 3} Calculated\ FF2}\right),$$

based on the second form factor $(FF_2)$ at each of the increasing Rg values is represented in an abbreviated form in Table 5.

TABLE 5

| Rg (nm) | $P_\theta$ LALS $(P_{\theta 3})$ | RALS $(P_{\theta 1})$ | HALS $(P_{\theta 2})$ | Calculated $P_\theta$ Ratio $R''_{\left(\frac{\theta 1}{\theta 3} Calculated\ FF2\right)}$ | $R''_{\left(\frac{\theta 2}{\theta 3} Calculated\ FF2\right)}$ |
|---|---|---|---|---|---|
| 212.0 | 0.87398 | 0.16721 | 0.11972 | 0.191319 | 0.136984 |
| 212.1 | 0.87387 | 0.16713 | 0.11967 | 0.191253 | 0.136938 |
| 212.2 | 0.87376 | 0.16705 | 0.11961 | 0.191187 | 0.136892 |
| 212.3 | 0.87366 | 0.16697 | 0.11956 | 0.191122 | 0.136846 |
| 212.4 | 0.87355 | 0.16690 | 0.11950 | 0.191056 | 0.136800 |
| 212.5 | 0.87344 | 0.16682 | 0.11945 | 0.190990 | 0.136754 |
| 212.6 | 0.87333 | 0.16674 | 0.11939 | 0.190924 | 0.136708 |
| 212.7 | 0.87323 | 0.16666 | 0.11934 | 0.190859 | 0.136662 |
| 212.8 | 0.87312 | 0.16658 | 0.11928 | 0.190793 | 0.136617 |
| 213.0 | 0.87290 | 0.16643 | 0.11917 | 0.190662 | 0.136525 |
| 215.0 | 0.87074 | 0.16489 | 0.11809 | 0.189365 | 0.135622 |
| 220.0 | 0.86530 | 0.16115 | 0.11547 | 0.186231 | 0.133449 |
| 230.0 | 0.85420 | 0.15417 | 0.11057 | 0.180480 | 0.129442 |
| 235.0 | 0.84855 | 0.15116 | 0.10827 | 0.178143 | 0.127595 |
| 240.0 | 0.84284 | 0.14811 | 0.10607 | 0.175723 | 0.125844 |
| 242.0 | 0.84054 | 0.14692 | 0.10521 | 0.174790 | 0.125168 |
| 242.7 | 0.83973 | 0.14651 | 0.10491 | 0.174468 | 0.124935 |
| 242.8 | 0.83961 | 0.14645 | 0.10487 | 0.174423 | 0.124902 |
| 242.9 | 0.83950 | 0.14639 | 0.10483 | 0.174377 | 0.124869 |
| 243.0 | 0.83938 | 0.14633 | 0.10479 | 0.174331 | 0.124836 |
| 243.1 | 0.83927 | 0.14627 | 0.10474 | 0.174286 | 0.124803 |
| 243.2 | 0.83915 | 0.14621 | 0.10470 | 0.174240 | 0.124770 |
| 243.3 | 0.83904 | 0.14616 | 0.10466 | 0.174194 | 0.124737 |
| 243.4 | 0.83892 | 0.14610 | 0.10462 | 0.174149 | 0.124704 |

Determining a Best Fit of the Observed Ratios to the Calculated or Theoretical Ratios A best fit of the ratio of the observed light scattering of the first angle relative to the observed light scattering of the third angle $(R'_{\theta 1/\theta 3})$ to the ratio of the calculated light scattering of the first angle relative to the calculated light scattering of the third angle $$\left(R''_{\frac{\theta 1}{\theta 3} Calculated\ FF2}\right)$$

and the ratio of the observed light scattering of the second angle relative to the observed light scattering of the third angle $(R'_{\theta 2/\theta 3})$ to the ratio of the calculated light scattering of the second angle relative to the calculated light scattering of the third angle was determined. The best fit utilized an iterative process similar to the random coil discussed above. The best fit was determined by the convergence of the ratio of the observed light scattering of the first angle relative to the observed light scattering of the third angle $(R'_{\theta 1/\theta 3})$ to the ratio of the calculated light scattering of the first angle relative to the calculated light scattering of the third angle $$\left(R''_{\frac{\theta 1}{\theta 3} Calculated\ FF2}\right)$$

and the ratio of the observed light scattering of the second angle relative to the observed light scattering of the third angle $(R'_{\theta 2/\theta 3})$ to the ratio of the calculated light scattering of the second angle relative to the calculated light scattering of the third angle $$\left(R''_{\frac{\theta 2}{\theta 3} Calculated\ FF2}\right).$$

The convergence was determined with the minimum sum of squares residual $(SSR_2)$ as well as with the minimum sum of the absolute residuals $(SAR_2)$. The minimum sum of squares residual $(SSR_2)$ and the minimum sum of the absolute residuals $(SAR_2)$ between the ratio of the observed light scattering of the first angle relative to the observed light scattering of the third angle $(R'_{\theta 1/\theta 3})$ to the ratio of the calculated light scattering of the first angle relative to the calculated light scattering of the third angle $$\left(R''_{\frac{\theta 1}{\theta 3} Calculated\ FF2}\right)$$

and the ratio or the observed light scattering of the second angle relative to the observed light scattering of the third angle $(R'_{\theta 2/\theta 3})$ to the ratio of the calculated light scattering of the second angle relative to the calculated light scattering of the third angle $$\left(R''_{\frac{\theta 2}{\theta 3} Calculated\ FF2}\right)$$

for each or the increasing Rg values is represented in an abbreviated form in Table 6.

TABLE 6

| Rg (nm) | Calculated $P_\theta$ Ratio $R''_{\left(\frac{\theta 1}{\theta 3} Calculated\ FF2\right)}$ | $R''_{\left(\frac{\theta 2}{\theta 3} Calculated\ FF2\right)}$ | Observed $P_\theta$ Ratio $R'_{\left(\frac{\theta 1}{\theta 3}\right)}$ | $R'_{\left(\frac{\theta 2}{\theta 3}\right)}$ | Best Fit $SSR_2$ | $SAR_2$ |
|---|---|---|---|---|---|---|
| 212.0 | 0.191319 | 0.136984 | 0.19109 | 0.1016 | $1.25211 \times 10^{-3}$ | $3.56137 \times 10^{-2}$ |
| 212.1 | 0.191253 | 0.136938 | 0.19109 | 0.1016 | $1.24882 \times 10^{-3}$ | $3.55015 \times 10^{-2}$ |
| 212.2 | 0.191187 | 0.136892 | 0.19109 | 0.1016 | $1.24555 \times 10^{-3}$ | $3.53895 \times 10^{-2}$ |
| 212.3 | 0.191122 | 0.136846 | 0.19109 | 0.1016 | $1.24229 \times 10^{-3}$ | $3.52776 \times 10^{-2}$ |
| 212.4 | 0.191056 | 0.136800 | 0.19109 | 0.1016 | $1.23905 \times 10^{-3}$ | $3.52344 \times 10^{-2}$ |
| 212.5 | 0.190990 | 0.136754 | 0.19109 | 0.1016 | $1.23582 \times 10^{-3}$ | $3.52542 \times 10^{-2}$ |
| 212.6 | 0.190924 | 0.136708 | 0.19109 | 0.1016 | $1.23262 \times 10^{-3}$ | $3.52739 \times 10^{-2}$ |
| 212.7 | 0.190859 | 0.136662 | 0.19109 | 0.1016 | $1.22942 \times 10^{-3}$ | $3.52937 \times 10^{-2}$ |

TABLE 6-continued

| Rg (nm) | Calculated $P_\theta$ Ratio | | Observed $P_\theta$ Ratio | | Best Fit | |
|---|---|---|---|---|---|---|
| | $R''\left(\frac{\theta_1}{\theta_3} \text{ Calculated FF2}\right)$ | $R''\left(\frac{\theta_2}{\theta_3} \text{ Calculated FF2}\right)$ | $R'\left(\frac{\theta_1}{\theta_3}\right)$ | $R'\left(\frac{\theta_2}{\theta_3}\right)$ | $SSR_2$ | $SAR_2$ |
| 212.8 | 0.190793 | 0.136617 | 0.19109 | 0.1016 | $1.22625 \times 10^{-3}$ | $3.53135 \times 10^{-2}$ |
| 213.0 | 0.190662 | 0.136525 | 0.19109 | 0.1016 | $1.21995 \times 10^{-3}$ | $3.53530 \times 10^{-2}$ |
| 215.0 | 0.189365 | 0.135622 | 0.19109 | 0.1016 | $1.16046 \times 10^{-3}$ | $3.57465 \times 10^{-2}$ |
| 220.0 | 0.186231 | 0.133449 | 0.19109 | 0.1016 | $1.03795 \times 10^{-3}$ | $3.67073 \times 10^{-2}$ |
| 230.0 | 0.180480 | 0.129442 | 0.19109 | 0.1016 | $8.87770 \times 10^{-4}$ | $3.84522 \times 10^{-2}$ |
| 235.0 | 0.178143 | 0.127595 | 0.19109 | 0.1016 | $8.43386 \times 10^{-4}$ | $3.89426 \times 10^{-2}$ |
| 240.0 | 0.175723 | 0.125844 | 0.19109 | 0.1016 | $8.23898 \times 10^{-4}$ | $3.96106 \times 10^{-2}$ |
| 242.0 | 0.174790 | 0.125168 | 0.19109 | 0.1016 | $8.21152 \times 10^{-4}$ | $3.98682 \times 10^{-2}$ |
| 242.7 | 0.174468 | 0.124935 | 0.19109 | 0.1016 | $8.20820 \times 10^{-4}$ | $3.99570 \times 10^{-2}$ |
| 242.8 | 0.174423 | 0.124902 | 0.19109 | 0.1016 | $8.20799 \times 10^{-4}$ | $3.99697 \times 10^{-2}$ |
| 242.9 | 0.174377 | 0.124869 | 0.19109 | 0.1016 | $8.20784 \times 10^{-4}$ | $3.99823 \times 10^{-2}$ |
| 243.0 | 0.174331 | 0.124836 | 0.19109 | 0.1016 | $8.20775 \times 10^{-4}$ | $3.99949 \times 10^{-2}$ |
| 243.1 | 0.174286 | 0.124803 | 0.19109 | 0.1016 | $8.20773 \times 10^{-4}$ | $4.00075 \times 10^{-2}$ |
| 243.2 | 0.174240 | 0.124770 | 0.19109 | 0.1016 | $8.20776 \times 10^{-4}$ | $4.00201 \times 10^{-2}$ |
| 243.3 | 0.174194 | 0.124737 | 0.19109 | 0.1016 | $8.20787 \times 10^{-4}$ | $4.00327 \times 10^{-2}$ |
| 243.4 | 0.174149 | 0.124704 | 0.19109 | 0.1016 | $8.20803 \times 10^{-4}$ | $4.00452 \times 10^{-2}$ |

As illustrated in Table 6, the $Rg_2$, based on the second form factor ($FF_2$), associated with the best fit was 243.1 nm. Particularly, the $Rg_2$ at 243.1 nm was associated with a minimum deviation between the observed ratios and the calculated ratios. More specifically, the $Rg_2$ at 243.1 nm was associated with a minimum sum of squares residual ($SSR_2$) of a difference between the ratio of the observed light scattering of the first angle relative to the observed light scattering of the third angle ($R'_{\theta1/\theta3}$) and the ratio of the calculated light scattering of the first angle relative to the calculated light scattering of the third angle $$\left(R''_{\frac{\theta1}{\theta3}\text{Calculated }FF2}\right)$$

and a difference between the ratio of the observed light scattering of the second angle relative to the observed light scattering of the third angle ($R'_{\theta2/\theta3}$) and the ratio of the calculated light scattering of the second angle relative to the calculated light scattering of the third angle $$\left(R''_{\frac{\theta2}{\theta3}\text{Calculated }FF2}\right).$$

The minimum sum of squares residual ($SSR_2$) was then utilized to determine a second weighting factor ($FW_2$) based on the second or rodlike form factor ($FF_2$). Specifically, the second weighting factor ($FW_2$) was determined with equation (23):

$$FW_2 = 1/SSR_2 \qquad (23)$$

where the $SSR_2$ was the minimum sum of squares residual associated with the best fit according to the second form factor ($FF_2$). Utilizing equation (23), the second weighting factor ($FW_2$) was determined to be 1218.36.

Determining, Based on a Third Form Factor, a Ratio of the Theoretical or Calculated Light Scattering of the First Angle Relative to the Calculated Light Scattering of the Third Angle and the Calculated Light Scattering of the Second Angle Relative to the Calculated Light Scattering of the Third Angle Based on a third form factor ($FF_3$), a ratio of the calculated light scattering of the first angle relative to the calculated light scattering of the third angle $$\left(R''_{\frac{\theta1}{\theta3}\text{Calculated }FF3}\right)$$

and a ratio of the calculated light scattering of the second angle relative to the calculated light scattering of the third angle $$\left(R''_{\frac{\theta2}{\theta3}\text{Calculated }FF3}\right)$$

was determined for varying Rg values. Particularly, a spherical form factor was selected as the third form factor ($FF_3$) and increasing Rg values were utilized to determine the ratios of the calculated light scattering of the first angle relative to the calculated light scattering of the third angle $$\left(R''_{\frac{\theta1}{\theta3}\text{Calculated }FF3}\right)$$

and the calculated light scattering of the second angle relative to the calculated light scattering of the third angle $$\left(R''_{\frac{\theta2}{\theta3}\text{Calculated }FF3}\right).$$

More particularly, the spherical form factor ($FF_3$) was utilized to determine the calculated scattering of the LALS ($P_{\theta3}$), RALS ($P_{\theta1}$), and HALS ($P_{\theta2}$) at each of the increasing Rg values, and the theoretical scattering of the LALS ($P_{\theta3}$), RALS ($P_{\theta1}$), and HALS ($P_{\theta2}$) was utilized to determine the ratios of the calculated light scattering of the first angle relative to the calculated light scattering of the third angle $$\left(R''_{\frac{\theta1}{\theta3}\text{Calculated }FF3}\right)$$

and the calculated light scattering of the second angle relative to the calculated light scattering of the third angle $$\left(R''_{\frac{\theta 2}{\theta 3}Calculated\ FF3}\right).$$

The theoretical scattering of the LALS ($P_{\theta 3}$), RALS ($P_{\theta}$), and HALS ($P_{\theta 2}$) at each of the increasing Rg values, and the ratios of calculated light scattering of the first angle relative to the calculated light scattering of the third angle $$\left(R''_{\frac{\theta 1}{\theta 3}Calculated\ FF3}\right)$$

and the calculated light scattering of the second angle relative to the calculated light scattering of the third angle $$\left(R''_{\frac{\theta 2}{\theta 3}Calculated\ FF3}\right),$$

based on the third form factor ($FF_3$) at each of the increasing Rg values is represented in an abbreviated form in Table 7.

TABLE 7

| Rg (nm) | $P_\theta$ | | | Calculated $P_\theta$ Ratio | |
| --- | --- | --- | --- | --- | --- |
| | LALS ($P_{\theta 3}$) | RALS ($P_{\theta 1}$) | HALS ($P_{\theta 2}$) | $R''_{\left(\frac{\theta 1}{\theta 3}Calculated\ FF3\right)}$ | $R''_{\left(\frac{\theta 2}{\theta 3}\ Calculated\ FF3\right)}$ |
| 81.6 | 0.97957 | 0.21801 | 0.02624 | 0.222560 | 0.026788 |
| 81.7 | 0.97952 | 0.21709 | 0.02589 | 0.221625 | 0.026428 |
| 81.8 | 0.97947 | 0.21616 | 0.02553 | 0.220692 | 0.026070 |
| 81.9 | 0.97942 | 0.21524 | 0.02519 | 0.219760 | 0.025715 |
| 82.0 | 0.97937 | 0.21432 | 0.02484 | 0.218831 | 0.025364 |
| 82.1 | 0.97932 | 0.21340 | 0.02450 | 0.217904 | 0.025015 |
| 82.2 | 0.97927 | 0.21248 | 0.02416 | 0.216979 | 0.024670 |
| 82.3 | 0.97922 | 0.21157 | 0.02382 | 0.216056 | 0.024328 |
| 83.0 | 0.97887 | 0.20522 | 0.02155 | 0.209652 | 0.022016 |
| 84.0 | 0.97836 | 0.19634 | 0.01855 | 0.200682 | 0.018965 |
| 84.7 | 0.97801 | 0.19025 | 0.01662 | 0.194528 | 0.016998 |
| 84.8 | 0.97795 | 0.18939 | 0.01636 | 0.193657 | 0.016729 |
| 84.9 | 0.97790 | 0.18853 | 0.01610 | 0.192789 | 0.016462 |
| 85.0 | 0.97785 | 0.18767 | 0.01584 | 0.191922 | 0.016197 |
| 85.1 | 0.97780 | 0.18682 | 0.01558 | 0.191058 | 0.015935 |
| 85.2 | 0.97775 | 0.18596 | 0.01533 | 0.190196 | 0.015677 |
| 85.3 | 0.97770 | 0.18511 | 0.01508 | 0.189336 | 0.015420 |
| 85.4 | 0.97764 | 0.18426 | 0.01483 | 0.188478 | 0.015167 |
| 85.5 | 0.97759 | 0.18342 | 0.01458 | 0.187622 | 0.014916 |

Determining a Best Fit of the Observed Ratios to the Calculated or Theoretical Ratios A best fit of the ratio of the observed light scattering of the first angle relative to the observed light scattering of the third angle ($R'_{\theta 1/\theta 3}$) to the ratio of the calculated light scattering of the first angle relative to the calculated light scattering of the third angle $$\left(R''_{\frac{\theta 1}{\theta 3}Calculated\ FF3}\right)$$

and the ratio of the observed light scattering of the second angle relative to the observed light scattering of the third angle ($R'_{\theta 2/\theta 3}$) to the ratio of the calculated light scattering of the second $$\left(R''_{\frac{\theta 2}{\theta 3}Calculated\ FF3}\right)$$

was determined. The best fit utilized an iterative process similar to the random coil and rodlike form factors discussed above. The best fit, similar to the first and second form factors ($FF_1$, $FF_2$), was determined by the convergence of the ratio of the observed light scattering of the first angle relative to the observed light scattering of the third angle ($R'_{\theta 1/\theta 3}$) to the ratio of the calculated light scattering of the first angle relative to the calculated light scattering of the third angle $$\left(R''_{\frac{\theta 1}{\theta 3}Calculated\ FF3}\right)$$

and the ratio of the observed light scattering of the second angle relative to the observed light scattering of the third angle ($R'_{\theta 2/\theta 3}$) to the ratio of the calculated light scattering of the second angle relative to the calculated light scattering of the third angle $$\left(R''_{\frac{\theta 2}{\theta 3}Calculated\ FF3}\right).$$

The convergence was determined with the minimum sum of squares residual ($SSR_3$) as well as with the minimum sum of the absolute residuals ($SAR_3$).

The $Rg_3$, based on the third form factor ($FF_3$), associated with the best fit was 81.9 nm. Particularly, the $Rg_3$ at 81.9 nm was associated with a minimum deviation between the observed ratios and the calculated ratios. More specifically, the $Rg_3$ at 81.9 nm was associated minimum sum of squares residual ($SSR_3$) of a difference between the ratio of the observed light scattering of the first angle relative to the observed light scattering of the third angle ($R'_{\theta 1/\theta 3}$) and the ratio of the calculated light scattering of the first angle relative to the calculated light scattering of the third angle $$\left(R''_{\frac{\theta 1}{\theta 3}Calculated\ FF3}\right)$$

and a difference between the ratio of the observed light scattering of the second angle relative to the observed light scattering of the third angle ($R'_{\theta 2/\theta 3}$) and the ratio of the calculated light scattering of the second angle relative to the calculated light scattering of the third angle $$\left(R''_{\frac{\theta 2}{\theta 3}Calculated\ FF3}\right).$$

The minimum sum of squares residual ($SSR_3$) was then utilized to determine a third weighting factor ($FW_3$) based on the third or spherical form factor ($FF_3$). Specifically, the third weighting factor ($FW_3$) was determined according to equation (24):

$$FW_3 = 1/(SSR_3) \tag{24}$$

where the $SSR_3$ was the minimum sum of squares residual associated with the best fit according to the third form factor $(FF_3)$. Utilizing equation (24), the third weighting factor $(FW_3)$ was determined to be 151.964.

Determining Respective Form Factor Contributions for Each of the Form Factors

After determining the first, second, and third weighting factors $(FW_1, FW_2, FW_3)$, respective form factor contributions (FC) for each of the form factors $(FF_1, FF_2, FF_3)$ was determined based on the first, second, and third weighting factors $(FW_1, FW_2, FW_3)$. Specifically, a first form factor contribution $(FC_1)$, a second form factor contribution $(FC_2)$, and a third form factor contribution $(FC_3)$ for the first form factor $(FF_1)$, the second form factor $(FF_2)$, and the third form factor $(FF_3)$ was determined based on the first weighting factor $(FW_1)$, the second weighting factor $(FW_2)$, and the third weighting factor $(FW_3)$, respectively. The first, second, and third form factor contributions $(FC_1, FC_2, FC_3)$ were determined according to equations (25a, 25b, 25c), respectively.

$$FC_1 = \frac{FW_1}{\sum FW_i}, \tag{25a}$$

$$FC_2 = \frac{FW_2}{\sum FW_i}, \tag{25b}$$

$$FC_3 = \frac{FW_3}{\sum FW_i}, \tag{25c}$$

where $\sum FW_i$ is the sum of each of the weighting factors. The calculated form factor contributions were as follows: $FC_1=0.999993$, $FC_2=0.000006$, and $FC_3=0.000001$, for the random coil form factor $(FF_1)$, the rodlike form factor $(FF_2)$, and the spherical form factor $(FF_3)$, respectively.

Determining the Assumption-Free Radius of Gyration with the Form Factor Contributions After determining the first, second, and third form factor contributions $(FC_1, FC_2, FC_3)$, the assumption-free radius of gyration (Rg) was determined. Specifically, the assumption-free Rg was determined by utilizing the respective radius of gyration (Rg) associated with the best fit of the respective form factor (FF). Tables 8, 9, and 10, summarize the determined or calculated values with respect to the random coil form factor $(FF_1)$, the rodlike form factor $(FF_2)$, and the spherical form factor $(FF_3)$, respectively.

TABLE 8

| Random Coil Form Factor $(FF_1)$ | $P(\theta)_{FF1}$ Calculated | Calculated R" Ratio | Observed R' Ratio |
|---|---|---|---|
| LALS (R3) | 0.951749 | 1 | 1 |
| RALS (R1) | 0.181801 | 0.191018 | 0.19109 |
| HALS (R2) | 0.096709 | 0.101612 | 0.10160 |
| $SSR_1$ | | 5.3026E−9 | |
| Weighting Factor $(FW_1)$ | | 1.8859E8 | |
| Rg | | 127.2 nm | |

TABLE 9

| Rodlike Form Factor $(FF_2)$ | $P(\theta)_{FF2}$ Calculated | Calculated R" Ratio | Observed R' Ratio |
|---|---|---|---|
| LALS (R3) | 0.839268 | 1 | 1 |
| RALS (R1) | 0.146272 | 0.174268 | 0.19109 |

TABLE 9-continued

| Rodlike Form Factor $(FF_2)$ | $P(\theta)_{FF2}$ Calculated | Calculated R" Ratio | Observed R' Ratio |
|---|---|---|---|
| HALS (R2) | 0.104743 | 0.124803 | 0.10160 |
| $SSR_2$ | | 8.2077E−4 | |
| Weighting Factor $(FW_2)$ | | 1.2184E3 | |
| Rg | | 243.1 nm | |

TABLE 10

| Spherical Form Factor $(FF_3)$ | $P(\theta)_{FF3}$ Calculated | Calculated R" Ratio | Observed R' Ratio |
|---|---|---|---|
| LALS (R3) | 0.979424 | 1 | 1 |
| RALS (R1) | 0.215239 | 0.219760 | 0.19109 |
| HALS (R2) | 0.025186 | 0.025715 | 0.10160 |
| $SSR_3$ | | 6.5805E−3 | |
| Weighting Factor $(FW_3)$ | | 1.5196E2 | |
| Rg | | 81.9 nm | |

As indicated above in Tables 8-10, the radius of gyration associated with the best fit of the random coil form factor $(FF_1)$ was 127.2 nm, the radius of gyration associated with the best fit of the rodlike form factor $(FF_2)$ was 243.1 nm, and the radius of gyration associated with the best fit of the spherical form factor $(FF_3)$ was 81.9 nm. The assumption-free radius of gyration (Rg) was then determined with equation (26):

$$Rg_{Assumption-Free} = \sum FC_i \times Rg_i, \tag{26}$$

where $\sum FC_i \times Rg_i$ is the sum of each of the form factor contributions $(FC_i)$ multiplied by the respective radius of gyration $(Rg_i)$ associated with the best fit of the respective form factor (FF). As such, utilizing the three form factors $(FF_1, FF_2, FF_3)$ provided equations (27a, 27b):

$$Rg_{Assumption-Free} = (FC_1 \times Rg_1) + (FC_2 \times Rg_2) + (FC_3 \times Rg_3) \tag{27a}$$

$$Rg_{AF} = (0.999993 \times 127.2 \text{ nm}) + \tag{27b}$$
$$(0.000006 \times 243.1 \text{ nm}) + (0.000001 \times 81.9 \text{ nm})$$

The calculated assumption-free radius of gyration $(Rg_{Assumption-Free})$ was determined to be about 127.2 nm. It should be noted that the iteration in Example 1 was increased at increments of about 0.1 nm around the area of minimum residuals. It should be appreciated that iterating at smaller increments, such as about 0.01 nm, results in a more precise and/or accurate assumption-free Rg of 127.18 nm.

As determined above, the form factor contribution $(FC_1)$ of the random coil form factor $(FF_1)$, 0.999993 was several orders of magnitude greater than the form factor contributions $(FC_2, FC_3)$ of the rodlike and spherical form factors $(FF_2, FF_3)$, and it was almost exactly 1, or 100% of the blend composition. As such, it may be determined, as confirmed by the assumption-free Rg, that the particle was substantially similar to a random coil. It should be noted, that when the iteration was extended to a precision of 0.01 nm, the $FC_1$ value increased to 0.999997, demonstrating that iterating to a smaller increment led to better or improved differentiation of structure. It should be appreciated that the increased precision may require significant digitization resolution and attention to the baseline setting of the light scattering signal.

Example 2

The molecular weight of the sample of Example 1 was determined according to the methods disclosed herein. To determine the molecular weight, the molecular weight constant or calibration constant (K) was determined according to Equation 12a. The calibration constant (K) was determined to be 18,183 Da/(LALS/RI), as indicated in Table 1. After determining the calibration constant (K), a weighted average of the $P_\theta$ value of the sample at the third angle ($\theta_3$), or $P_{LALS}$, was determined with the form factor contributions (FC$_1$, FC$_2$, FC$_3$) from each of the form factors (FF$_1$, FF$_2$, FF$_3$) according to Equation (14).

$$P_{\theta3} = (P_{(\theta3)FF1\ Calculated} \times FC_1) + \tag{14}$$
$$(P_{(\theta3)FF2\ Calculated} \times FC_2) + (P_{(\theta3)FF3\ Calculated} \times FC_3),$$
$$P_{\theta3} = (0.951749 \times 0.999993) + (0.839268 \times 0.000006) +$$
$$(0.979424 \times 0.000001)$$
$$= 0.951748$$

The molecular weight of the particles as determined at the third angle ($\theta_3$), was then determined according to Equation (13).

$$\text{Molecular Weight}_{Unknown} = (K/P_\theta) \times (LS\ \text{Area}/RI\ \text{Area}) \tag{13}$$
$$\text{Molecular Weight}_{Unknown} =$$
$$(18,183/0.951748) \times (1283.21/4.147) = 5,911,630\ Da,$$

The molecular weight of the particles as determined at the first angle ($\theta_1$) and the second angle ($\theta_2$) was similarly determined according to Equation (13). Particularly, to determine the molecular weight of the particles at the first angle ($\theta_1$), the $P_{\theta1}$ or $P_{RALS}$, as represented by Equation (15) was utilized. Further, to determine the molecular weight of the particles at the second angle ($\theta_2$), the $P_{\theta2}$ or $P_{HALS}$, as represented by Equation (16) was utilized. The $P_{RALS}$ and the $P_{HALS}$ values were determined to be 0.182291 and 0.096996, respectively. Using the $P_{RALS}$ and the $P_{HALS}$ values, the respective molecular weight of the particles as determined with Equation (13) at the first angle ($\theta_1$) and the second angle ($\theta_2$) was 5,912,954 Da and 5,910,143 Da, respectively. The results are summarized in Table 11.

The average molecular weight and the standard deviation was also determined by averaging the molecular weight provided by each of the independent weighted $P_\theta$ values. As indicated in Table 11, the average molecular weight was 5,911,576 Da, and the standard deviation was 1,406.

TABLE 11

| | LALS | RALS | HALS |
|---|---|---|---|
| LS/RI Area | 309.4309 | 59.1201 | 31.4340 |
| MW Constant (Da/(LS/RI)) | 18,183 | 18,183 | 18,183 |
| Nominal MW (Da) | 5,626,382 | 1,074,981 | 571,564 |
| $P_\theta$ Weighted | 0.951748 | 0.181801 | 0.096709 |
| MW Corrected for $P_\theta$ (Da) | 5,911,630 | 5,912,954 | 5,910,143 |

TABLE 11-continued

| | LALS | RALS | HALS |
|---|---|---|---|
| Average MW (Da) | | 5,911,576 | |
| Std Dev | | 1,406 | |

It was surprisingly and unexpectedly discovered that a molecular weight having improved accuracy and precision was provided via the methods disclosed herein. Particularly, the standard deviation calculated demonstrated the relatively high precision for determining the molecular weight. It was also surprisingly and unexpectedly discovered that the methods disclosed herein may provide a standard deviation to facilitate or assess the accuracy and/or precision of the molecular weight calculated.

Example 3

The assumption-free Rg of a narrow polystyrene sample having a nominal molecular weight of about 4,500,000 Da was determined. The system was calibrated with a known narrow polystyrene standard. The sample and calibrant were run in THF and the light scattering incident beam used a wavelength of 660 nm. Angular data was collected between 12 degrees and 164 degrees, with increments or spacing of 8 degrees.

Figure 4:
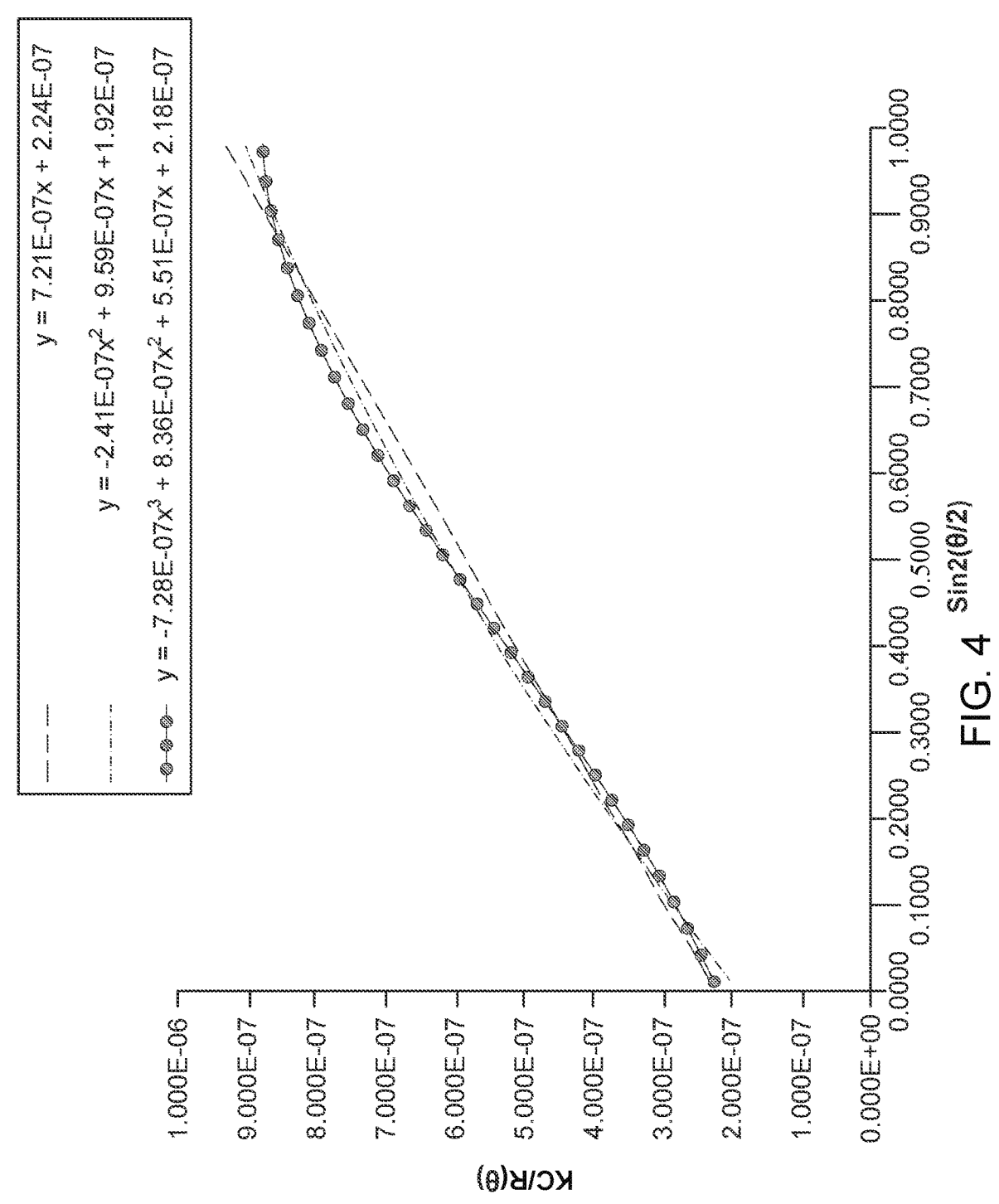
FIG. 4 illustrates a first order, a second order, and a third order polynomial fitting of a Zimm Plot of Example 3.

After calibration, notable skewing (bending downwards) was observed at high angles with the 4,500,000 polystyrene via extrapolation of the Zimm Plot, as illustrated in FIG. 4. FIG. 4 illustrates a $1^{st}$ order, a $2^{nd}$ order, and a $3^{rd}$ order polynomial fitting of the Zimm Plot. Without being bound by theory, it is believed that a possible source of the skewing in the Zimm Plot may be at least partially attributed to back-reflections within the cell. The skewing is concerning as the respective slope at the intercept for the $1^{st}$ order, a $2^{nd}$ order, and a $3^{rd}$ order polynomial are $7.21 \times 10^{-7}$, $9.59 \times 10^{-7}$, and $5.51 \times 10^{-7}$, respectively, yielding Rg values of 117 nm, 134 nm, and 101 nm, respectively. The intercept values yielded MW estimations of 4,475,000 Da, 5,187,000 Da, and 4,565,000 Da, respectively. The broad range or distribution of values for the respective slopes, which are utilized for the determination of Rg, contributed to inaccuracies or lack of precision. It should be appreciated by one having ordinary skill in the art that if the sample was a broad-distribution sample, as opposed to the narrow sample utilized, a conventional fit (e.g., polynomial fit order via Zimm, Berry, etc.) would need to be adjusted as a function of molecular weight to maintain accuracy, or high angles would have to be removed to accurately determine the Rg. The methods disclosed herein, however, do not rely on any specific polynomial fit order from Zimm plots, Debye, Berry, Guinier, and the like. As such, inappropriate skewing in polynomial fit is largely eliminated via the methods disclosed herein. Therefore, form factor models are less inclined to produce an inappropriate slope estimate (or a slope resulting in the calculation of an undefined "complex" Rg wherein $Rg^2 < 0$). In such a case, an assumption-free Rg improves accuracy also on measurements of low Rg values even when selectivity of the preferred form factor contribution (FC) is not substantial. Because the weighting factors can be determined at each chromatographic slice, independent slice measurements of Rg can be made without needing to change the fitting function with this method.

According to methods disclosed herein, one of the measured angles was utilized as a reference angle. Particularly, the lowest angle at 12° was utilized as the reference angle, and a series of R″ ratios for the random coil, rodlike, and spherical form factors (FF$_1$, FF$_2$, FF$_3$) were determined. Table 12 summarizes the respective Observed R′ ratios and the respective Calculated R″ ratios as a function of angle for each of the random coil, rodlike, and spherical form factors at the Rg associated with the best fit (i.e., the minimum sum of the squares of residuals (SSR)).

The respective Rg associated with the minimum sum of the squares of residuals (SSR) for the random coil, rodlike, and spherical form factors (FF$_1$, FF$_2$, FF$_3$) were 106 nm, 117 nm, and 83 nm, respectively, as indicated in Table 12. The form factor contributions (FC) from the SSR and the assumption-free Rg obtained from the SAR and the SSR are also indicated in Table 12. It should be appreciated that the methods for determining the respective Rg associated with the best fit, the form factor contribution (FC), and the assumption-free Rg obtained from the SAR and the SSR are described above with respect to Example 1. The variability between the assumption-free Rg and the observed Rg by polynomial fits of the Zimm Plot may be at least partially attributed to the relatively poor fit or skewing at higher angles due to the unexpected curvature at high angles. Based on the form factor contribution (FC), the random coil form factor was selected as the most preferred structure.

The molecular weight averaged for all angles and corrected for P$_\theta$ contributions of the average calculated form factor via optimization criteria for both the sum of absolute residuals (SAR) and sum of squares residual square (SSR) are indicated in Table 12.

To improve the assumption-free Rg determined, a method or process of a rejection criteria was implemented. Particularly, the two lowest angles (i.e., 12° and) 20° and the six highest angles (i.e., 124°, 132°, 140°, 148°, 156°, and) 164° were not utilized, thereby implementing an angular selection from 28° to 116°. The respective assumption-free radius of gyrations (Rg) obtained from the SAR and the SSR after implementing the rejection criteria are summarized in Table 13.

TABLE 13

| | Random Coil | Rodlike | Spherical |
|---|---|---|---|
| SSR | 0.000668 | 0.006200 | 0.024383 |
| SAR | 0.073164 | 0.219827 | 0.470352 |
| Rg (nm) 1/SSR | 110 | 121 | 87 |
| Rg (nm) 1/SAR | 111 | 117 | 89 |
| FC 1/SSR | 0.9878 | 0.0115 | 0.0007 |
| FC 1/SAR | 0.9754 | 0.0010 | 0.0236 |
| Rg$_{Assumption\text{-}Free}$ 1/SSR | | 110 nm | |
| Rg$_{Assumption\text{-}Free}$ 1/SAR | | 111 nm | |
| MW 1/SSR | | 4,458,000 ± 82,600 Da | |
| MW 1/SAR | | 4,486,000 ± 73,900 Da | |

TABLE 12

| Angle (°) | Random Coil | | Rodlike | | Spherical | |
|---|---|---|---|---|---|---|
| | R′ | R″ | R′ | R″ | R′ | R″ |
| 20 | 0.960965 | 0.951103 | 0.960965 | 0.940933 | 0.960965 | 0.968748 |
| 28 | 0.889431 | 0.885349 | 0.889431 | 0.863023 | 0.889431 | 0.924161 |
| 36 | 0.804992 | 0.809713 | 0.804992 | 0.776062 | 0.804992 | 0.868711 |
| 44 | 0.719822 | 0.730845 | 0.719822 | 0.689213 | 0.719822 | 0.805283 |
| 52 | 0.640266 | 0.654073 | 0.640266 | 0.609438 | 0.640266 | 0.736905 |
| 60 | 0.563252 | 0.582996 | 0.563252 | 0.540806 | 0.563252 | 0.666512 |
| 68 | 0.499668 | 0.519566 | 0.499668 | 0.484652 | 0.499668 | 0.59671 |
| 76 | 0.444588 | 0.464435 | 0.444588 | 0.440286 | 0.444588 | 0.529672 |
| 84 | 0.401059 | 0.417401 | 0.401059 | 0.405888 | 0.401059 | 0.467046 |
| 92 | 0.371156 | 0.377785 | 0.371156 | 0.379287 | 0.371156 | 0.409956 |
| 100 | 0.335675 | 0.344712 | 0.335675 | 0.358483 | 0.335675 | 0.359045 |
| 108 | 0.312822 | 0.317284 | 0.312822 | 0.341894 | 0.312822 | 0.314546 |
| 116 | 0.295356 | 0.276166 | 0.295356 | 0.3284 | 0.295356 | 0.276383 |
| 124 | 0.282507 | 0.261163 | 0.282507 | 0.317274 | 0.282507 | 0.24426 |
| 132 | 0.273694 | 0.249184 | 0.273694 | 0.308073 | 0.273694 | 0.217751 |
| 140 | 0.268231 | 0.239848 | 0.268231 | 0.300535 | 0.268231 | 0.196373 |
| 148 | 0.26471 | 0.232866 | 0.26471 | 0.294508 | 0.26471 | 0.179644 |
| 156 | 0.263485 | 0.228024 | 0.263485 | 0.289897 | 0.263485 | 0.167127 |
| 164 | 0.258538 | 0.228024 | 0.258538 | 0.286643 | 0.258538 | 0.158459 |
| SSR | 0.005088 | | 0.012927 | | 0.092351 | |
| SAR | 0.248118 | | 0.462200 | | 1.170126 | |
| Rg (nm) 1/SSR | 106 | | 117 | | 83 | |
| Rg (nm) 1/SAR | 107 | | 118 | | 83 | |
| FC (1/SSR) | 0.8636 | | 0.1338 | | 0.0026 | |
| FC (1/SAR) | 0.7501 | | 0.2162 | | 0.0337 | |
| Rg$_{Assumption\text{-}Free}$ (1/SSR) | | | 107 nm | | | |
| Rg$_{Assumption\text{-}Free}$ (1/SAR) | | | 109 nm | | | |
| MW (1/SSR) | | | 4,403,000 ± 181,400 Da | | | |
| MW (1/SAR) | | | 4,429,000 ± 172,700 Da | | | |

It was surprisingly and unexpectedly discovered that the assumption-free Rg determined were consistent. It was also surprisingly and unexpectedly discovered that the assumption-free Rg resulted in consistent $P_\theta$ corrected molecular weight extrapolations without requiring a fit order or the elimination of angles, which is commonly practiced in multi angle light scattering. It should be noted, however, that the form factor contribution specificity is dependent upon ideal light scattering behavior. For example, the light scattering detector utilized in Example 1 was designed specifically to eliminate back-reflections into the cell along with increased sensitivity, and its determination using three angles produced particularly precise molecular weight determinations and exhibited a relatively higher form factor contribution (FC) sensitivity than was determined here in Example 3. However, when we eliminated the two lowest angles and the six highest angles where signal to noise was inferior or skewed, the inventors were able to detect the fit improvement via the form factor contribution (FC) of the form factor that most closely resembles the polymer.

It should be appreciated that by examining the specificity of the form factor contribution (FC), the inventors have provided a direct means for determining the aptness of a MALS calibration and calculation by using particles of molecular structures that correspond to a known form factor as inputs. The Examples also demonstrated that the methods disclosed and utilized are applicable to MALS detectors having an approximate angular range (e.g., highest minus the lowest angle of less than 160° and can be utilized to 90° or less). Nonetheless, it should further be appreciated that even if the form factor contribution is somewhat indeterminant, the assumption-free Rg will still be accurate as all of the form factor Models utilized converge to a straight line at low Rg.

Example 4

To improve the assumption-free Rg determined in Example 3, a method or process of a rejection criteria was implemented. The method for the rejection criteria included utilizing the respective minimum sum of squares residual or the respective minimum sum of squares absolute for each of the form factors, and the number of angular ratios or angles utilized by the detector. Particularly, the rejection criteria was implemented by dividing the respective minimum sum of squares residual or the respective minimum sum of squares absolute by the number of angular ratios. In Example 3, a total of 20 angles were utilized in the detector resulting in a total of 19 angular ratios. The respective minimum sum of squares residual and the respective minimum sum of squares absolute for each of the form factors, after implementing the rejection criteria, are summarized in Table 14.

TABLE 14

|  | 12 to 164 degrees | 28 to 116 degrees | 12 to 92 Degrees |
|---|---|---|---|
| $SSR_{Corrected}$ Random Coil FF | $2.6779 \times 10^{-4}$ | $3.3748 \times 10^{-5}$ | $4.0497 \times 10^{-5}$ |
| $SAR_{Corrected}$ Random Coil FF | $1.3059 \times 10^{-2}$ | $4.2747 \times 10^{-3}$ | $5.1296 \times 10^{-3}$ |
| $Rg_{Assumption-Free}$ (nm) SAR | 107 | 110 | 109 |
| $Rg_{Assumption-Free}$ (nm) SAR | 108 | 111 | 109 |

Thus, one can propose to include and/or exclude angles in the sum of squares and observe the significance or insignificance thereof. As illustrated in Table 14, the $SSR_{Corrected}$ and $SAR_{Corrected}$ for the Random Coil form factor decreases when eliminating angles and observing angles from the broadest range (i.e., 12° to) 164° to a more limited range (i.e., 28° to) 116°. This surprisingly and unexpectedly indicated increased accuracy and precision when implementing the rejection criteria. As further illustrated in Table 14, however, neither the $SSR_{Corrected}$ nor the $SAR_{Corrected}$ for the Random Coil form factor improved when only eliminating higher angles (i.e., greater than) 92°. It should be appreciated that Example 4 only evaluates the SAR and SSR of the predominant form factor (i.e., random coil form factor).

Figure 5:
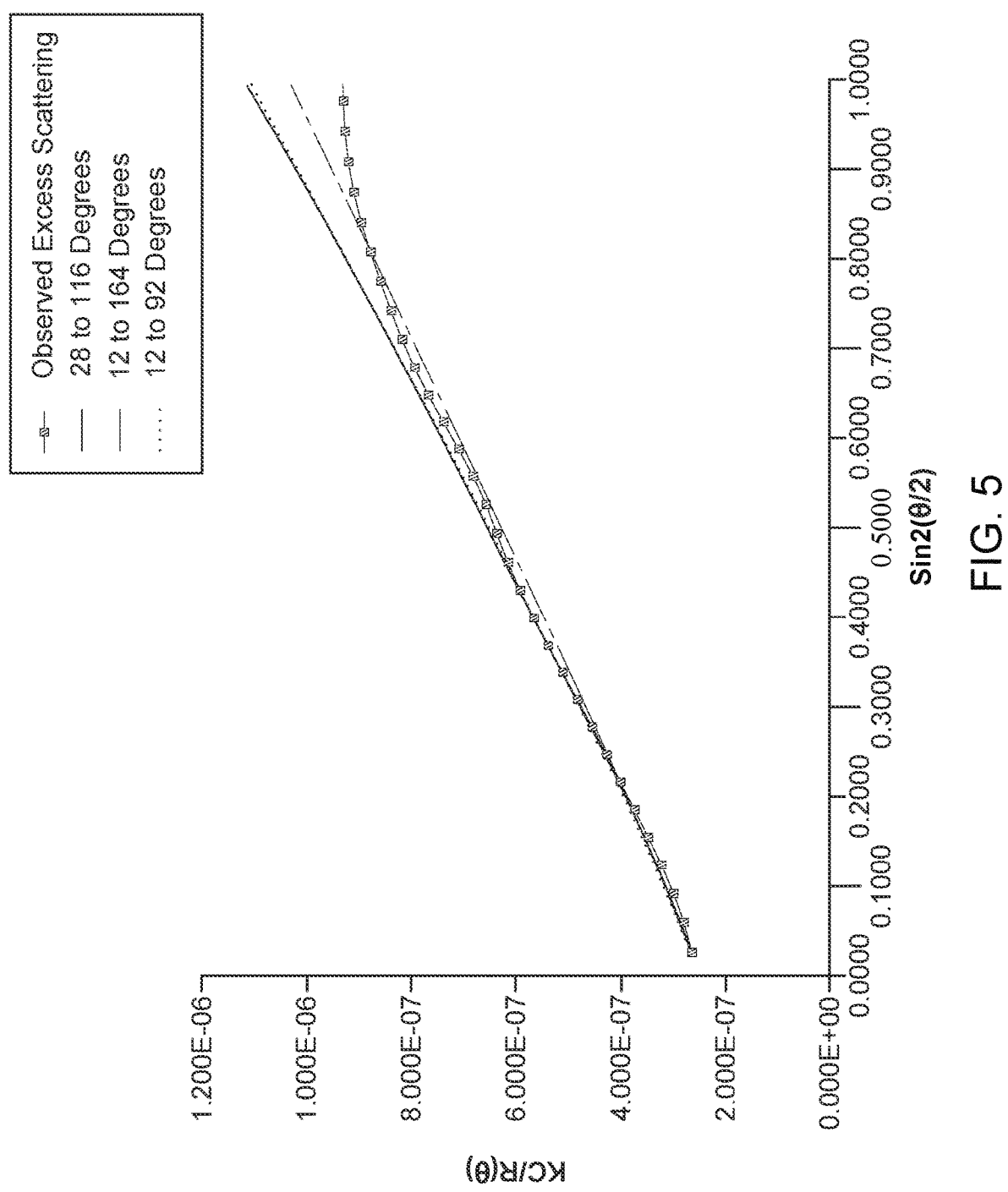
FIG. 5 illustrates a plot of the assumption-free Rg extrapolated using the angular data for each of the ranges disclosed in Table 15 of Example 4.

FIG. 5 illustrates a plot of the assumption-free Rg extrapolated using the angular data for each of the ranges disclosed in Table 14. It should be appreciated that the high angles that were not consistent with light scattering theory were automatically excluded from the fit using the rejection criteria. In a conventional method utilizing a Zimm analysis, however, the operator would manually exclude points or fit the plot to a higher order polynomial, which results in inaccuracies and/or inconsistencies in generating a stable slope at zero angle. Particularly, the respective y-intercept and slope at the y-intercept of the plot in FIG. 5 were relatively more consistent and accurate as compared to the respective y-intercept and slope at the y-intercept of the Zimm plot in FIG. 4.

Example 5

The methods disclosed herein were utilized to evaluate branched particles as compared to conventional methods. Particularly, the assumption-free Rg and the molecular weight of the branched particles were determined with the methods disclosed herein and compared with conventional methods for determining Rg and molecular weight. The branched particles were a broad dextran having a nominal molecular weight of about 990,000 Da. The dextran particles were evaluated according to the methods disclosed herein to determine the assumption-free Rg and the molecular weight, and thereby describe the composite molecular shape thereof.

The system of Example 1 was utilized. The light scattering detector was aligned and normalized with known polymer standards.

Figure 6:
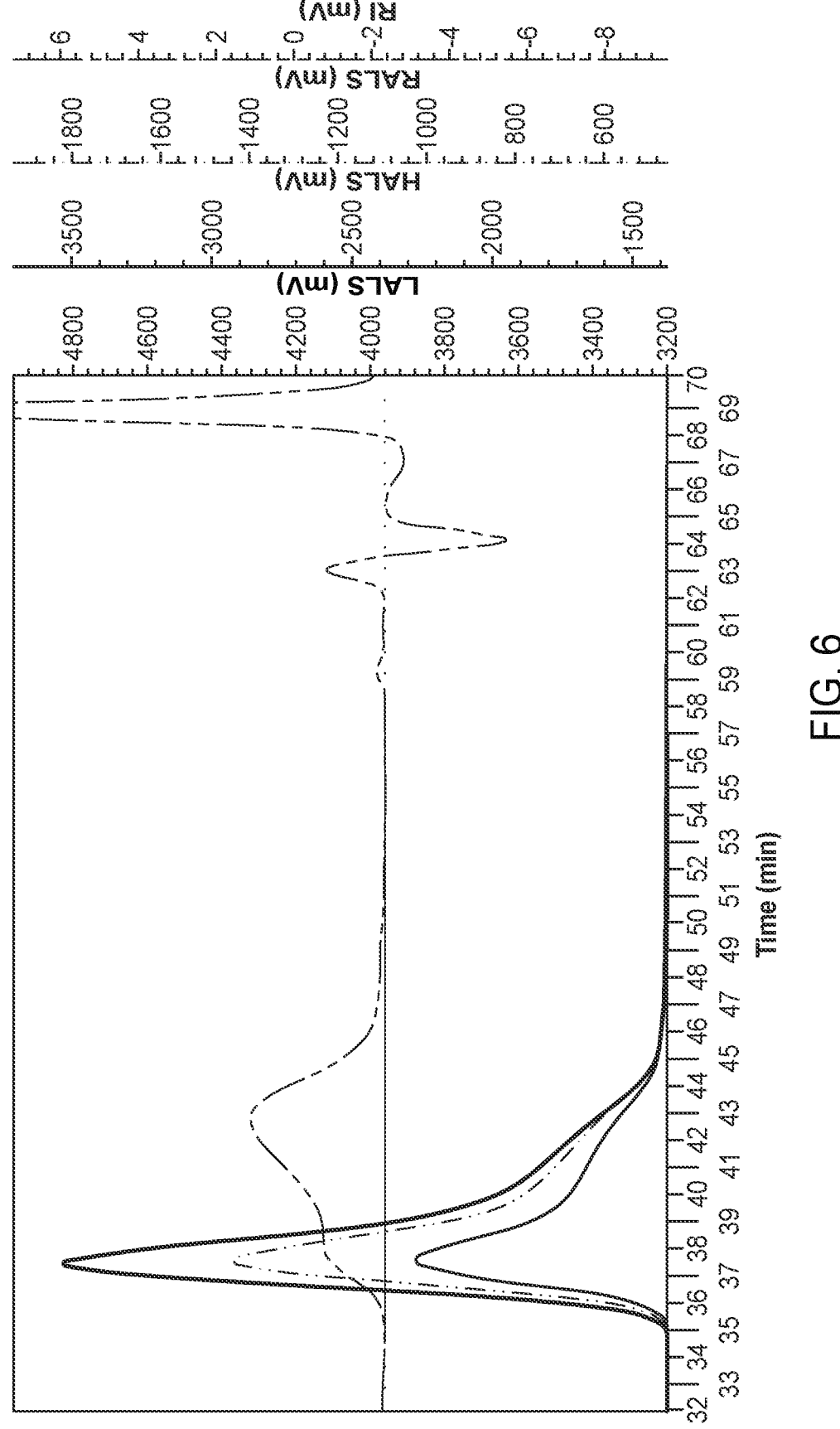
FIG. 6 illustrates a chromatogram of the sample of branched particles of Example 5.

The broad dextran sample from American Polymer Standards (D990K) was injected into the system and the detector signals were integrated, and the molecular weight results by LALS were calculated. A chromatogram of the sample is illustrated in FIG. 6. As illustrated in FIG. 6, the sample included a combination of high molecular weight species as well as low molecular weight species. This combination of high and low molecular weight species was expected.

Using conventional methods of calculating, an integration range about or around the lower molecular weight peak position was made. Specifically, an integration range of from about 42 min to about 43 min, which was representative of the lower molecular weight species or component of the sample, was evaluated via conventional methods. The conventional light scattering methods provided an Rg of about 23.0, and a weight average molecular weight of about 477,400 Da. The Rg and weight average molecular weight is summarized in Table 15.

Utilizing the exemplary methods disclosed herein (i.e., assumption-free method), the $P_\theta$ values were determined via $SSR_2$ minimization (Equation 4C and 5C) and the weight factors (FW) were determined similar to Example 1. The assumption-free Rg determined was also determined to be 23.4 nm for the low molecular weight species. The estimated molecular weight was determined with the form factor contributions (FC), similar to Example 2. The assumption-free Rg and weight average molecular weight are summarized in Table 15.

TABLE 15

|  | LALS | RALS | HALS |
|---|---|---|---|
| ASSUMPTION-FREE METHOD CALCULATIONS | | | |
| LS/RI Area | 63.6420 | 57.8013 | 52.5507 |
| MW Constant (Da/(LS/RI)) | 7,378 | 7,378 | 7,378 |
| Nominal MW (Da) | 469,574 | 426,479 | 387,738 |
| $P_\theta$ Weighted | 0.99848 | 0.90559 | 0.82314 |
| MW Corrected for $P_\theta$ (Da) | 470,292 | 471,016 | 471,067 |
| Average MW (Da) | | 470,792 | |
| Std Dev | | 433 | |
| Assumption-Free Rg (nm) | | 23.4 | |
| CONVENTIONAL METHOD CALCULATIONS | | | |
| Average MW (Da) | | 477,407 | |
| Rg (nm) | | 23.0 | |

As indicated in Table 15, utilizing the exemplary methods disclosed herein provided an Rg that was in agreement with conventional methods. Specifically, the assumption-free Rg ($Rg_{AF}$=23.4 nm) was consistent with the Rg determined via the conventional method (Rg=23.0 nm).

After demonstrating an agreement between the Rg determined via the conventional light scattering method and the assumption-free Rg, an integration range about or around the higher or highly branched high molecular weight region was evaluated. Specifically, an integration range of from about 37 min to about 38 min, which was representative of the higher molecular weight species or component of the sample was evaluated via conventional methods. The conventional methods provided an Rg of about 41.9 nm, which produced a weight average molecular weight of about 8,437,000 Da. The Rg and weight average molecular weight is summarized in Table 16.

Utilizing the exemplary methods disclosed herein (e.g., assumption-free method), the $P_\theta$ values were determined via $SSR_2$ minimization and the weight factors (FW) similar to Example 1. The assumption-free Rg determined was also determined to be 43.2 nm for the high molecular weight species. The estimated molecular weight was determined with the form factor contributions (FC), similar to Example 2. The assumption-free Rg and weight average molecular weight are summarized in Table 16.

TABLE 16

|  | LALS | RALS | HALS |
|---|---|---|---|
| ASSUMPTION-FREE METHOD CALCULATIONS | | | |
| LS/RI Area | 1146.3972 | 828.8600 | 605.4601 |
| MW Constant (Da/(LS/RI)) | 7,378 | 7,378 | 7,378 |
| Nominal MW (Da) | 8,458,531 | 6,115,627 | 4,467,303 |
| $P_\theta$ Weighted | 0.99480 | 0.71741 | 0.52688 |
| MW Corrected for $P_\theta$ (Da) | 8,502,734 | 8,524,614 | 8,478,841 |
| Average MW (Da) | | 8,502,063 | |
| Std Dev | | 22,894 | |
| Assumption-Free Rg (nm) | | 43.2 | |
| CONVENTIONAL METHOD CALCULATIONS | | | |
| Average MW (Da) | | 8,437,092 | |
| Rg (nm) | | 41.9 | |

As indicated in Table 16, utilizing the exemplary methods disclosed herein provided an Rg that was in agreement with conventional methods. Specifically, the assumption-free Rg ($Rg_{AF}$=43.2 nm) was consistent with the Rg determined via the conventional light scattering method (Rg=41.9 nm).

After demonstrating an agreement between the Rg determined via the conventional light scattering method and the assumption-free Rg for the high molecular weight region, the form factor contributions for a random coil form factor, a rodlike form factor, and a spherical form factor, were determined, similar to that described in Example 1. The respective form factor contributions (FC) determined for each of the random coil form factor, the rodlike form factor, and the spherical form factor are summarized in Table 17.

TABLE 17

|  | Random Coil | Rodlike | Spherical |
|---|---|---|---|
| Form Factor Contribution | 0.36 | 0.08 | 0.56 |
| Form Factor Contribution (%) | 36% | 8% | 56% |

As indicated in Table 17, the dextran sample was not fully represented by a single form factor. Specifically, the form factor for the random coil and the sphere were emphasized. As such, the form factor contributions of Table 17 demonstrated that the dextran sample was best represented by a combination of a random coil form factor and a spherical form factor. It was further concluded that the dextran sample was not well represented by the rodlike form factor. Without being bound by theory, it is believed that the dextran sample was best described as having about 40% random coil and about 60% spherical features, properties, and/or substructures. As such, from a density perspective, it was determined that the structure was between a random coil and a sphere. It should be appreciated that the more highly branched the dextran sample, the more likely the particle or dextran would be represented by a spherical form factor. Further, the less branched the dextran sample, the more likely the particle or dextran would be represented by a random coil form factor. As such, without being bound by theory, it is believed that the respective form factor contribution (FC) of the random coil form factor and the spherical form factor may be utilized to determine the relative level or degree of branching. It should be appreciated, that as sample Rg increases, the specificity of the form factor contribution (FC) will increase since the form factors will diverge more at higher Rg values.

Overall, it was demonstrated that the exemplary methods disclosed herein were able to determine an assumption-free Rg at least in agreement, consistent, or more accurate than conventional methods. It was further demonstrated that the exemplary methods disclosed herein provided additional perspective or information regarding the structure of the particles through evaluation of the respective form factor contributions of each of the form factors. Further, unlike conventional branching calculations in size exclusion chromatography (SEC), the exemplary methods disclosed herein do not require a linear reference comparator, and can be performed on very low polydispersity ranges as well as on broad polydisperse samples to show structural heterogeneity independent of references. In addition to the foregoing, it should be appreciated that the form factor contributions are a function of Rg, and as such, mass, dn/dc, concentration profile, and/or molecular weight determinations are not necessary.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A method performed by a computer system for determining an assumption-free radius of gyration (Rg) of particles in solution using a light scattering detector, the method comprising:

obtaining, by the computer system, light scattering intensities of the particles in the solution from the light scattering detector, wherein the light scattering intensities comprise a first scattering intensity ($I_{\theta1}$), a second scattering intensity ($I_{\theta2}$), and a third scattering intensity ($I_{\theta3}$) of the particles in the solution at a first angle, a second angle, and a third angle, respectively, wherein the first angle, the second angle, and the third angle are determined relative to a beam of light of the light scattering detector;

determining, by the computer system, a first weighting factor ($FW_1$) based on a first form factor ($FF_1$) and the light scattering intensities, wherein determining the first weighting factor $FW_1$) comprises:

determining a ratio of observed light scattering of the particles at the first angle to observed light scattering of the particles at the third angle ($R'_{\theta1/\theta3}$) based on the first scattering intensity ($I_{\theta1}$) and the third scattering intensity ($I_{\theta3}$);

determining a ratio of observed light scattering of the particles at the second angle to observed light scattering of the particles at the third angle ($R'_{\theta2/\theta3}$) based on the second scattering intensity ($I_{\theta2}$), and the third scattering intensity ($I_{\theta3}$);

determining a ratio of calculated light scattering at the first angle to calculated light scattering at the third angle $$\left(R''_{\frac{\theta1}{\theta3}\ Calculated\ FF1}\right)$$

based on the first form factor ($FF_1$), the first angle, and the third angle;

determining a ratio of calculated light scattering at the second angle to the calculated light scattering at the third angle $$\left(R''_{\frac{\theta2}{\theta3}Calculated\ FF1}\right)$$

based on the first form factor ($FF_1$), the second angle, and the third angle;

determining a best fit of the ratio ($R'_{\theta1/\theta3}$) to the ratio $$\left(R''_{\frac{\theta1}{\theta3}\ Calculated\ FF1}\right)$$

and the ratio ($R'_{\theta2/\theta3}$) to the ratio $$\left(R''_{\frac{\theta2}{\theta3}Calculated\ FF1}\right)$$

based on the first form factor ($FF_1$); and determining, by the computer system, the first weight factor ($FW_1$) based on the best fit of the ratio ($R'_{\theta1/\theta3}$) to the ratio $$\left(R''_{\frac{\theta1}{\theta3}\ Calculated\ FF1}\right)$$

and the ratio ($R'_{\theta2/\theta3}$) to the ratio $$\left(R''_{\frac{\theta2}{\theta3}\ Calculated\ FF1}\right);$$

determining, by the computer system, a second weighting factor ($FW_2$) based on a second form factor ($FF_2$) and the light scattering intensities, wherein determining the second weighting factor ($FW_2$) comprises:

determining a ratio of calculated light scattering at the first angle to calculated light scattering at the third angle $$\left(R''_{\frac{\theta1}{\theta3}\ Calculated\ FF2}\right)$$

based on the second form factor ($FF_2$), the first angle, and the third angle;

determining a ratio of calculated light scattering of the second angle to calculated light scattering at the third angle $$\left(R''_{\frac{\theta2}{\theta3}Calculated\ FF2}\right)$$

based on the second form factor ($FF_2$), the second angle, and the third angle;

determining a best fit of the ratio ($R'_{\theta1/\theta3}$) to the ratio $$\left(R''_{\frac{\theta1}{\theta3}\ Calculated\ FF2}\right)$$

and the ratio ($R'_{\theta2/\theta3}$) to the ratio $$\left(R''_{\frac{\theta2}{\theta3}Calculated\ FF2}\right)$$

based on the second form factor ($FF_2$); and determining, by the computer system, the second weight factor ($FW_2$) based on the best fit of the ratio ($R'_{\theta1/\theta3}$) to the ratio $$\left(R''_{\frac{\theta1}{\theta3}\ Calculated\ FF2}\right)$$

and the ratio $(R'_{\theta2/\theta3})$ to the ratio $$\left(R''_{\frac{\theta2}{\theta3}Calculated\ FF2}\right);$$

determining, by the computer system, a first form factor contribution ($FC_1$) for the first form factor ($FF_1$) based on the first weighting factor ($FW_1$) and the second weighting factor ($FW_2$), wherein the first form factor contribution ($FC_1$) is determined according to Equation (1):

$$FC_1 = \frac{FW_1}{\sum FW_x}, \qquad (1)$$

wherein $\Sigma FW_x$ is the sum of each of the weighting factors; determining, by the computer system, a second form factor contribution ($FC_2$) for the second form factor ($FF_2$) based on the first weighting factor ($FW_1$) and the second weighting factor ($FW_2$), wherein the second form factor contribution ($FC_2$) is determined according to Equation (2):

$$FC_2 = \frac{FW_2}{\sum FW_x}; \qquad (2)$$

determining, by the computer system, the assumption-free radius of gyration ($Rg$) of the particles based on the first and second form factor contributions ($FC_1$, $FC_2$); and normalizing the light scattering detector based on the assumption-free radius of gyration ($Rg$).

2. The method of claim 1, wherein the first scattering intensity ($I_{\theta1}$), the second scattering intensity ($I_{\theta2}$), and the third scattering intensity ($I_{\theta3}$) are excess scattering intensities, and wherein the respective excess scattering intensities of each of the first, second, and third angles are normalized for quantum efficiency, gains, geometric volume, or a combination thereof.

3. The method of claim 1, wherein determining the best fit comprises an iterative process.

4. The method of claim 1, wherein determining the first weighting factor ($FW_1$) further comprises determining a radius of gyration ($Rg_1$), based on the first form factor ($FF_1$), associated with the best fit of the ratio $(R'_{\theta1/\theta3})$ to the ratio $$\left(R''_{\frac{\theta1}{\theta3}Calculated\ FF1}\right)$$

and the ratio $(R'_{\theta2/\theta3})$ to the ratio $$\left(R''_{\frac{\theta2}{\theta3}\ Calculated\ FF1}\right).$$

5. The method of claim 4, wherein the determining the radius of gyration ($Rg_1$) associated with the best fit comprises determining the radius of gyration ($Rg_1$), based on the first form factor ($FF_1$), associated with a minimum sum of squares residual ($SSR_1$) of a difference between the ratio $(R'_{\theta1/\theta3})$ and the ratio $$\left(R''_{\frac{\theta1}{\theta3}Calculated\ FF1}\right)$$

and a difference between the ratio $(R'_{\theta2/\theta3})$ and the ratio $$\left(R''_{\frac{\theta2}{\theta3}\ Calculated\ FF1}\right).$$

6. The method of claim 5, wherein determining the second weighting factor ($FW_2$) further comprises determining a radius of gyration ($Rg_2$), based on the second form factor ($FF_2$), associated with the best fit of the ratio $(R'_{\theta1/\theta3})$ to the ratio $$\left(R''_{\frac{\theta1}{\theta3}Calculated\ FF2}\right)$$

and the ratio $(R'_{\theta2/\theta3})$ to the ratio $$\left(R''_{\frac{\theta2}{\theta3}\ Calculated\ FF2}\right).$$

7. The method of claim 6, wherein the determining the radius of gyration ($Rg_2$) associated with the best fit comprises determining the radius of gyration ($Rg_2$), based on the second form factor ($FF_2$), associated with a minimum sum of squares residual ($SSR_2$) of a difference between the ratio $(R'_{\theta1/\theta3})$ and the ratio $$\left(R''_{\frac{\theta1}{\theta3}Calculated\ FF2}\right)$$

and a difference between the ratio $(R'_{\theta2/\theta3})$ and the ratio $$\left(R''_{\frac{\theta2}{\theta3}\ Calculated\ FF2}\right).$$

8. The method of claim 7, wherein the first weighting factor ($FW_1$) is based on the minimum sum of squares residual ($SSR_1$), the second weighting factor ($FW_2$) is based on the minimum sum of squares residual ($SSR_2$), or a combination thereof.

9. The method of claim 1, wherein one or more of the first form factor ($FF_1$), the second form factor ($FF_2$), or a combination thereof is a form factor for a homogenous rigid particle, and wherein the form factor for the homogenous rigid particle is one of: a homogenous sphere, a spherical shell, a spherical concentric shell, particles of spherical subunits, an ellipsoid of revolution, a tri-axial ellipsoid, a cube and rectangular parallelepipedon, a truncated octahedra, a faceted sphere, a lens, a cube with terraces, a cylinder, a cylinder with an elliptical cross section, a cylinder with hemi-spherical endcaps, a cylinder with half lens end caps, a toroid, an infinitely thin rod, an infinitely thin circular disk, or a fractal aggregate.

10. The method of claim 1, wherein one or more of the first form factor ($FF_1$), the second form factor ($FF_2$), or a combination thereof is a form factor for a polymer model, and wherein the form factor for the polymer model is one of:

a spherical particle form factor, a rodlike particle form factor, a random coil particle form factor, or a combination thereof.

11. The method of claim 1, wherein:

the light scattering detector comprises a multi-angle light scattering detector;

the particles in solution comprise monodispersed particles;

the light scattering detector comprises a goniometer configured to observe light scattering at two or more angles;

the particles in solution comprise polydispersed particles; and/or the assumption-free radius of gyration (Rg) of the particles is from about 5 nm to about 500 nm, from about 30 to about 250 nm, or from about 50 to about 150 nm.

12. The method of claim 1, wherein the first angle is about 90° relative to the beam of light of the detector, the second angle is about 170° relative to the beam of light of the detector, and the third angle is about 10° relative to the beam of light of the detector.

13. The method of claim 1, further comprising:

determining a third weighting factor (FW$_3$) based on a third form factor (FF$_3$);

determining a third form factor contribution (FC$_3$) for the third form factor (FF$_3$) based on the all the weighting factors (FW$_i$); and determining the assumption-free radius of gyration (Rg) from the first, second, and third form factor contributions (FC$_1$, FC$_2$, FC$_3$).

14. The method of claim 1, wherein the method does not comprise one or more of:

determining a molecular weight of the particles in solution prior to determining the assumption-free radius of gyration (Rg); and fitting a Zimm, Berry, Debye, or Guinier plot to a polynomial function.

15. The method of claim 1, further comprising implementing a rejection criteria to determine a corrected assumption-free radius of gyration, wherein the rejection criteria is based on one of: a respective minimum sum of squares residual, respective a minimum sum of squares squared, or respective a minimum sum of squares absolute for each of the form factors.

16. A method for determining a molecular weight of the particles in solution of claim 1, the method comprising determining the molecular weight of the particles in solution based on the assumption-free radius of gyration (Rg).

17. A method performed by a computer system for determining one or more properties of composite particles in solution, the method comprising:

obtaining, by the computer system, light scattering intensities of the particles in the solution from the light scattering detector, wherein the light scattering intensities comprise a first scattering intensity (I$_{\theta 1}$), a second scattering intensity (I$_{\theta 2}$), and a third scattering intensity (I$_{\theta 3}$) of the particles in the solution at a first angle, a second angle, and a third angle, respectively, wherein the first angle, the second angle, and the third angle are determined relative to a beam of light of the light scattering detector;

determining, by the computer system, a first weighting factor (FW$_1$) based on a first form factor (FF$_1$) and the light scattering intensities, wherein determining the first weighting factor (FW$_1$) comprises:

determining a ratio of observed light scattering of the particles at the first angle to observed light scattering of the particles at the third angle (R'$_{\theta 1/\theta 2}$) based on the first scattering intensity (I$_{\theta 1}$) and the third scattering intensity (I$_{\theta 3}$);

determining a ratio of observed light scattering of the particles at the second angle to observed light scattering of the particles at the third angle (R'$_{\theta 2/\theta 3}$) based on the second scattering intensity (I$_{\theta 2}$), and the third scattering intensity (I$_{\theta 3}$); and determining a ratio of calculated light scattering at the first angle to calculated light scattering at the third angle $$\left(R''_{\frac{\theta 1}{\theta 3}} Calculated\ FF1\right);$$

based on the first form factor (FF$_1$), the first angle, and the third angle;

determining, by the computer system, a second weighting factor (FW$_2$) based on a second form factor (FF$_2$) and the light scattering intensities, wherein determining the second weighting factor (FW$_2$) comprises:

determining a ratio of calculated light scattering at the first angle to calculated light scattering at the third angle $$\left(R''_{\frac{\theta 1}{\theta 3}} Calculated\ FF2\right)$$

based on the second form factor (FF$_2$), the first angle, and the third angle;

determining a ratio of calculated light scattering of the second angle to calculated light scattering at the third angle $$\left(R''_{\frac{\theta 2}{\theta 3}} Calculated\ FF2\right)$$

based on the second form factor (FF$_2$), the second angle, and the third angle;

determining a best fit of the ratio (R'$_{\theta 1/\theta 3}$) to the ratio $$\left(R''_{\frac{\theta 1}{\theta 3}} Calculated\ FF2\right)$$

and the ratio (R'$_{\theta 2/\theta 3}$) to the ratio $$\left(R''_{\frac{\theta 2}{\theta 3}} Calculated\ FF2\right)$$

based on the second form factor (FF$_2$);

determining the second weight factor (FW$_2$) based on the best fit of the ratio (R'$_{\theta 1/\theta 3}$) to the ratio $$\left(R''_{\frac{\theta 1}{\theta 3}} Calculated\ FF2\right)$$

and the ratio (R'$_{\theta 2/\theta 3}$) to the ratio $$\left(R''_{\frac{\theta 2}{\theta 3}} Calculated\ FF2\right);$$

determining, by the computer system, a first form factor contribution ($FC_1$) for the first form factor ($FF_1$) based on the first weighting factor ($FW_1$) and the second weighting factor ($FW_2$), wherein the first form factor contribution ($FC_1$) is determined according to Equation (1):

$$FC_1 = \frac{FW_1}{\sum FW_x},\tag{1}$$

wherein $\sum FW_x$ is the sum of each of the weighting factors;

determining, by the computer system, a second form factor contribution ($FC_2$) for the second form factor ($FF_2$) based on the first weighting factor ($FW_1$) and the second weighting factor ($FW_2$), wherein the second form factor contribution ($FC_2$) is determined according to Equation (2):

$$FC_2 = \frac{FW_2}{\sum FW_x};\tag{2}$$

determining, by the computer system, the one or more properties of the composite particles based on the first form factor contribution ($FC_1$) and the second form factor contribution ($FC_2$); and generating an output, on a display, a readout, a report, or a disk storage of the computer system, based on the one or more properties of the composite particles.

18. The method of claim 17, wherein the one or more properties comprise structural features, substructures, or combinations thereof, and/or wherein the composite particles in solution comprise branched particles.

19. A non-transitory computer-readable medium storing instructions that, when executed by one or more processors of a computing system, cause the computing system to perform operations for determining an assumption-free radius of gyration (Rg) of particles in solution using a light scattering detector, the operations comprising:

obtaining, by the computing system, light scattering intensities of the particles in the solution from the light scattering detector, wherein the light scattering intensities comprise a first scattering intensity ($I_{\theta 1}$), a second scattering intensity ($I_{\theta 2}$), and a third scattering intensity ($I_{\theta 3}$) of the particles in the solution at a first angle, a second angle, and a third angle, respectively, wherein the first angle, the second angle, and the third angle are determined relative to a beam of light of the light scattering detector;

determining, by the computing system, a first weighting factor ($FW_1$) based on a first form factor ($FF_1$) and the light scattering intensities, wherein determining the first weighting factor ($FW_1$) comprises:

determining a ratio of observed light scattering of the particles at the first angle to observed light scattering of the particles at the third angle ($R'_{\theta 1/\theta 3}$) based on the first scattering intensity ($I_{\theta 1}$) and the third scattering intensity ($I_{\theta 3}$);

determining a ratio of observed light scattering of the particles at the second angle to observed light scattering of the particles at the third angle ($R'_{\theta 2/\theta 3}$) based on the second scattering intensity ($I_{\theta 2}$), and the third scattering intensity ($I_{\theta 3}$);

determining a ratio of calculated light scattering at the first angle to calculated light scattering at the third angle $$\left(R''_{\frac{\theta 1}{\theta 3}} \text{ Calculated FF1}\right)$$

based on the first form factor ($FF_1$), the first angle, and the third angle;

determining a ratio of calculated light scattering at the second angle to the calculated light scattering at the third angle $$\left(R''_{\frac{\theta 2}{\theta 3}} \text{ Calculated FF1}\right)$$

based on the first form factor ($FF_1$), the second angle, and the third angle;

determining a best fit of the ratio ($R'_{\theta 1/\theta 3}$) to the ratio $$\left(R''_{\frac{\theta 1}{\theta 3}} \text{ Calculated FF1}\right)$$

and the ratio ($R'_{\theta 2/\theta 3}$) to the ratio $$\left(R''_{\frac{\theta 2}{\theta 3}} \text{ Calculated FF1}\right)$$

based on the first form factor ($FF_1$); and determining, by the computing system, the first weight factor ($FW_1$) based on the best fit of the ratio ($R'_{\theta 1/\theta 3}$) to the ratio $$\left(R''_{\frac{\theta 1}{\theta 3}} \text{ Calculated FF1}\right)$$

and the ratio ($R'_{\theta 2/\theta 3}$) to the ratio $$\left(R''_{\frac{\theta 2}{\theta 3}} \text{ Calculated FF1}\right);$$

determining, by the computing system, a second weighting factor ($FW_2$) based on a second form factor ($FF_2$) and the light scattering intensities, wherein determining the second weighting factor ($FW_2$) comprises:

determining a ratio of calculated light scattering at the first angle to calculated light scattering at the third angle $$\left(R''_{\frac{\theta 1}{\theta 3}} \text{ Calculated FF2}\right)$$

based on the second form factor ($FF_2$), the first angle, and the third angle;

determining a ratio of calculated light scattering of the second angle to calculated light scattering at the third angle $$\left(R''_{\frac{\theta2}{\theta3}\,Calculated\,FF2}\right)$$

based on the form factor (FF$_2$), the second angle, and the third angle;

determining a best fit of the ratio (R'$_{\theta1/\theta3}$) to the ratio $$\left(R''_{\frac{\theta1}{\theta3}\,Calculated\,FF2}\right)$$

and the ratio (R'$_{\theta2/\theta3}$) to the ratio $$\left(R''_{\frac{\theta2}{\theta3}\,Calculated\,FF2}\right)$$

based on the second form factor (FF$_2$); and determining, by the computing system, the second weight factor (FW$_2$) based on the best fit of the ratio (R'$_{\theta1/\theta3}$) to the ratio $$\left(R''_{\frac{\theta1}{\theta3}\,Calculated\,FF2}\right)$$

and the ratio (R'$_{\theta2/\theta2}$) to the ratio $$\left(R''_{\frac{\theta2}{\theta3}\,Calculated\,FF2}\right)$$

determining, by the computing system, a first form factor contribution (FC$_1$) for the first form factor (FF$_1$) based on the first weighting factor (FW$_1$) and the second weighting factor (FW$_2$), wherein the first form factor contribution (FC$_1$) is determined according to Equation (1):

$$FC_1 = \frac{FW_1}{\sum FW_x}, \tag{1}$$

wherein $\mu FW_x$ is the sum of each of the weighting factors;

determining, by the computing system, a second form factor contribution (FC$_2$) for the second form factor (FF$_2$) based on the first weighting factor (FW$_1$) and the second weighting factor $$FC_2 = \frac{FW_2}{\sum FW_x}; \tag{2}$$

determining, by the computing system, the assumption-free radius of gyration (Rg) of the particles based on the first and second form factor contributions (FC$_1$, FC$_2$); and normalizing the light scattering detector based on the assumption-free radius of gyration (Rg).

* * * * *